(12) United States Patent
Tadayon

(10) Patent No.: US 10,926,401 B2
(45) Date of Patent: Feb. 23, 2021

(54) ROBOT FOR SOLAR FARMS

(71) Applicant: Saied Tadayon, Potomac, MD (US)

(72) Inventor: Saied Tadayon, Potomac, MD (US)

(73) Assignee: BTPATENT LLC, Potomac, MD (US)

( * ) Notice: Subject to any disclaimer, the term of this patent is extended or adjusted under 35 U.S.C. 154(b) by 182 days.

(21) Appl. No.: 16/280,825

(22) Filed: Feb. 20, 2019

(65) Prior Publication Data

US 2019/0184544 A1 Jun. 20, 2019

Related U.S. Application Data

(63) Continuation of application No. 15/256,524, filed on Sep. 3, 2016, now Pat. No. 10,232,505, which is a (Continued)

(51) Int. Cl.
*B25J 11/00* (2006.01)
*B25J 5/02* (2006.01)
*B25J 5/00* (2006.01)
*F24S 50/20* (2018.01)
*F24S 40/20* (2018.01)
*F24S 25/10* (2018.01)
*F24S 25/70* (2018.01)
(Continued)

(52) U.S. Cl.
CPC . *B25J 5/02* (2013.01); *B25J 5/00* (2013.01); *B25J 5/005* (2013.01); *B25J 11/0085* (2013.01); *F24S 25/10* (2018.05); *F24S 25/70* (2018.05); *F24S 40/20* (2018.05); *F24S 40/90* (2018.05); *F24S 50/20* (2018.05); *F24S 2025/014* (2018.05); *F24S 2050/25* (2018.05); *F24S 2201/00* (2018.05); *Y02E 10/47* (2013.01); *Y10S 901/01* (2013.01); *Y10S 901/41* (2013.01); *Y10S 901/46* (2013.01)

(58) Field of Classification Search
CPC ....... B25J 5/02; B25J 5/00; B25J 5/005; B25J 11/0085; F24S 50/20; F24S 40/20; F24S 25/10; F24S 25/70; F24S 2050/25; F24S 2025/014; F24S 2201/00; Y02E 10/47; Y10S 901/41; Y10S 901/01; Y10S 901/46
See application file for complete search history.

(56) References Cited

U.S. PATENT DOCUMENTS

| 4,275,711 A | 6/1981 | Dumbeck |
| 4,321,419 A | 3/1982 | Hanafin |

(Continued)

FOREIGN PATENT DOCUMENTS

WO WO-2010026673 A1 * 3/2010 ............. F24S 23/80

*Primary Examiner* — Jason Holloway
(74) *Attorney, Agent, or Firm* — Bijan Tadayon; Saied Tadayon

(57) ABSTRACT

The solar energy and solar farms are used to generate energy and reduce dependence on oil (or for environmental purposes). The maintenance, operation, optimization, and repairs in big farms become very difficult, expensive, and inefficient, using human technicians. Thus, here, we teach using the robots with various functions and components, in various settings, for various purposes, to improve operations in big (or hard-to-access) farms, to automate, save money, reduce human mistakes, increase efficiency, or scale the solutions to very large scales or areas, e.g., for repair, operation, calibration, testing, maintenance, adjustment, cleaning, improving the efficiency, and tracking the Sun.

20 Claims, 73 Drawing Sheets

Related U.S. Application Data continuation of application No. 14/685,648, filed on Apr. 14, 2015, now Pat. No. 9,457,463.

(51) Int. Cl.
  *F24S 40/90* (2018.01)
  *F24S 25/00* (2018.01)

(56) References Cited

U.S. PATENT DOCUMENTS

| | | | |
|---|---|---|---|
| 4,324,947 A | 4/1982 | Dumbeck | |
| 4,908,903 A | 3/1990 | Mori | |
| 5,242,827 A | 9/1993 | Chaumont et al. | |
| 7,834,303 B2 | 11/2010 | Fatehi et al. | |
| 8,046,101 B2 * | 10/2011 | Hisatani | B08B 3/024 |
| | | | 700/248 |
| 8,240,320 B2 * | 8/2012 | Mertins | F24S 40/20 |
| | | | 134/172 |
| 8,437,875 B2 * | 5/2013 | Hernandez | G05D 1/0217 |
| | | | 700/245 |
| 8,442,790 B2 * | 5/2013 | Fukuba | G01D 18/004 |
| | | | 702/85 |
| 2003/0034062 A1 | 2/2003 | Stern et al. | |
| 2005/0103409 A1 | 5/2005 | Weber | |
| 2008/0264411 A1 | 10/2008 | Beranek | |
| 2009/0165841 A1 * | 7/2009 | Gunn, Jr. | H02S 20/00 |
| | | | 136/245 |
| 2009/0166102 A1 * | 7/2009 | Waibel | B63B 59/10 |
| | | | 180/7.1 |
| 2009/0223510 A1 | 9/2009 | Larsen | |
| 2009/0241994 A1 | 10/2009 | Lee | |
| 2009/0266353 A1 | 10/2009 | Lee | |
| 2009/0288679 A1 | 11/2009 | Pietsch et al. | |
| 2009/0288691 A1 | 11/2009 | Hunt et al. | |
| 2010/0000570 A1 | 1/2010 | Mertins et al. | |
| 2010/0043851 A1 | 2/2010 | Levy et al. | |
| 2010/0206294 A1 * | 8/2010 | Blair | F24S 50/00 |
| | | | 126/600 |
| 2010/0212654 A1 * | 8/2010 | Alejo Trevijano | F24S 23/74 |
| | | | 126/602 |
| 2011/0043515 A1 * | 2/2011 | Stathis | G06T 17/00 |
| | | | 345/419 |
| 2011/0137458 A1 * | 6/2011 | Hisatani | B25J 5/00 |
| | | | 700/248 |
| 2011/0284057 A1 * | 11/2011 | Swahn | H02S 50/00 |
| | | | 136/251 |
| 2012/0036676 A9 * | 2/2012 | Ota | F24S 23/80 |
| | | | 15/405 |

\* cited by examiner

ROBOT FOR SOLAR FARMS

RELATED INVENTIONS

The current application is the continuation of a related application Ser. No. 15/256,524, filed 3 Sep. 2016, now allowed, which is the continuation of a related application Ser. No. 14/685,648, filed 14 Apr. 2015, now as PN 9457463, issued on 2016 Oct. 4, which is the continuation of a related application Ser. No. 12/969,588, filed 16 Dec. 2010, now as U.S. Pat. No. 9,020,636, issued Apr. 28 2015. We have incorporated all of the teachings of the above applications by reference. We claim the priority date of the above applications.

BACKGROUND OF THE INVENTION

The solar energy and solar farms are used to generate energy and reduce dependence on oil, or for other environmental purposes. Some of the prior art for solar farms/energy are:

US patent application or patent number 20030034062, Theodore Garry Stern et al teaches clean panel.
20050103409, Hugo Weber teaches cleaning.
20080264411, Gerald Beranek teaches protective pane.
20090223510, Theodore E. Larsen teaches optimization.
20100000570, Max Mertins et al teaches washing.
20090288691, Gene Hunt et al teaches cleaning.
20090288679, Anton Pietsch et al teaches cleaning.
20090266353, Han-Lung Lee teaches cleaning.
20090241994, Han-Lung Lee teaches cleaning.
20100043851, Mitch Levy et al teaches cleaning and solar panels.
7834303, Fatehi et al teaches concentrators, solar cells, array of small devices, tracking system, multi-element concentrator system, and coating and cleaning techniques, to protect/clean surfaces for the devices.
4908903, Mori teaches cleaning.
4275711, Dumbeck teaches solar energy.
4324947, Dumbeck teaches solar energy/system.
4321419, Hanafin teaches cleaning/solar panel.
5242827, Chaumont et al teaches cleaning.

However, none of the prior art teaches the features that we taught below, in this disclosure.

SUMMARY OF THE INVENTION

The maintenance and repairs in big farms become very difficult, expensive, and inefficient, using human technicians. Thus, here, we teach using the robots with various functions and components in various settings, for various purposes, to improve operations in big or hard-to-access farms, to automate, save money, reduce human mistakes, or scale the solutions to very large scale or areas.

The cleaning robots and inspector robots are discussed here, as examples. Other variations or types are also discussed (for methods, systems, devices, and materials), for various other functions and tasks in the farm, for installation, optimization, maintenance, and daily operation of the farm.

BRIEF DESCRIPTION OF THE DRAWINGS

The following figures are just some examples/embodiments, to explain better.

DETAILED DESCRIPTION OF THE PREFERRED EMBODIMENTS

Figure 23:
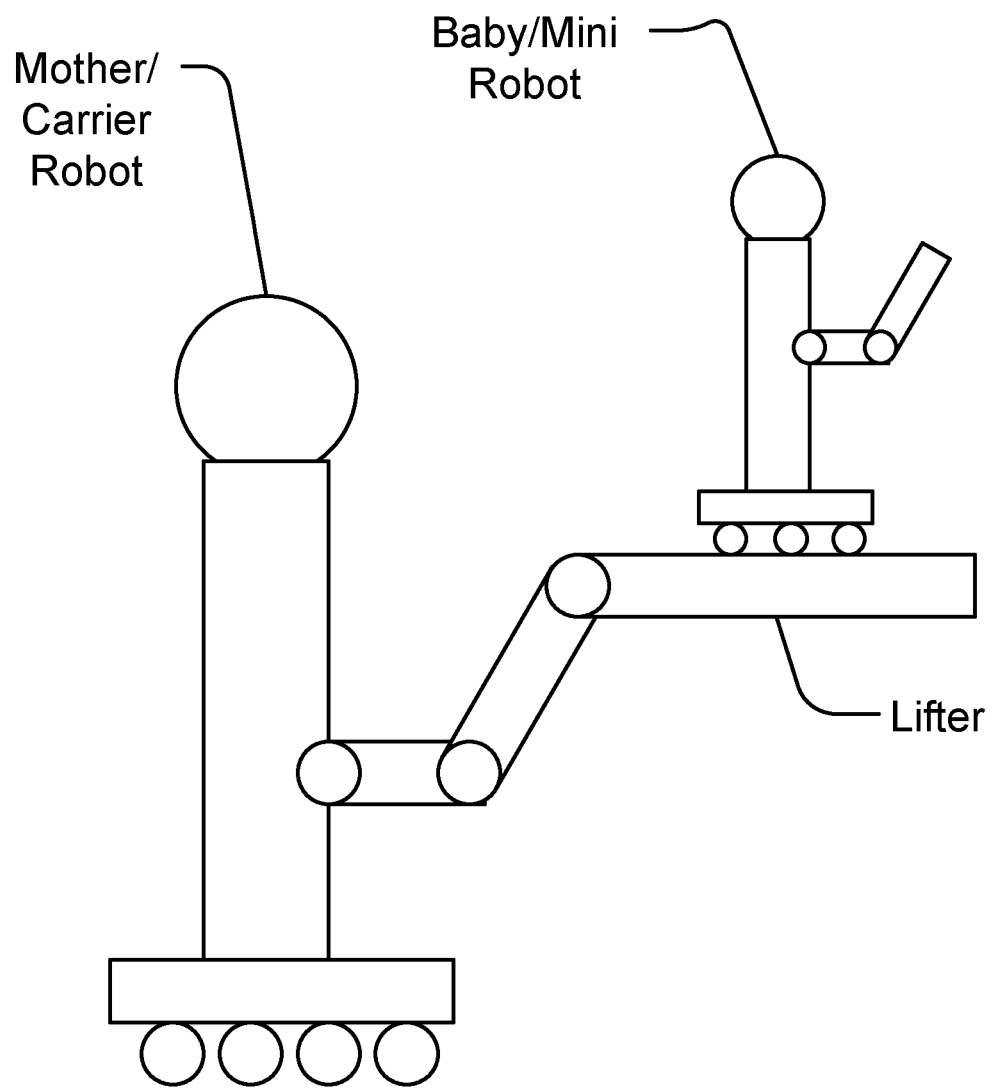
FIG. 23 shows a mother robot with a baby robot.

In one embodiment, the robots are divided based on the types of work they perform. For example, one robot is the repairing robot (to repair the panels), another one is inspector robot (to inspect the panels), another one is carrying robot (for carrying panels or parts for the repairs or other operations), another one is the mechanics robot (for repairing other robots or the whole system, such as rails), another one is cleaning robot (for cleaning the panels), another one is the mother robot (see FIG. 23) (for carrying smaller robots to the panels or other locations, such as to repair depot), supervising robot (for monitoring other robots or removing/solving the problems on spot, real-time), electrical robot (for electrical measurements on the panels, such as spot checking on voltage, current, resistivity, electrical conductivity, Hall multi-probe measurement, microwave measurements, mobility of carrier measurement (holes and electrons), defect analysis, doping analysis, defect levels in the bandgap, doping and defect concentrations, surface analysis, surface states, surface analysis, surface bondings, surface cleanliness, and other electrical parameters, for different devices, cells, or panels), recording robot (for recording the measurements and other parameters or events, including logs and timings/scheduling), night robot (for performing the tasks at night, with no Sun), day robot (for performing the tasks during the day), optical robot (for optical measurements on the panels, such as spot checking on photoluminescence (at room/ambient or low temperature), electro-luminescence, Raman Spectroscopy, X-ray, any spectroscopy, semiconductor bandgap measurement, defect analysis, crystal analysis, doping analysis, surface roughness analysis, and surface monitoring for cleanliness or debris), adjustment robot (for adjusting the position or angle of panels, or tracking the Sun for panels), or tool robot (for providing tools such as screw driver or wrench, to adjust the position or angle for panels, or to fix or tighten a loose connection or screw on a panel or subsystem). In one embodiment, one robot has one or more functions, capabilities, or equipment, as mentioned in the list above. For example, an inspector robot can also be equipped with tools, such that it can use tools for repairs, as well, once a defective panel is detected and marked.

In an embodiment, an inspector robot moves on the rails or its own wheels, to get close enough to a panel, one-by-one, with the coarse adjustment or accuracy with respect to the position of the robot, relative to the edges and boundaries of the panel under inspection. Then, the sensors or detectors on the robot detect the markers, flags, or beacons on or around the panels, to fine-adjust the position of the robot (e.g. a few cm or mm of movements, or small angle of rotation), with respect to the panel. The markers may be a symbol, a magnetic ink or object, color-marked print, tag, pattern, or an RFID (radio-frequency identification) device, which can be detected by a camera, pattern recognition module, magnetic detector, antenna, or RFID detector or module.

In one embodiment, once the robot is in correct position with respect to the panel, the robot inspects the panel with its cameras, detectors, measurement tools, and sensors, such as two-probes, multiple-probes, thermocouple, thermometer, power meter, frequency analyzer, ohm meter, voltmeter, and ammeter. For example, the inspector robot takes measurements on the electrical behavior of the solar cell, single device, or panel, to measure the current, voltage, power, resistivity, electrical conductivity, or heat conductivity (as an example), to measure the performance, efficiency, quality, and estimate remaining lifetime of the device or panel(s).

In one embodiment, this can be accomplished using the predetermined data and patterns on the normal or expected value or magnitude, or range, or acceptable standard deviation, of the normal device under a specific condition (such as time of day, or date/season, or degree of cloudiness, or outside temperature, or angle of panels, with respect to the horizontal plane). This data can be the history or prior data collected on the same or different device or panel (general or average or expected values). When comparing with the expected value(s), if the measured value(s) are very different (more than a threshold or difference or deviation, in absolute value or relatively or percentage-wise or number of standard deviations), then the measured value is classified as a suspected value.

In one embodiment, once a suspected value is found, then we repeat the same measurement(s) or do another measurement, to confirm, correlate, or verify the accuracy, percentage, or degree of confidence, of the suspected value, to further classify that value as either "passed" or "failed". That means that the device or panel is either "accepted" or "rejected" (i.e. determining that a panel or device is "good" or "bad").

In one embodiment, the robot can also use a camera(s) or sensor(s) for optical measurements. For example, it can take a picture of the surface of the device or panel, to see the roughness of the surface, or measure the reflectivity changes (by shining the light on the surface, and measuring the reflection using a detector or sensor nearby, on the path of reflection), to detect the debris, dirt, snow, or ice on the panel or device, when comparing to the pictures of the typical sample or calibration device or clean device or the original/new device, using a pattern recognition software or comparison of the pictures (e.g. bit-wise) or values, for the relative or absolute values of the differences (or deltas or changes or variations). Anything above a threshold or having a specific pattern(s) is considered as unacceptable debris, dirt, snow, or ice on the panel or device, as an example. The photo-luminescence and other optical measurements (mentioned above) may require a detector (for light or particle detector), plus a computer and/or frequency analyzer, as an example.

In one embodiment, the sampling of the devices or panels are done randomly, or periodically, or based on the history. For example, any area of the panel with an exceptional history of defects or large problems or low quality devices can be targeted or designated to be examined more often or continuously (as a sampling scheme), to get the potential problems (and solve them) faster (and with higher percentages).

In one embodiment, the robot may have a light source or infrared source, for better illumination and detection, on the panel, at different times of the day/night. The robot may have self-calibration module to calibrate itself, for positioning and various functions. The robot can have a calibration module to calibrate devices, panels, cells, or other instruments (in another embodiment), on the spot. That saves a lot of time and money for fixing the problem on spot (without removing the panels for repair or adjustments, from its original position in the solar farm, for example).

In one embodiment, after the determination of the defective (or non-efficient or old or dirty) panel (or device or circuit), the inspector robot moves out of the way, and a repair robot comes in, close to the defective panel. Then, the repair robot repairs the panel (for example, solder/connect/repair a metal wire or connection, or adjust an angle for the panel plane, with respect to the horizontal plane). Then, the repair robot moves out of the way, and the inspector robot comes in again, for another inspection, as a follow-up. If the results of the inspection are satisfactory, the repair is complete, and the robots will go to their next assignment in their queue or task lists.

In one embodiment, however, if the repair was not good enough or incomplete, then the inspector robot moves out and let the repair robot come in again, for further repair. This loop or cycle can be repeated N times (where N is an integer, larger than or equal to one, e.g. 3), until the N is reached or until a satisfactory result is obtained, within a margin of tolerance, by inspector robot.

In one embodiment, however, if the repair was still not good enough or incomplete, and if N is reached (as the repeated loop/procedure), then the inspector robot refers the problem to the central computer/control unit, or headquarters, which will send a carrying robot (e.g. having a fork lift or tray or box or bag or container or storage) to come and disengage the panel (e.g. unscrew the panel, with its own screw driver in its tool box, that has an exchangeable head/tip, on a common tool bar or handle, for multiple purposes/functions, for example) from the solar farm or system (or backbone structure, frames, casings, jackets, or holders). Then, the carrying robot lifts and puts the defective panel on its tray (for example).

In one embodiment, then, the supply robot (or the same carrying robot) puts a new (or clean or refurbished or restored) panel in the place of the old/defective panel, with a fork lift, clamp, vice, holder, artificial/robotic fingers, arm, lifter, crane, chain, belt, bar, cable, string, tie, suction cup, vacuum hose sucking/holding the object, magnetic pull/push using a permanent magnet (or a coil with a current going through it, acting as a magnet/with magnetic field), hooks, rings, hook-and-loop straps, fasteners, or tapes, tapes, fasteners, glues, screws, bolts, or any other attachment devices or means (located on the robot, or as its tools). Then, the supply robot screws the panel to the frame (or secures the position in any other way).

In one embodiment, then, the inspector robot comes in again, for inspection and measurements on the new panel. The flow chart/procedure/loop/steps/functions described above will repeat again, in case the new panel is defective already.

In one embodiment, all the procedures we mentioned above for the repair robot also apply to the cleaning robot and cleaning procedures. For example, the inspector robot inspects a panel, by taking pictures of the surface for debris detection, using a pattern recognition software (or comparing to the clean surface's picture stored previously, as a baseline or calibration/test sample), located at the central unit/location/HQ (headquarters), or on the robot's computer. The whole decision making or computer/processing/recognition/detection unit/software can be distributed, or can be centralized, using commands and data going back and forth.

Or, in one embodiment, the inspector robot inspects a panel, by taking electrical or optical measurements, as mentioned above, e.g. to find the low current or voltage, as an indication of the dirty surface or ice on the surface. In case of ice, another/heating robot can come and heat up the panel, using a hair-dryer style device on the arm of the robot, or use any chemical for de-icing. Alternatively, the heating wires under/close to the panel can heat up to de-ice the panel. In case of multiple measurements by different methods, the HQ combines all of the results for higher confidence on detection accuracy, to make sure a defect or dirt is detected.

In one embodiment, in case of the dirty panel, the cleaning robot comes in, near the dirty panel, and it uses the brush, water, soap, chemicals, razor blade, broom, or combinations of them, as its tools, in its tool box, being put on its exchangeable tool handle (which snaps in or screws in or clamps in, to secure the tool on the tool handle), with one or more robot arms, using one or more tools and tool handles, e.g. one tool per one arm, to clean up the surface. Then, the inspector robot inspects again. If the dirt persists, the cleaning robot cleans again for N times in this loop/repeated procedure/steps, until it gets clean, within some acceptable threshold, or range for cleanliness of panel/degree of cleanliness (e.g. expressed as percentage of cleanliness, such as above 80 percent clean, or 80 percent area clean), or N number of loops is exhausted/reached.

In one embodiment, in case that the dirty panel still persists (i.e. cannot be cleaned after N times), the harsh chemicals or harsh brushes are used, or the panel is replaced altogether, with a new panel, using a carrying robot. Then, an inspector robot inspects the panel again. This can be the same or different inspector robot, depending on the scheduling, or optimum locations of multiple robots with respect to the panel, to optimize the scheduling (e.g. to reduce travel time and cost, or avoid collision on tracks/delays/waiting time, on parking robots, waiting on queue or line, or parking spots along the tracks (similar to metro or train system, with parallel tracks on the side, for parking, or for passing incoming train on the same track), to get back on the tracks or rails again, as an active or moving robots, to do their functions, per schedule or plan or queue, from the HQ).

In one embodiment, the HQ has the flexibility in re-scheduling all the robots, in case of unexpected event, such as ice storm, to re-define or re-arrange or re-order or re-prioritize the tasks for robots, as a linear optimizer or scheduling optimizer or using any other mathematical optimizer, to save time and cost for scheduling/moving robots around the farm for different tasks. These tasks are listed on the task and priority list for the specific robot and/or for the whole farm, as one system, with multiple subsystems, such as tracks, parkings for robots (to open the tracks or rails for moving/other robots, so that they can pass and get to their destinations, on a 1-way track or limited-capacity track or rails), depot for storing robots, shop for repairing robots, and other locations for robots.

In one embodiment, the HQ can convert a repairing robot to a cleaning robot, in emergency, if needed, for example, in cases that not much repairing is needed, but a lot of cleaning is needed very fast, in a short term, such as after a dust storm covering panels with dust and sand, which requires broom and clean up with power wash. The tools are replaced on the arm of the robot, to modify or convert the robot, in the robot shop or depot, or at the stations near each track in predetermined intervals, as a faster way to convert robots without sending them all the way to the shop or depot, far away, to save time and cost. The conversion can be done by another machine/robot at the station, or by robot itself, as a self-service, modifying itself, by engaging its own arms and tools to change the tools at the end of the tool handles or change the tool box or storage altogether, to fit for the other tasks or functions.

In one embodiment, the cleaning liquid, water, recycled water, solid, liquid, or powdered soap, chemicals for cleaning or de-icing, anti-rust for joints or parts (to prevent rust or oxidation or degradation), or oil for lubrications of the joints (using a nozzle, spray, valve, or tube), to be used by a cleaning or repair robot, with corresponding pump or motor and its container or storage(s), are placed in the main body of robot, or arm of robot, or in the localized or central storages feeding the robot near the tracks, or in long pipes along the rails or tracks with supply far away, but feed through those pipes, by suction or motor, to be used by a robot, when the robot hooks/connects to the input valve and then opens the valve for the flow of the liquid, gas, fluid, water, steam, pressurized gas, compound, mixtures, sand, or powder, through the pipes, nozzles, manifolds, or valves, used by the repair or cleaning robot.

In addition, a supply robot can carry those tanks or capsules or cylinders for gas or liquid along, for the use of another nearby robot (the repair or cleaning robot). The supplies or cylinders or containers can be changed or added to, using another robot, by robot itself, e.g. at a station or depot (central supply depot/location), using a valve at a station along the track at some intervals or at the main/central depot, automatically controlled by a computer (when there is a short supply remaining, or indicated by robot or sensors), or by a human/user/operator at a station or depot.

In one embodiment, the robot washes with water and quickly dries the panel with a jet or air flow/nozzle to prevent water residue on the panels (or use spotless solution or de-ionized water or rinse-free solution). The robot may have a windshield wiper as a tool (or windshield wiper attached on a panel, for each panel). The cleaning robot sprays and wipes clean/dries very quickly, with absorbing clothing material or air pressure.

In one embodiment, the repair robot has tools for soldering (solder tip), welding (torch), and sand blasting (nozzle or pipes or valves), with another arm or fingers holding the material or objects close by for proper operation, and a container (connected through the pipes or conduits or channels or ducks, to the tip of the tool or finger or arm) holding the material for usage by the soldering, welding, or sand blasting (surface cleaning). The sandblasting harshness and strength for cleaning the surfaces are adjusted using the motor speed, grain size for sands, type of sand, nozzle opening size/diameter, pressure of gas, speed of the gas, and size of the cross section for the air/sand jet.

In one embodiment, the measuring or inspection robot uses voltages, currents, and other optical or electrical characteristics/measurements of the devices and panels, for cleanliness scale and calibration, to quantify the cleanliness, in scale of 0 to 10 (or to 100, or as percentage), as an example. That has a direct effect and relationship to the effectiveness and efficiency of the solar cells, semiconductor devices, or panels, to convert the photon or light to electricity, because the dirty or covered panels are very inefficient. Thus, beforehand, on predetermined surfaces, these surfaces are calibrated and tabulated, based on the measured current, voltage, and power generated, to map them to the cleanliness scale, for calibration, for future comparison. In addition, the data from a specific panel can be compared to its prior history, or other panels nearby or similar, to get a standard deviation and acceptable range or threshold/values, for acceptability criteria and cleanliness/efficiency of solar panels/devices.

In one embodiment, one or more cameras can be used for the inspections, for back side and front side for the panels, or different parts of the panels, or move the cameras on a rail on the robot, for better coverage of the panel in 2-D (dimensional) space, on the panel. Two or more cameras focusing on a panel can be used for depth and position detection/determination, as stereo-cameras for measuring depth and lengths, for example, finding the size of dust or particle/ice sheet on the panels.

In one embodiment, the thickness of the ice can be estimated by optical manners, as well, using the reflection or transmission of the light across or through the ice sheet, and measuring the brightness, angles and distances deviated due to the ice sheet, instead of usual air, on top of the panel, based on refraction, reflection, and transmission (optics/laws in physics), for a material with an index of refraction (n) and thickness (L), which can be calibrated beforehand, as well. The calibration/test data is expressed as a formula, table, curve, or as points in a database, expressing the relationship between L and refraction, reflection, and transmission of the light, in terms of distances and angles deviated, due to the ice sheet or layer on the panel.

In one embodiment, other devices attached to or carried by a repair or optical robot for repair and optical inspection comprises: mirror (concave or convex), lens (concave or convex), light reflector, night vision, light source(s), flash light, flood light, color light, laser, diode light, halogen light, anti-fog light, concentrator for light, video recorder, still-image digital or analog recorder/camera, pattern recognition module/software, antenna for transmission of data, or memory storage for storing the data, such as magnetic or optical disk, CD, hard drive, and memory stick.

In one embodiment, the depot is the place for storing the robots. Parking spaces are extra tracks or rail systems, parallel and close to the main tracks or rails, for the incoming or potentially colliding robots avoid each other, or two or more robots use a single lane, rail, or track, without collision. For example, the first robot pulls out from the main track and waits in the nearby parking space, as a detour or waiting/queue location, until the incoming robots in the same lane or track pass. Then, the first robot comes out from the parking space, and continues in the opposite direction, as originally intended.

In one embodiment, one or more baby robots are carried by a mother robot, to put them in a right place, e.g. for a repair task on a panel. The mother robot can push or pull or control the movements of the baby robot, by remote control, such as wired or wireless controller/antenna. The mother robot can supply electricity or power to the baby robot, such as charging the battery. Or, baby robot can get energized, such as recharging battery, through power lines on the side of the tracks and rails (by hooking up and connecting to them, directly, or through mother robot). The transformer or AC-DC conversion or battery can be placed on the baby robot, mother robot, stations along the railing system, or a combination of them.

In one embodiment, the energy and electricity can also come from the solar farm/nearby panels itself, wireless electromagnetic transmission of power, wired transmission of power, batteries, heavy flywheels storing energy mechanically, spring-powered mechanical gears (wound up), power grid, betavoltaic sources/batteries, wind generators, nuclear plants, ocean waves, tidal movement of water, or any other sources.

In one embodiment, the baby robot is autonomous and independent both in decision making or functions it performs (or both). In one embodiment, the baby robot needs the help of mother robot (or HQ), to make decisions (such as scheduling, detection, or recognition), or do the functions. For example, the mother robot carries a baby robot to a dirty panel, and puts the baby robot on top of the panel's surface. Then, for example, the baby robot uses its small brush to clean up the curvature (e.g. concave) or flat surface of the panel, by going in rows and columns, or zig-zag, to cover all the surface, or at least the dirty section of the surface for the panel (which is marked and tagged in the memory of the inspector robot beforehand, and the data transmitted to the HQ already, to be instructed/transmitted to the cleaning baby robot).

In one embodiment, the baby robot has its own motor, 3 or 4 wheels, tank-like chain moving mechanism, rotating mechanism, reverse moving mechanism (such as gearbox and gears), tool box, arms, handles for tools, tool tips (exchangeable tips, such as screw driver at different shapes and sizes, oil dispenser for lubrication the gears for the system, hammer for repair functions, or soldering tip), carrying bag for tools or pieces, vacuum bag for vacuuming and cleaning the surface, different brushes of various sizes and softness for cleaning, razor blade or ice blades for scrapping the ice or dirt off the panel, and various other tools.

In one embodiment, multiple baby robots do the cleaning faster. The collision avoidance mechanism can be central, using scheduling program by HQ, and also, to make sure they all cover the entire surface, with minimal overlap/waste. The collision avoidance mechanism can be local, based on the detecting or locating other baby robots, by baby robots themselves, or by a panel vision system nearby (cameras attached near the panel), so that they either avoid each other by stopping or changing direction/speed, or by softly hitting each other (softly bumping to each other, without any damage to the baby robots or system, with low speed and good shock-absorbent bumpers, like cars) and changing direction (going reverse) immediately, without major supervision/control from HQ or outside.

In one embodiment, when baby robot reaches to the edge of the panel, it stops and comes back/changes direction, to avoid the fall (and damage to the baby robot). This can be done by a raised edge of the panel, as a mechanical railing or barrier around the panel, or by markers/beacons (as described elsewhere in this invention) that the baby robot detects, to stop or slow down or change direction, to avoid falling off the edge of the panel.

In one embodiment, the mother robot can wait for the baby robot to finish its task, to remove it to the next needed panel. Or, the mother robot can go to other locations for other work/tasks, and especially, if it takes too long for cleaning by the baby robot, later on, the same or different mother robot is scheduled to come and pick up the cleaning baby robot, to be moved to another panel for more cleaning. The scheduling of the mother robots for pick-up or drop-off are done by HQ, in one example, to optimize the resources, reduce cost and delay/waiting, and improve efficiency of the whole system/solar farm.

The baby robot can be detected and grabbed by the mother robot using markers, color, tags. RFID, any beacons, sound source, light source at specific color, laser source, by object recognition, or by shape recognition. Alternatively, the baby robot can measure and detect its own coordinate with respect to the coordinates of the panels, and its corners, and the information is transmitted to the mother robot, via HQ, or wirelessly or by cable, such that the mother robot can grab the baby robot from any location on the panel, or alternatively, from a specific location on the panel, designated for the pickup, which baby robot can indicate its readiness, to be picked up by the mother robot, when the baby robot reaches to that pickup location on the panel.

In one embodiment, the adjustment robot adjusts the angle or slope of the plane for the frame that holds the panel, so that it tracks the Sun, as much as possible, regularly, periodically, or at some specific times/intervals, determined by HQ, to optimize the efficiency of solar cells and obtain more energy from Sun per day. The Sun tracking can be done or Sun's position detected by outside entity such as HQ or inspector robot. Alternatively, it can be done using the sensors on the panel itself, such as photodetectors, for measuring the intensity of light. Alternatively, it can be done using historical data or data from nearby (or same) panels, for comparison. Alternatively, it can be done using current and voltage measured from the panels or devices, to calculate the efficiency, and try to optimize that by trial-and-error technique (i.e. adjust the angle and measure, in a loop/repeated procedure, until it does not get any better. Then, stop at that point, which is the optimum angle for our setup, for the panel for solar cell efficiency.). Or, HQ can use prior data (and use a software) to optimize the angle/position of panel, based on how close the current and voltage get to the expected/optimum value(s).

In one embodiment, the adjustment robot adjusts the angle or slope of the plane for the frame that holds the panel, using a screw driver or wrench, on its tool handle, on its arm, using proper tool tip (exchangeable) to fit the screws and nuts, stored in a tool box or tray or bag, attached to or carried by the repair robot, and properly stored in small compartments in the toolbox for easy access and pickup by the repair robot. The size of the nuts and screws are known already from the system specification, which is stored in the HQ database/magnetic data storage, as an example. Alternatively, the small camera installed near the screw, or on the arm of the robot, can pick up the image of screw, and by the pattern recognition module, at the HQ or on robot itself, it determines the exact size and type of screw, for proper tool or tool tip, to be selected by the repair robot, from the toolbox.

In one embodiment, the pattern recognition module can be a normalizer unit that normalizes the size of the digital image. Then, the output goes to the analyzer for comparison to a database, for size determination, such as bit-by-bit comparison of the 2 images, plus considering of the factor for normalization, to get the absolute value of the size of the screw or nut, in terms of inch or cm or mm.

The following figures and corresponding descriptions are just some examples and embodiments for the teaching the many different aspects of this invention:

In one embodiment, FIG. 1 is an example of the sequence of 2 robots carrying a task together, designated as Robot 1 (lifter robot, with a fork lift, magnet, chains, bars, arm, fingers, suction cups (or hose with a pump or motor), bracket, frame, holder, spoon-shaped container, fork-shaped container, or crane (with a ring and a hook)) and Robot 2 (flat-bed carrier robot). The solar farm comprises some arrays of 2-D or matrix or columns/rows of panels, with rails or tracks (or paths or streets, for some robots having 3, 4, or more wheels, that can move around on wheels, without the rails), located in between panels, for robots to move around in 2 directions/dimensions/perpendicular paths, or 1 direction, as shown in FIG. 1a. The rails are useful for repair robots or inspector robots to move around and do their functions/tasks, as explained above, without or with minimal human intervention or supervision.

In one embodiment, the array of mirrors or panels is rectangular-shaped. In one embodiment, the array of mirrors or panels is not rectangular-shaped. Rather, they are positioned in a curve arrangement (concentric, radially, or any arbitrary shape), e.g. focusing on one point, as is common in the concave mirror farms, all focusing on a small area on a tower, to heat up a container on the tower.

Figure 1A:
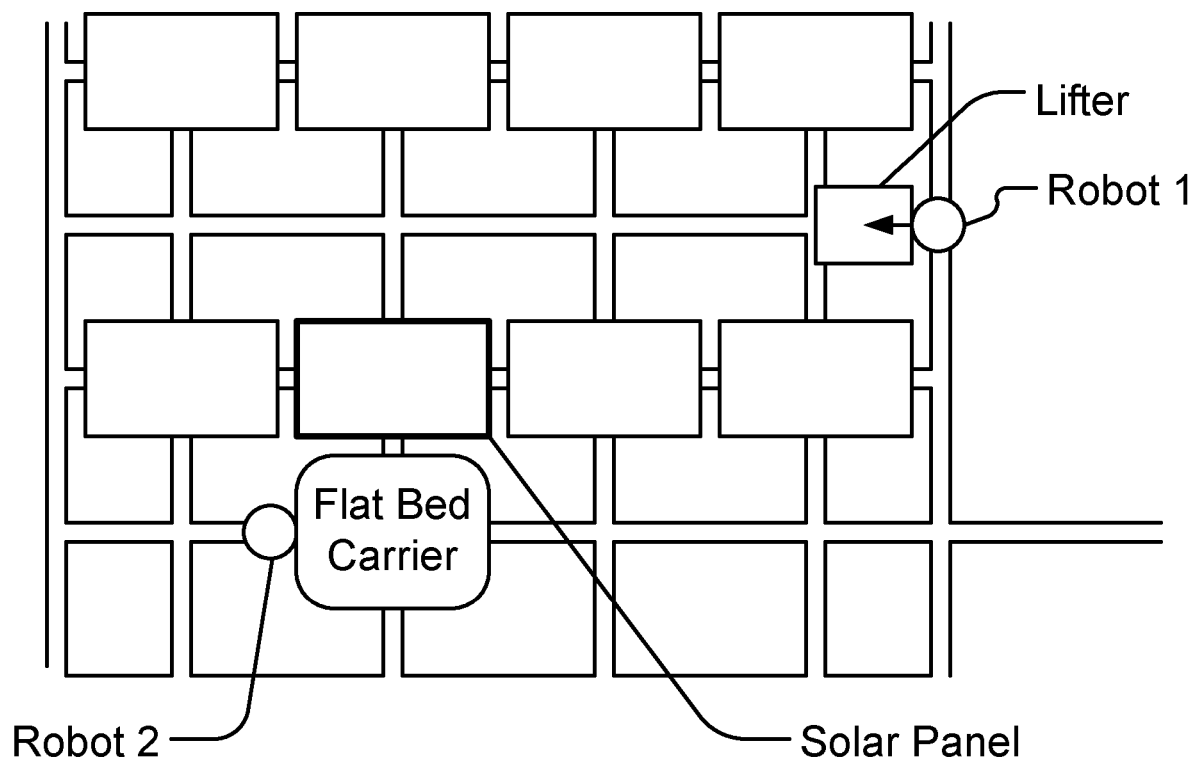
FIGS. 1 a-e show robot functioning and moving around in a solar farm, consisting of various tracks or rails in a matrix form.
Figure 1B:
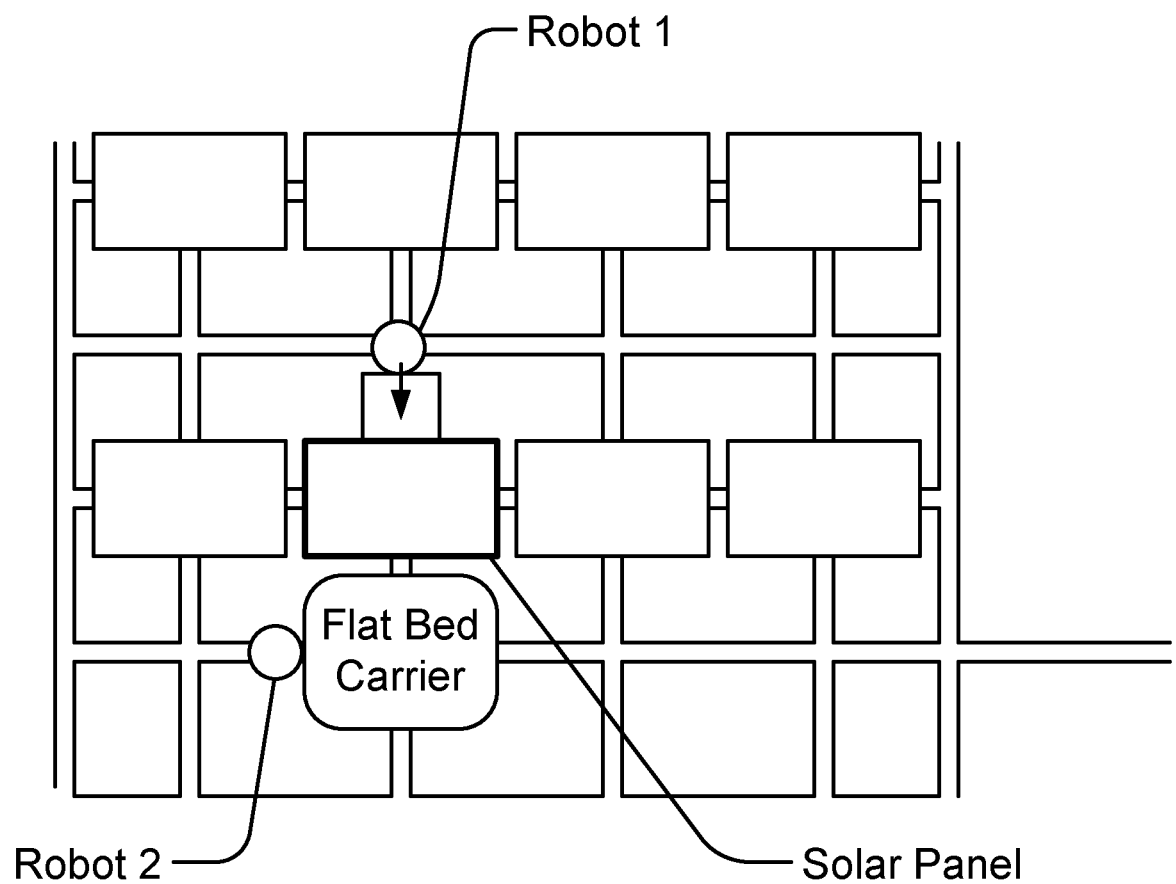
Figure 1C:
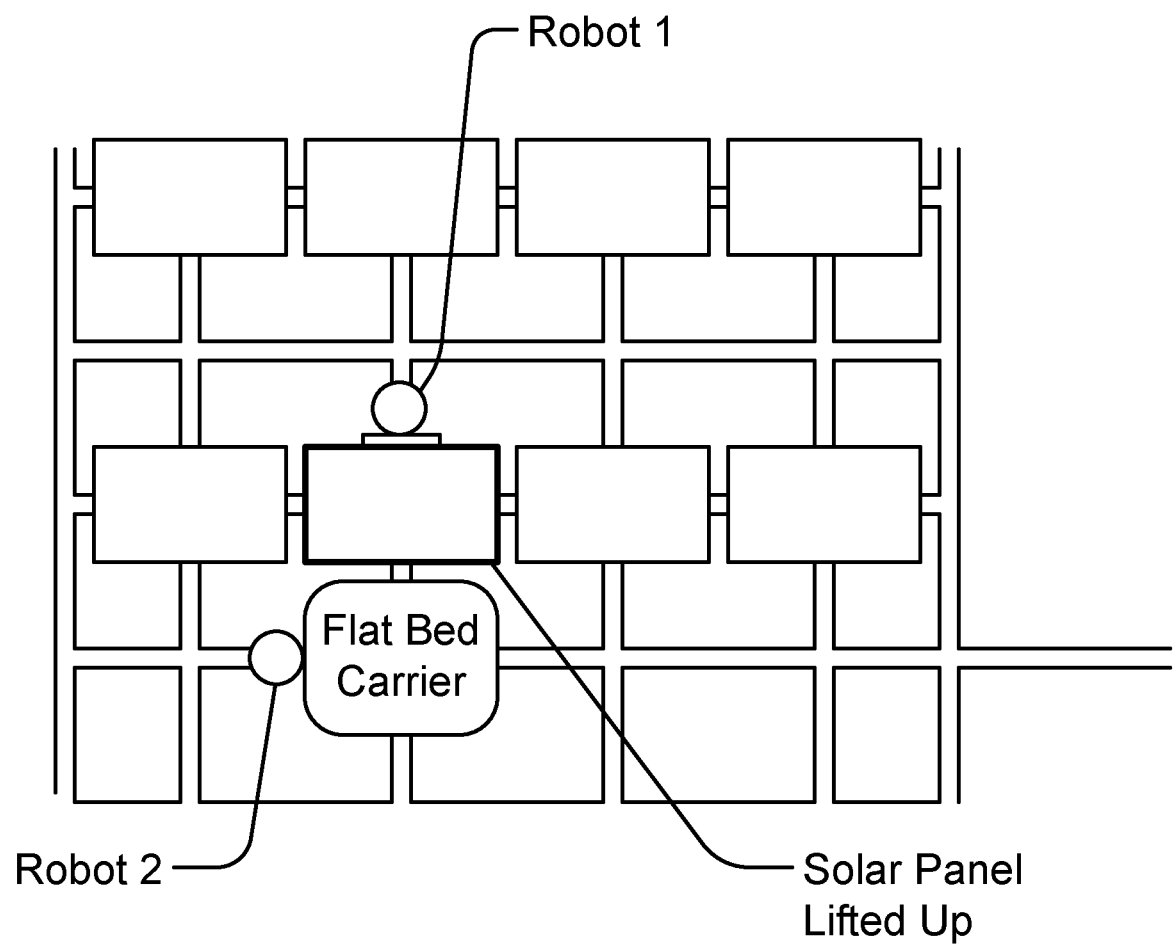
Figure 1D:
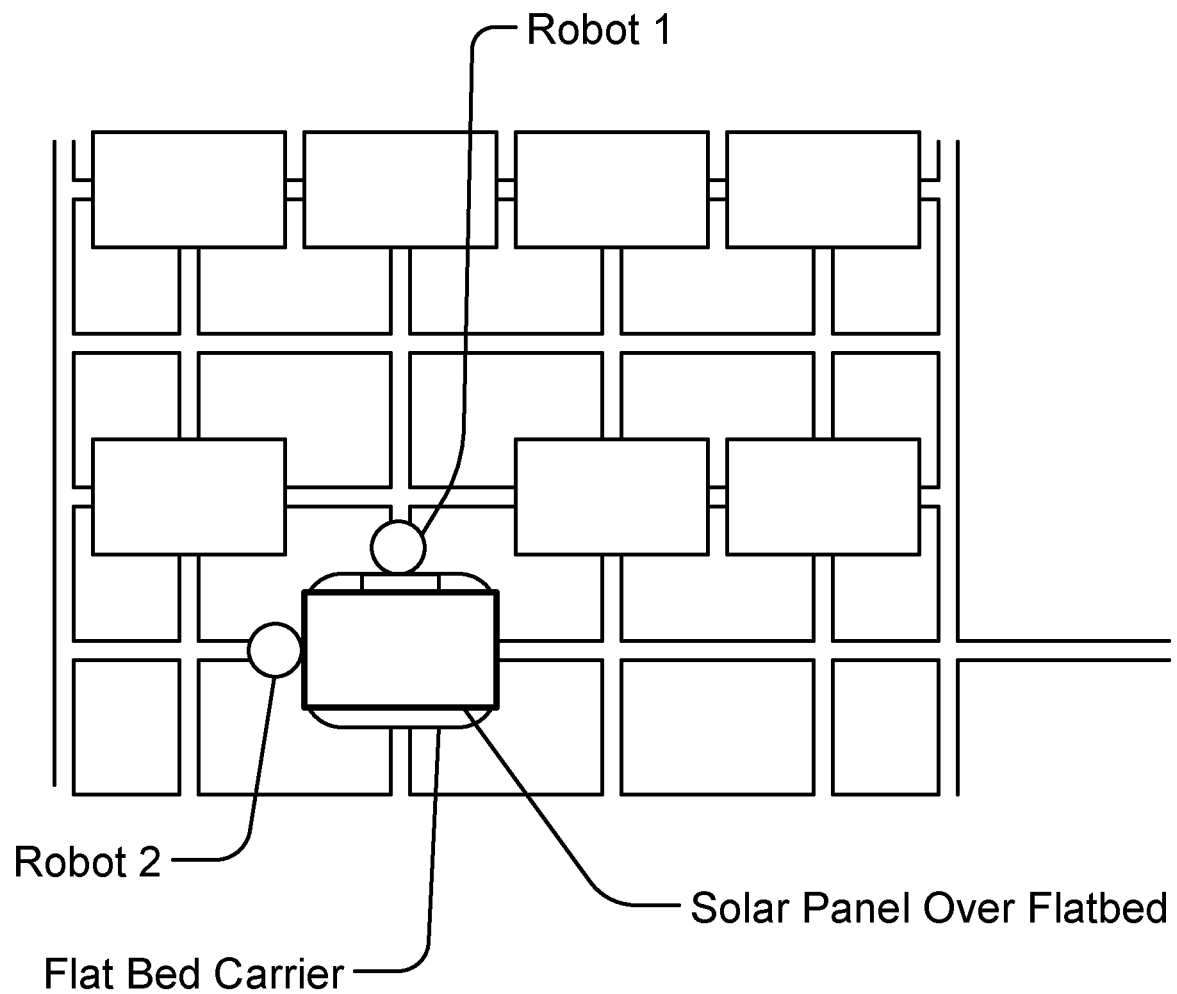
Figure 1E:
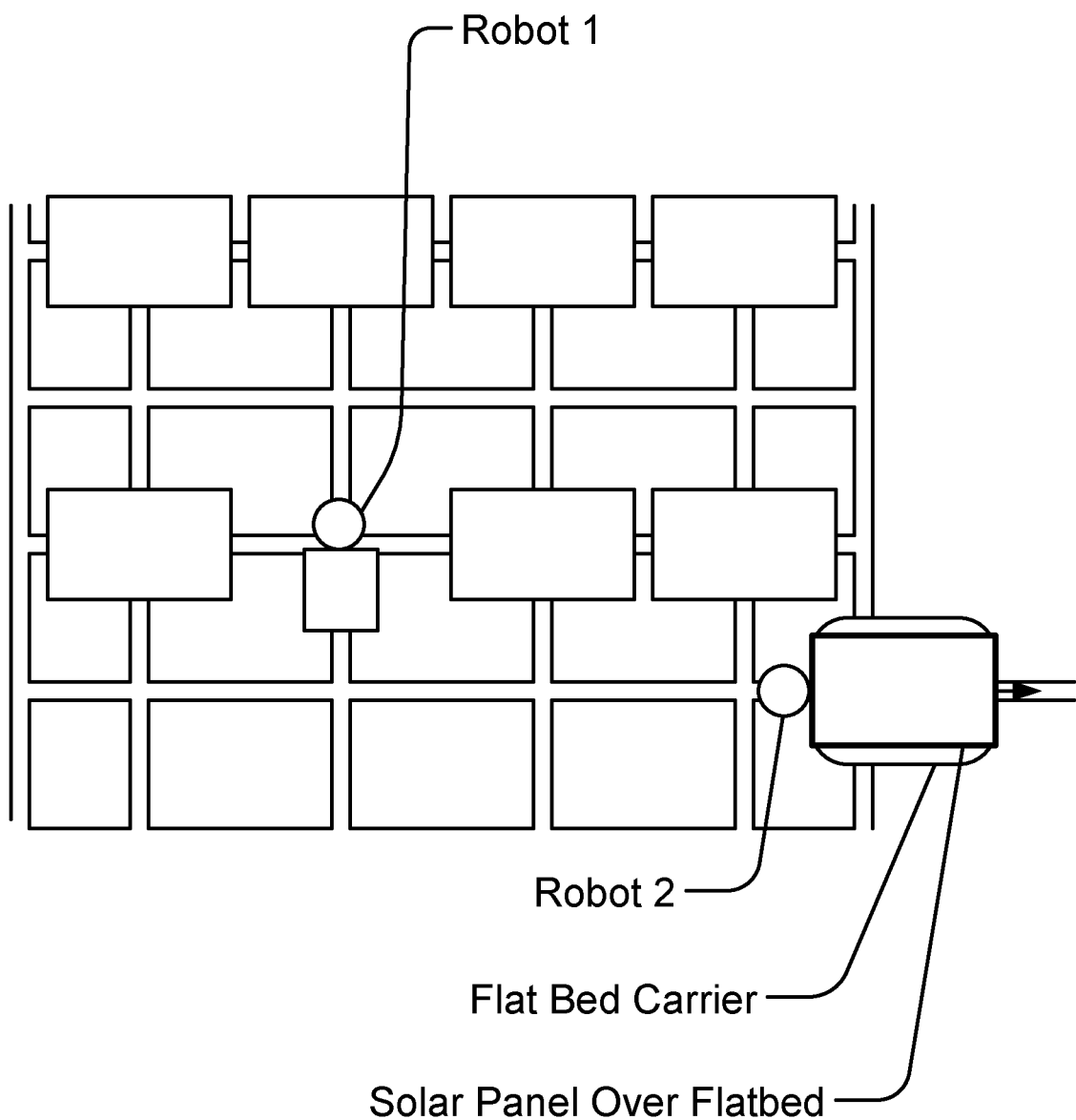

FIGS. 1a-1b show, for example, once a defective panel is detected and marked by an inspector robot, as explained above, Robot 1 and Robot 2 approach the panel on the rails or tracks. Then, Robot 1 lifts the panel and puts it on/inside the tray, container, box, plate, or bag of Robot 2, as in FIGS. 1c-d. Then, Robot 2 moves away to repair shop or depot or storage, for storing or repairing the defective panel, as in FIG. 1e. Consequently, a new or refurbished panel, or a new or better version of the panel, will be brought by the robots (and gets installed, as explained above), as an example.

Figure 2A:
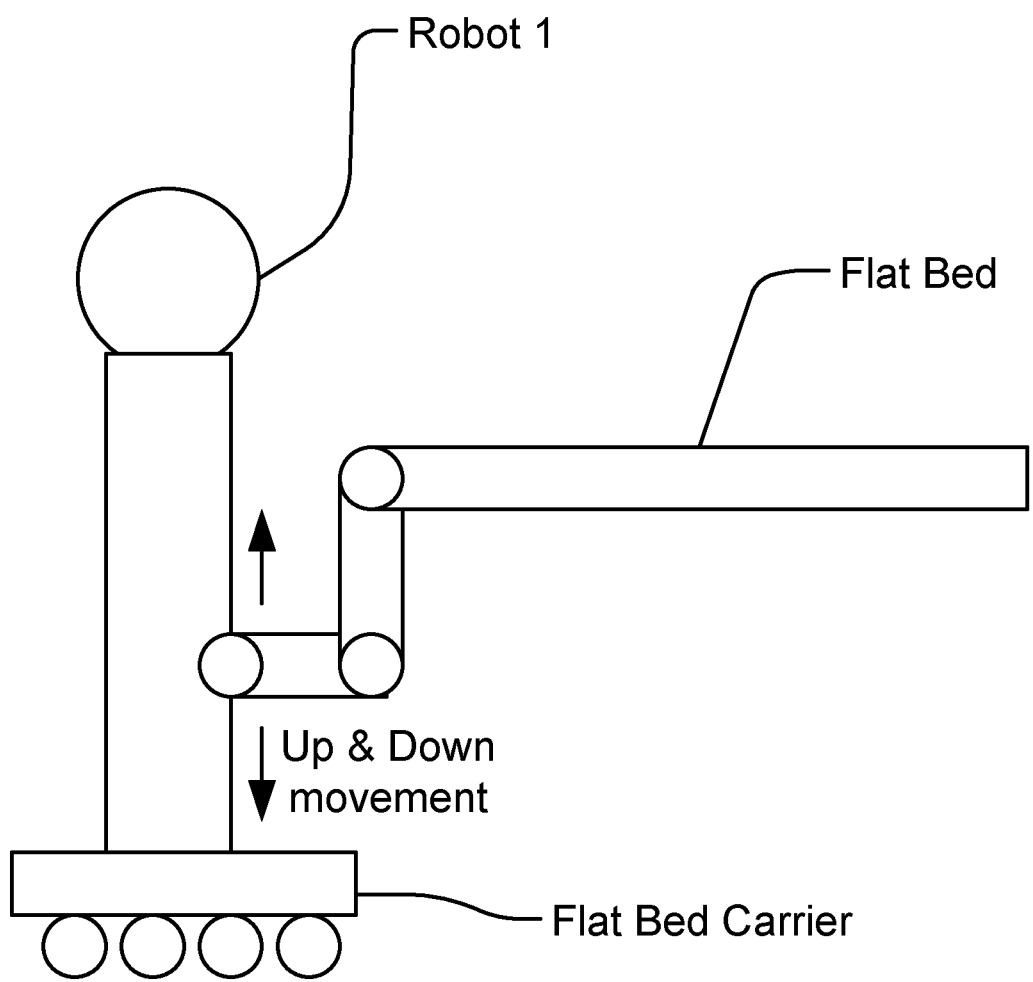
FIGS. 2a-b show different types of robots, flat bed carrier and lifter.
Figure 2B:
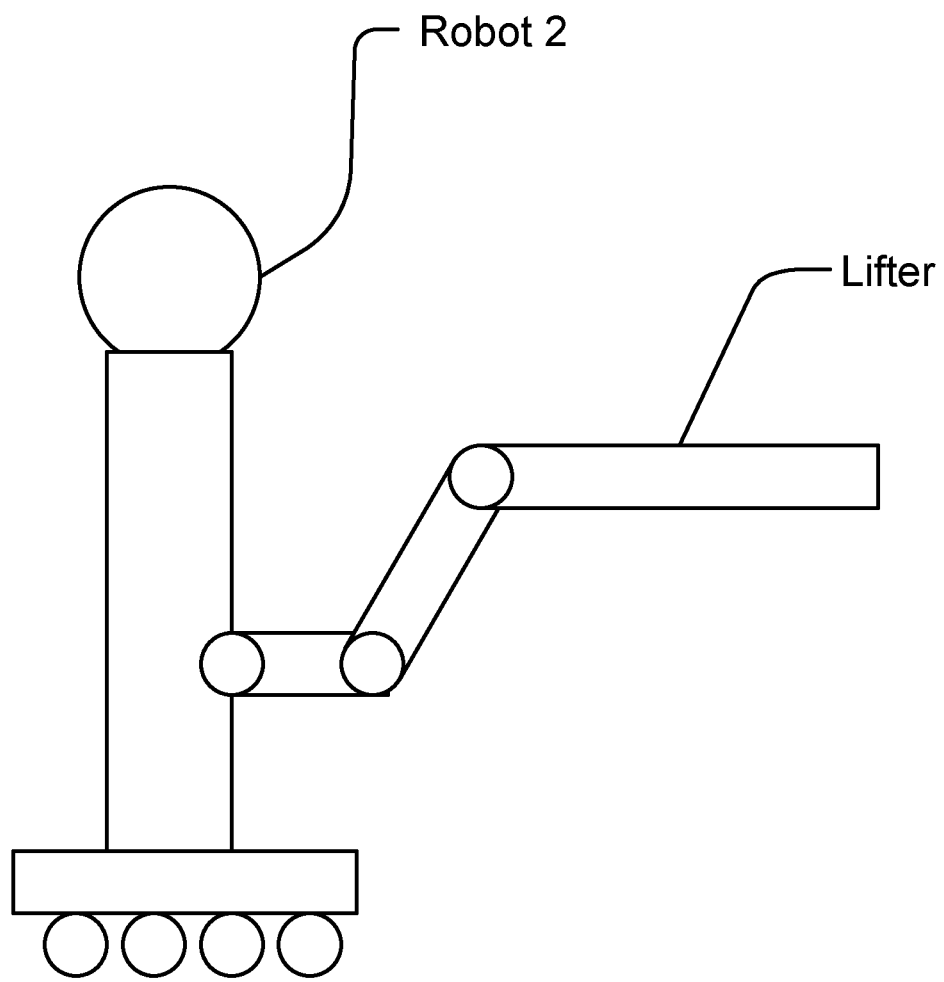
Figure 3A:
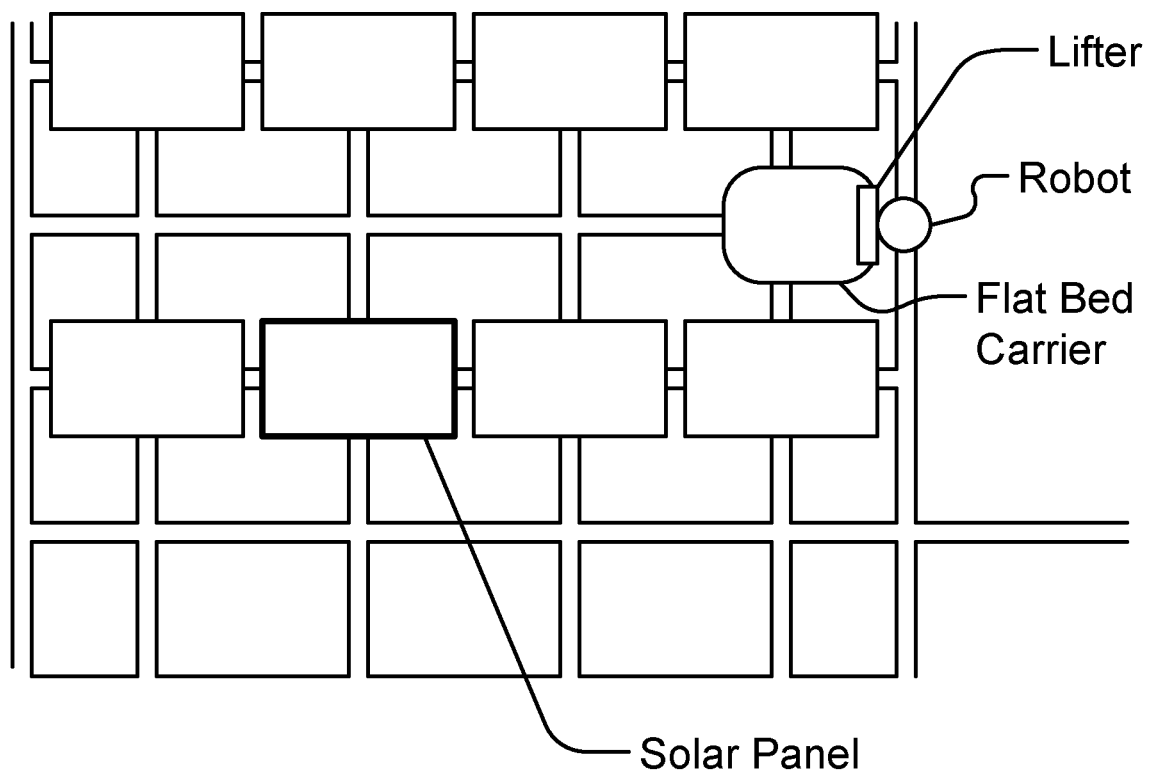
FIGS. 3a-i show robot(s) functioning and moving around in a solar farm, consisting of various tracks or rails in a matrix form.
Figure 3B:
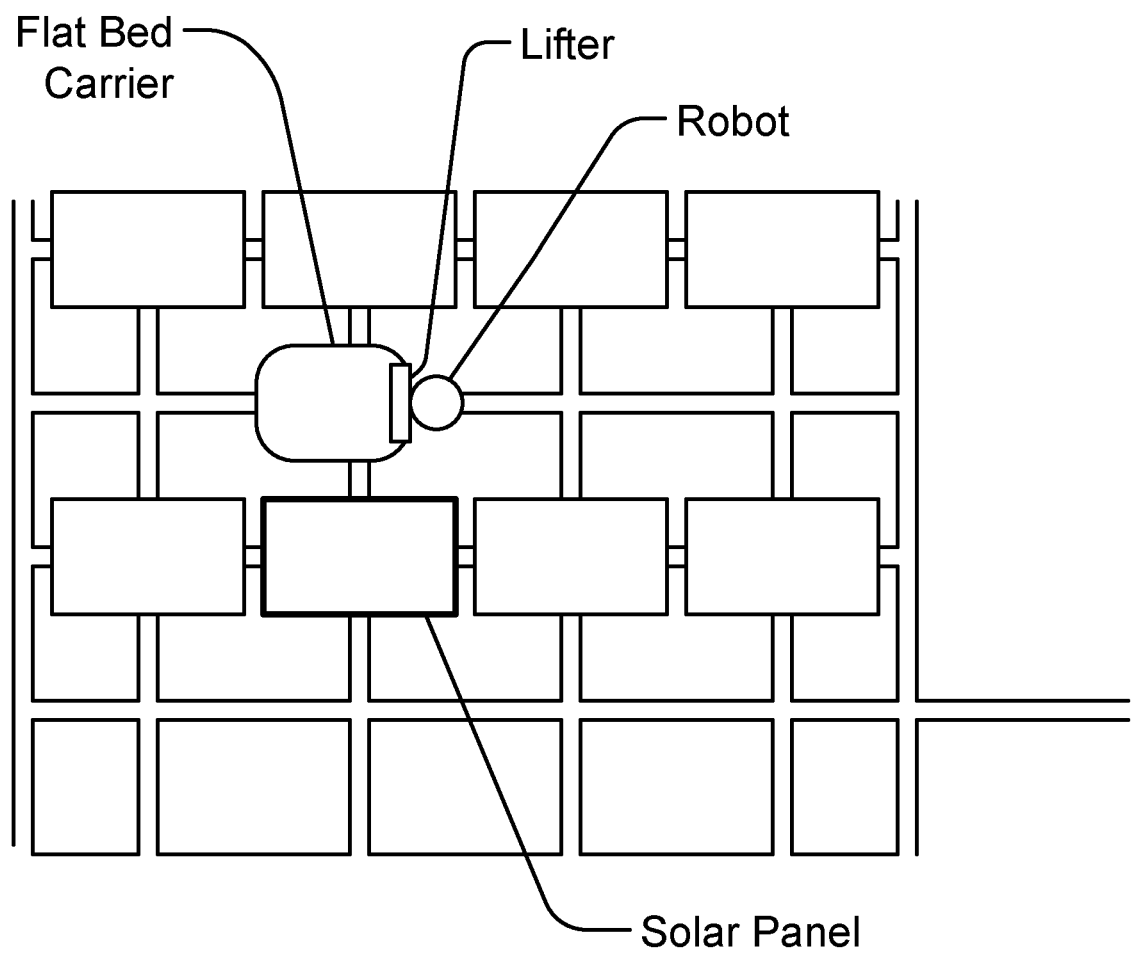
Figure 3C:
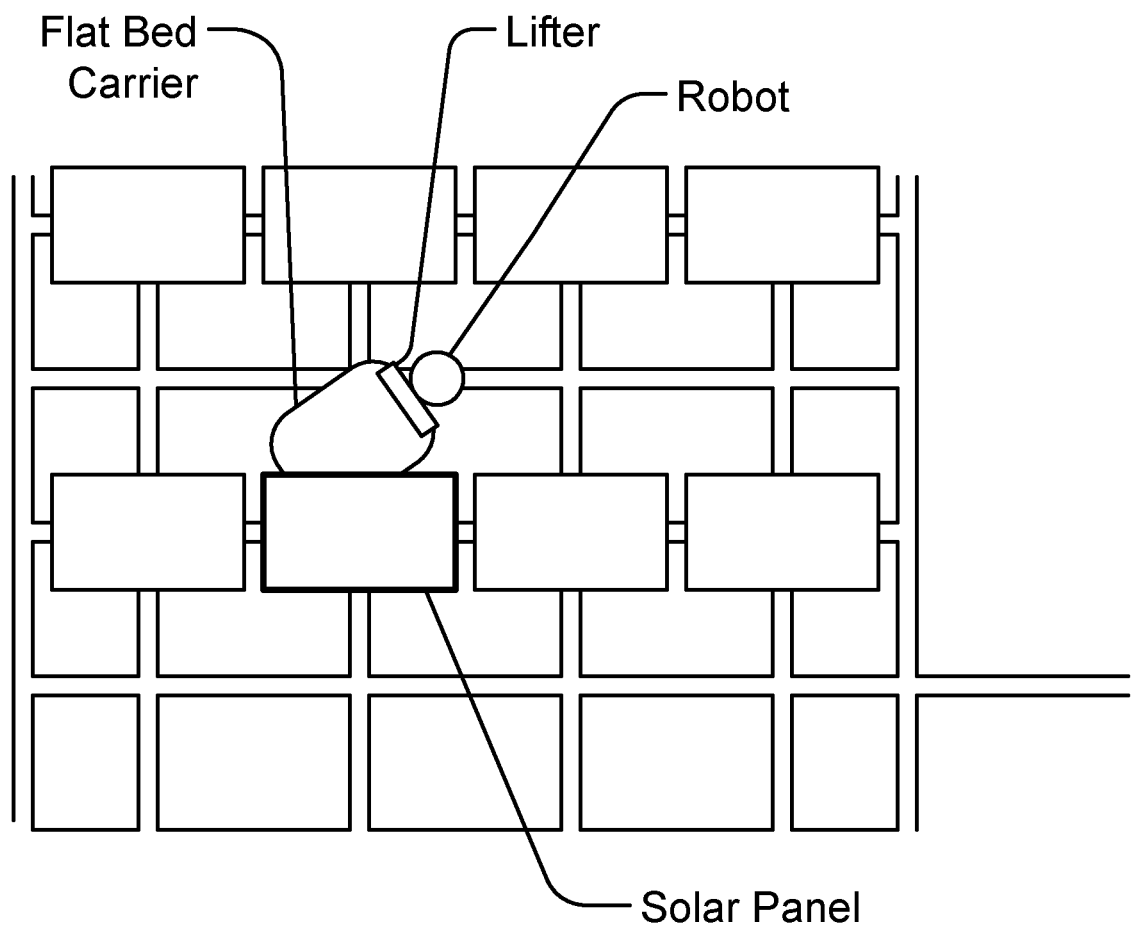
Figure 3D:
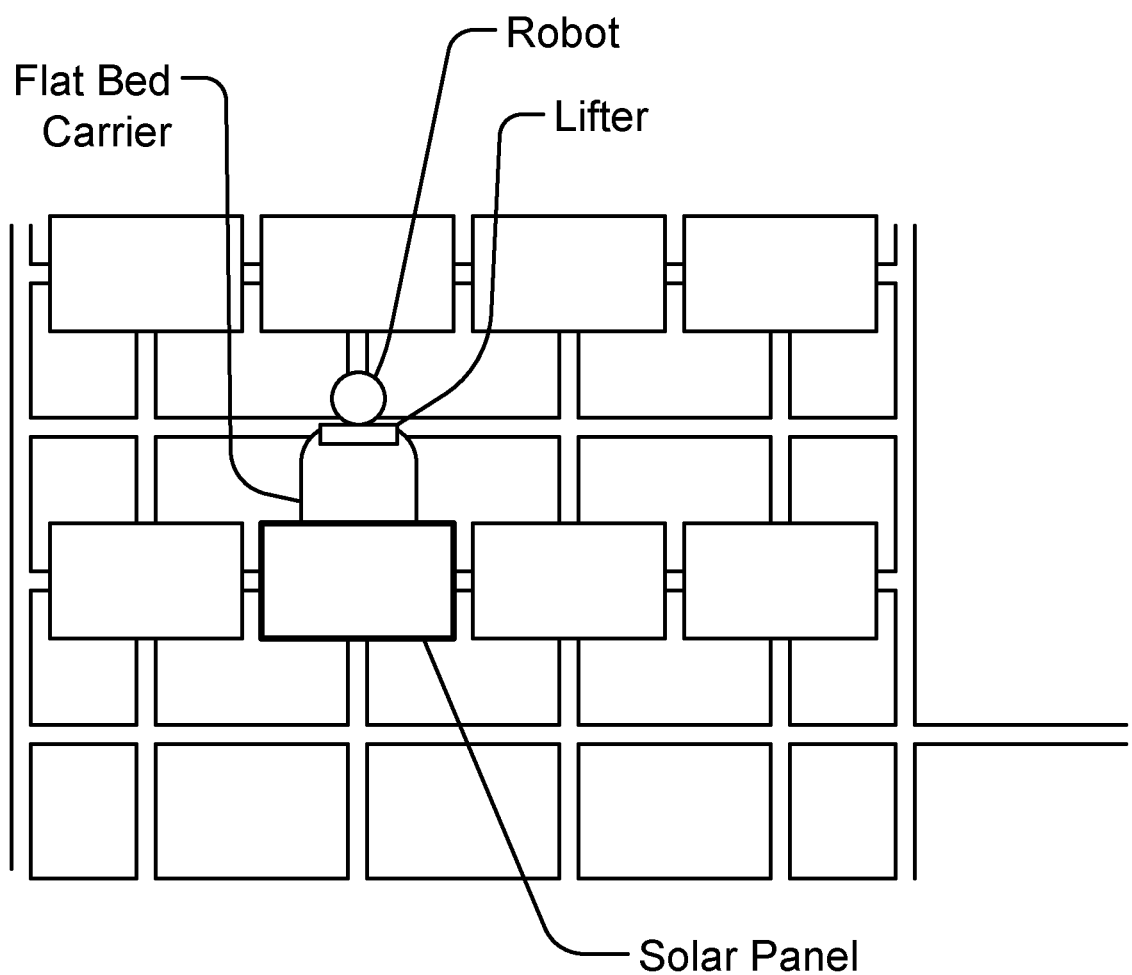
Figure 3E:
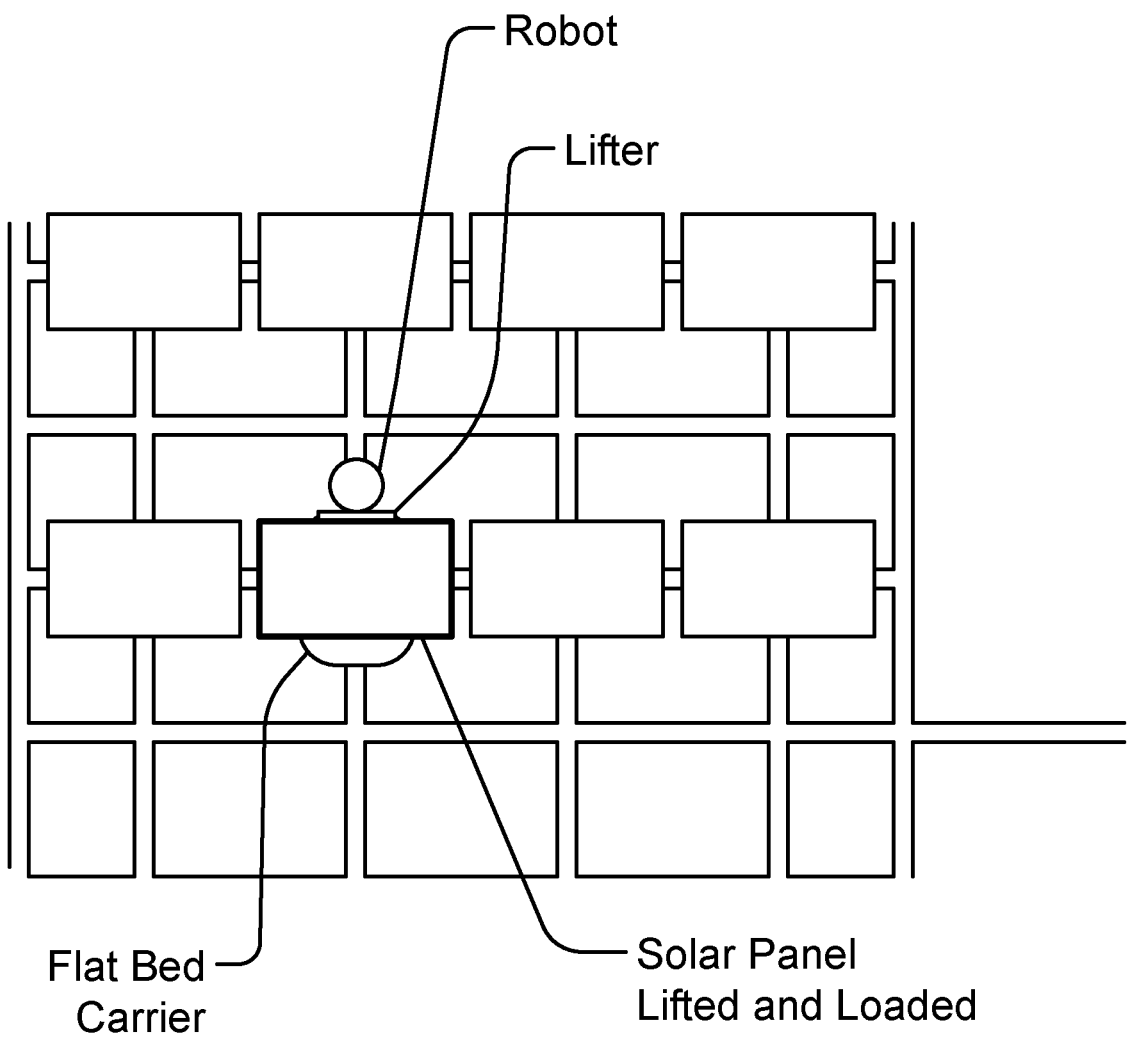
Figure 3F:
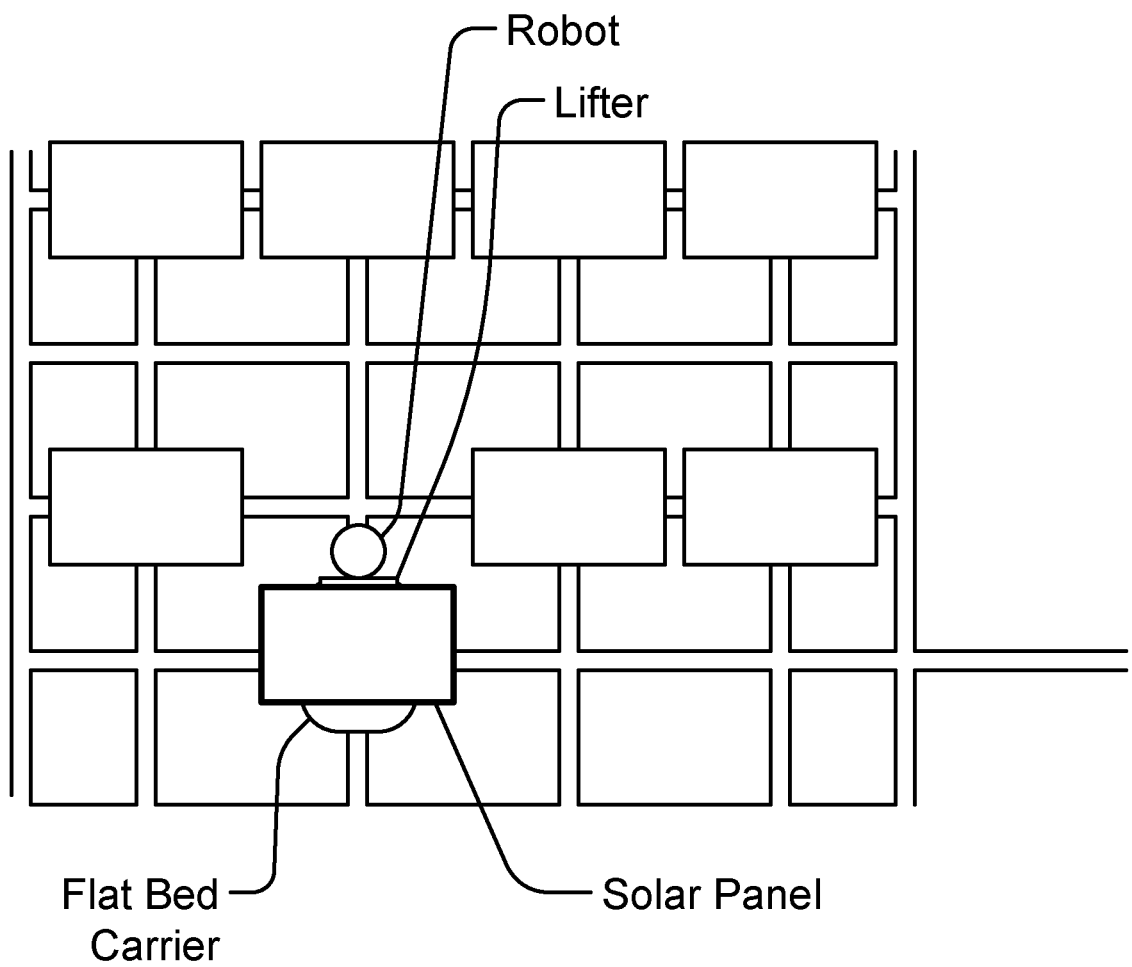
Figure 3G:
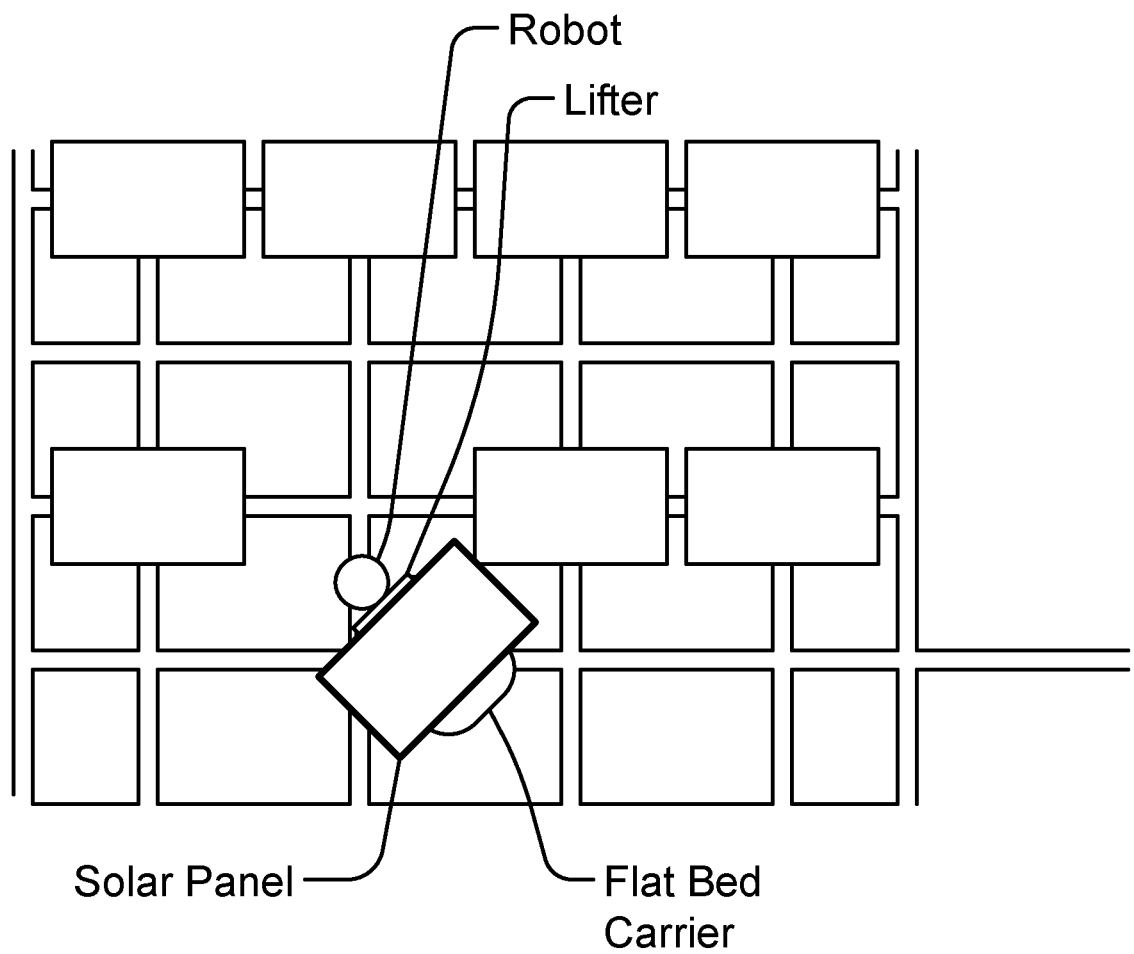
Figure 3H:
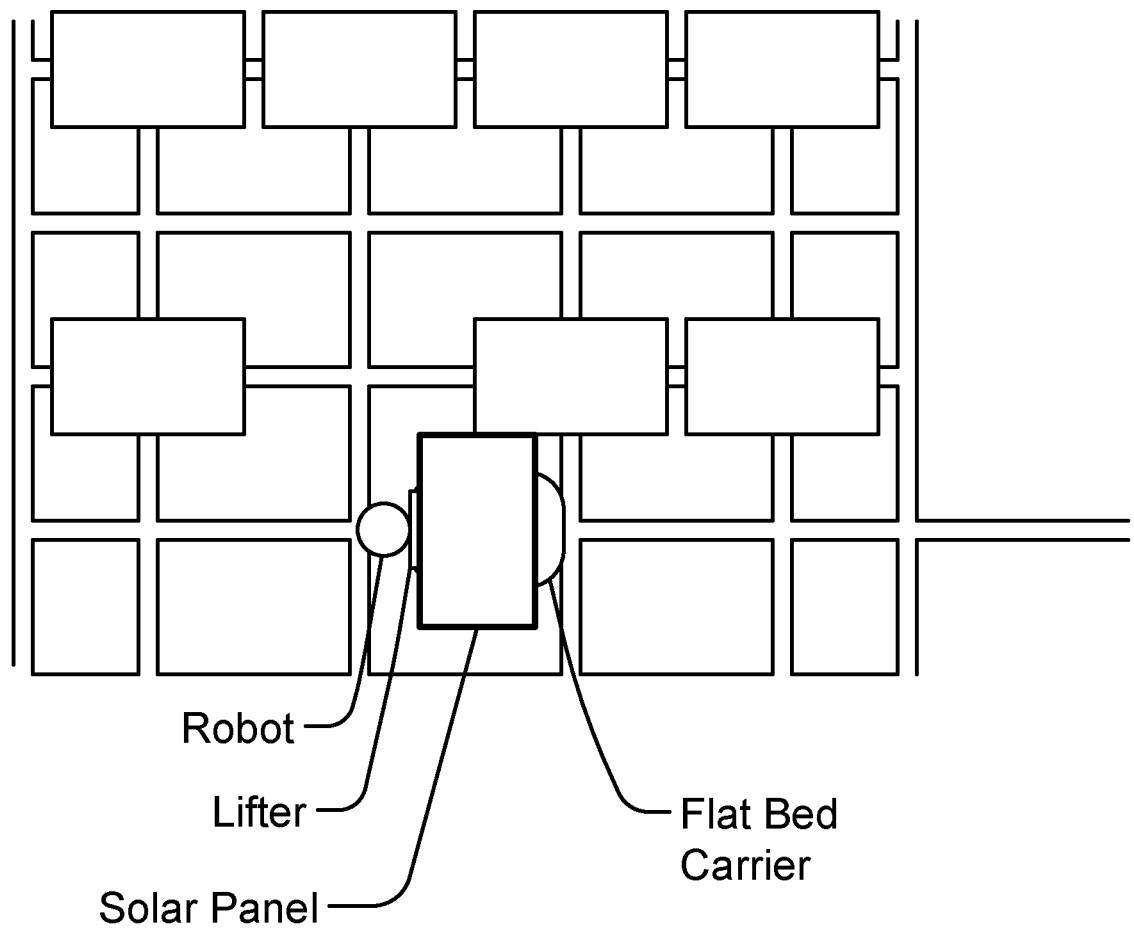
Figure 3I:
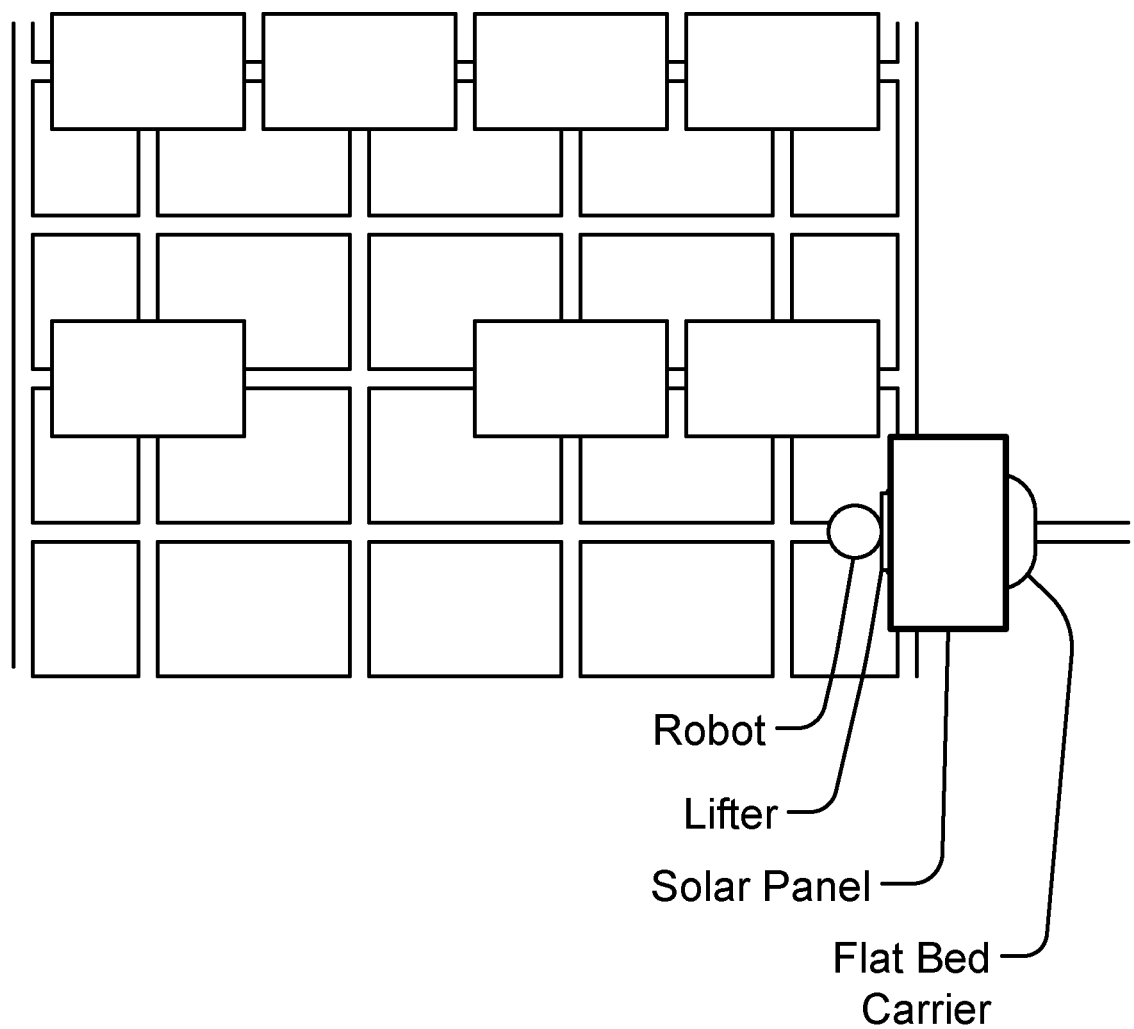

FIG. 2a shows one carrier robot with a flat bed or tray, with (optional) hinge(s), with multiple piece arm(s), which can go up and down (e.g. through a rail, cavity, or conduit), with respect to the robot main body or trunk. FIG. 2b shows a lifter robot, with a fork-lift structure, or a shovel-like structure, for lifting purposes, from its side view.

FIG. 3 (FIGS. 3a-i) shows a sequence of (an example) of a robot removing a defective panel to the depot or repair shop. However, in this case, one robot has both a lifter and a flat bed. Thus, only one robot can do the same functions/tasks performed by the 2 robots, above, as the one shown in FIG. 1 sequence. The rotation at the corners, or between rows and columns, for change of direction, e.g. at 90 degree, for the robot, is done by short curved interconnecting rails (similar to the one shown in FIG. 13, or those used on train or metro rail/track systems, for many years, as they are well-known in the art).

Figure 7:
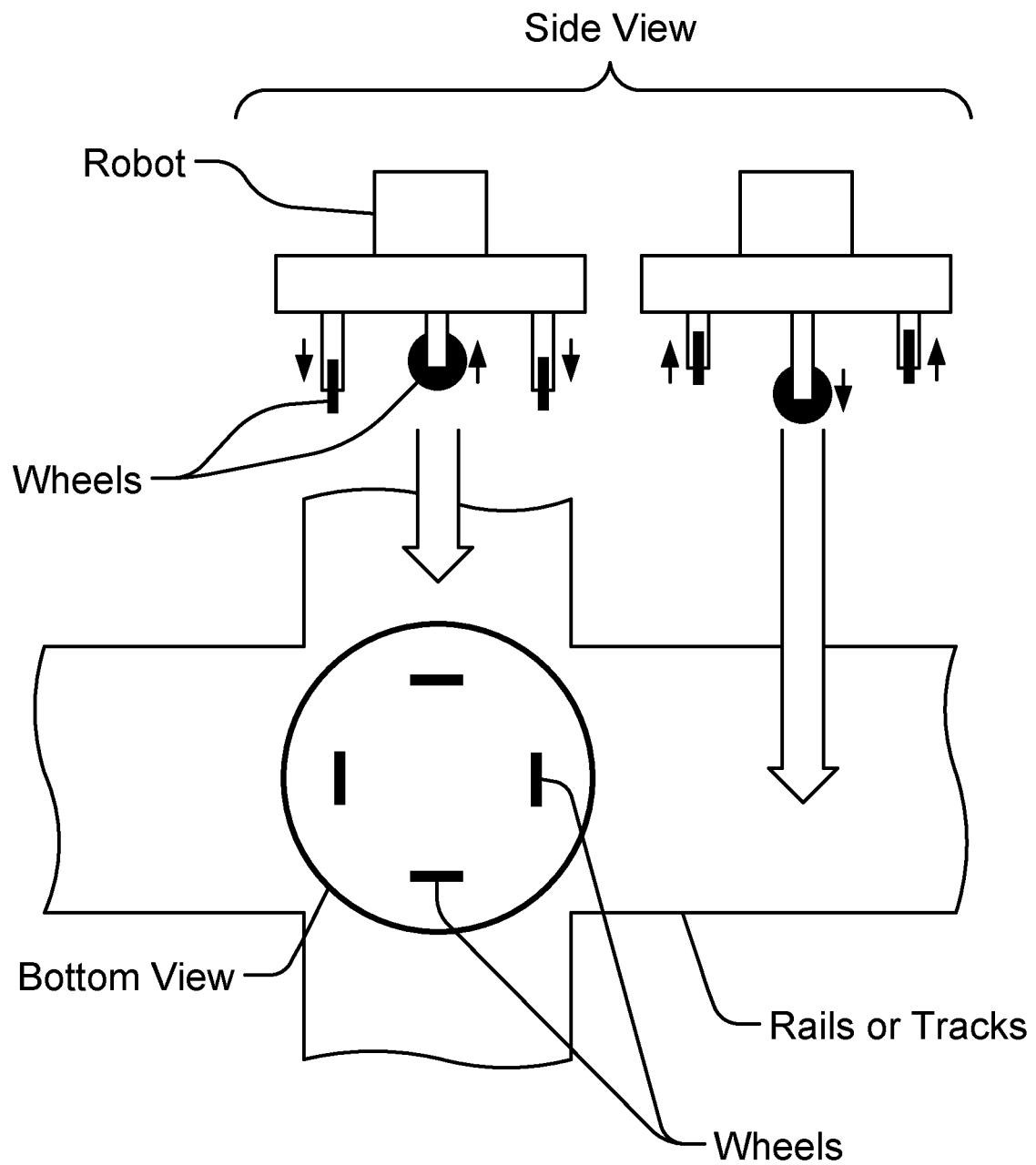
FIG. 7 shows changing directions on the tracks using different sets of wheels, engaged at different times, perpendicular to each other.

Alternatively, it can be done using different sets of wheels (e.g. 2, 4, 6, or more wheels) under the robot (e.g. fitted to rails or tracks) that can be brought up and down in the following manner: to get engaged with the tracks 90 degrees perpendicular to the current tracks (perpendicular-direction wheels brought down), and then to get disengaged from the current tracks (current wheels brought up). Then, the active wheels are working on the perpendicular direction (with respect to the original direction/tracks). Thus, the robot now moves in the perpendicular direction or tracks, as in FIG. 7. Alternatively, only one set of the wheels can be brought up/down, and for the other direction, the wheels can be fixed or stationary, in height. In one embodiment, there is a gear to change the direction of the robot in the reverse direction, on the same track, similar to a car or train or metro system.

Alternatively, it can be done using hinges on the wheel sets (to rotate them), or using a differential system at the curves for the pair of wheels on both sides (similar to those of the cars or trains or underground metros), or using ball-bearings (for low friction rotations), or a combination of those techniques.

Figure 4:
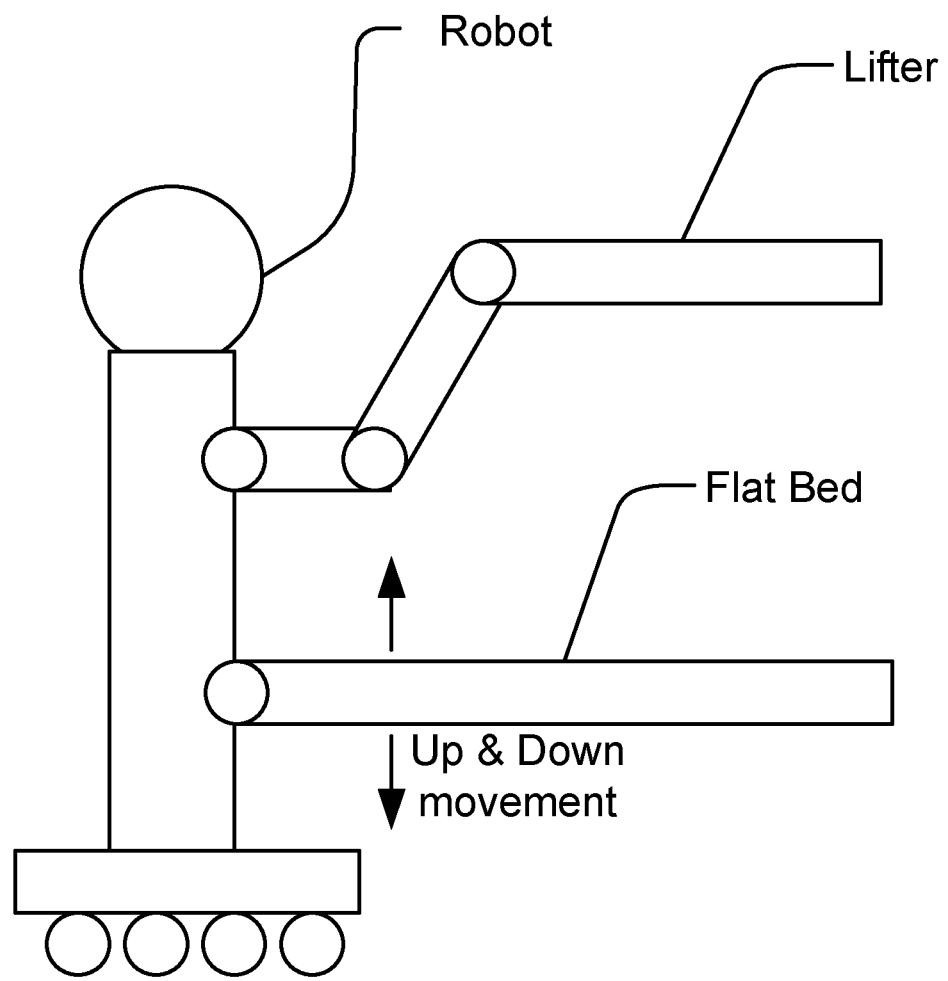
FIG. 4 shows flat bed carrier robot, with lifter or fork lift or blade.
Figure 5A:
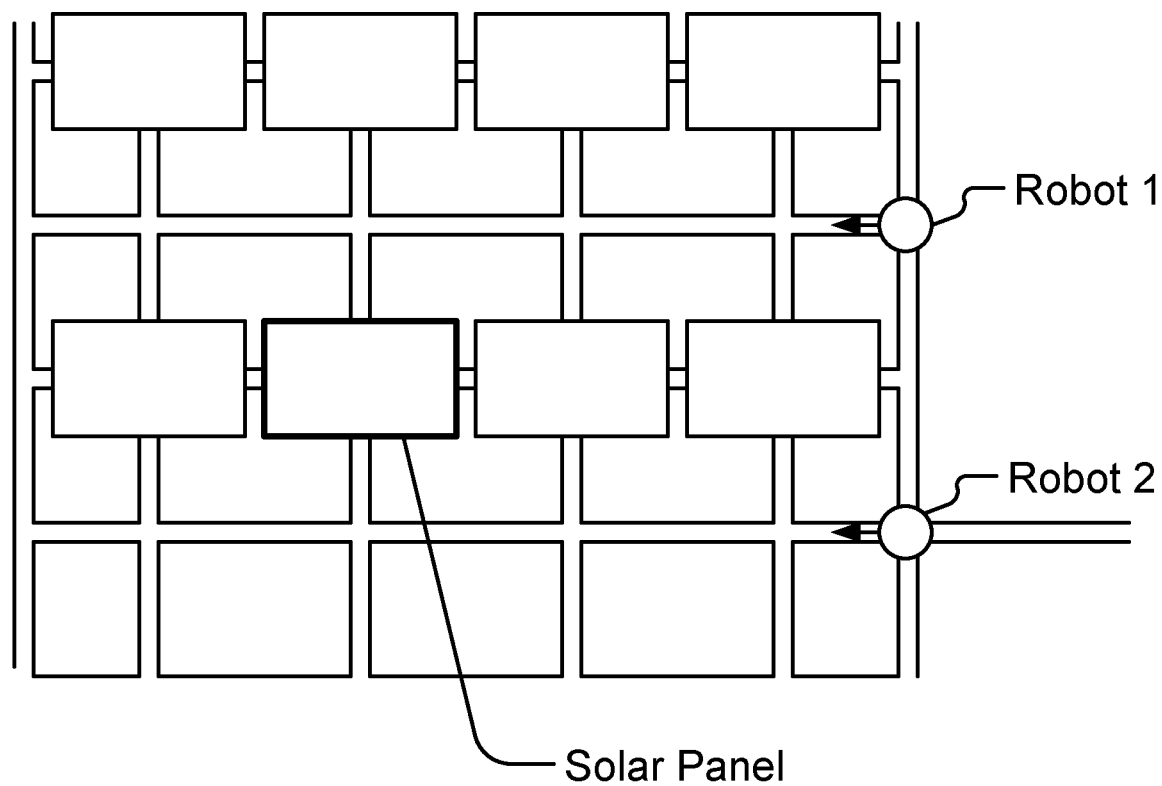
FIGS. 5a-f show robot(s) functioning different tasks and moving around in a solar farm, consisting of various tracks or rails in a matrix form.
Figure 5B:
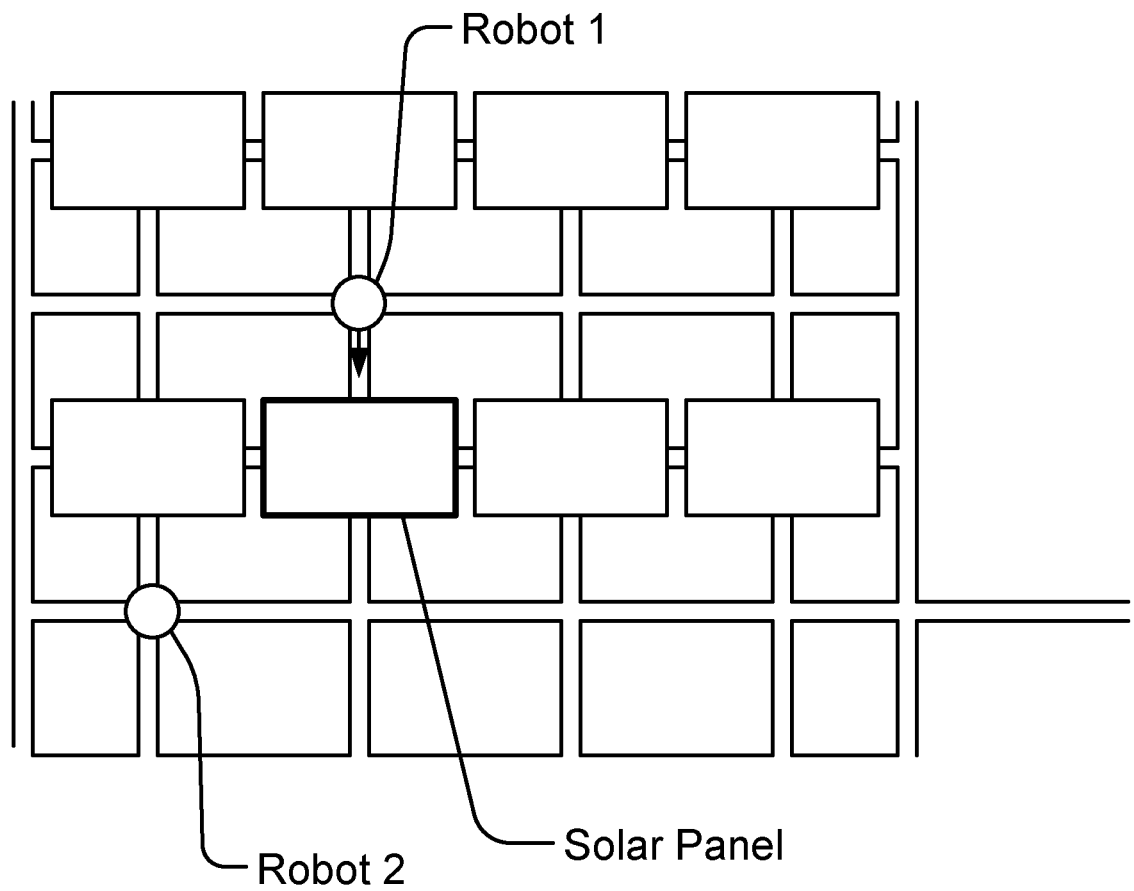
Figure 5C:
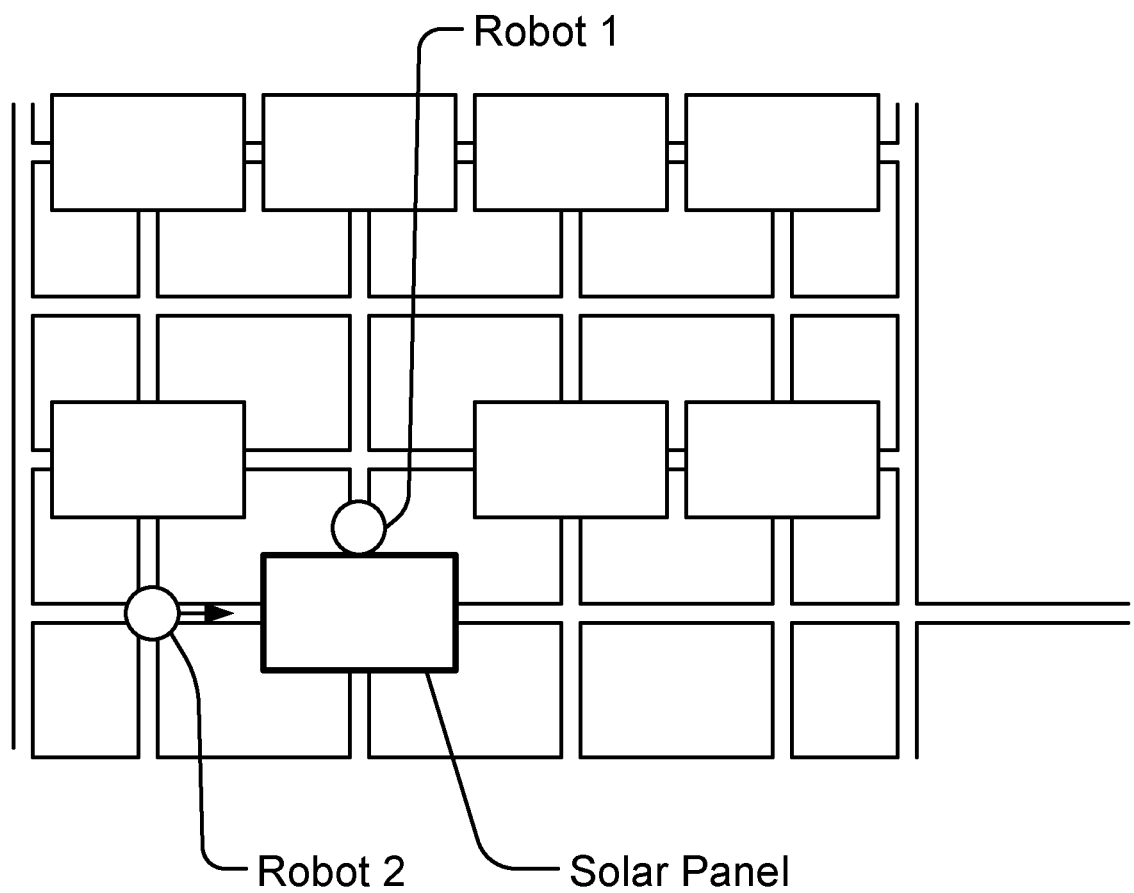
Figure 5D:
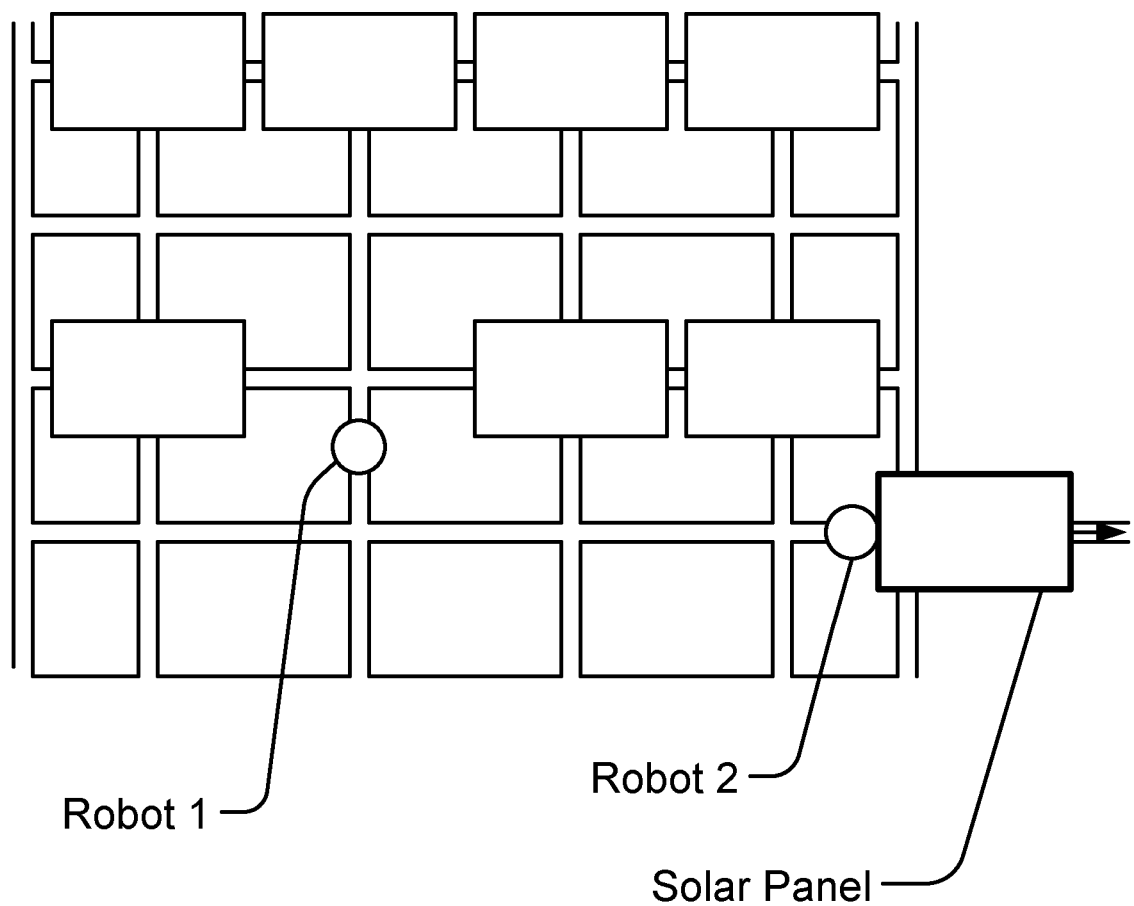
Figure 5E:
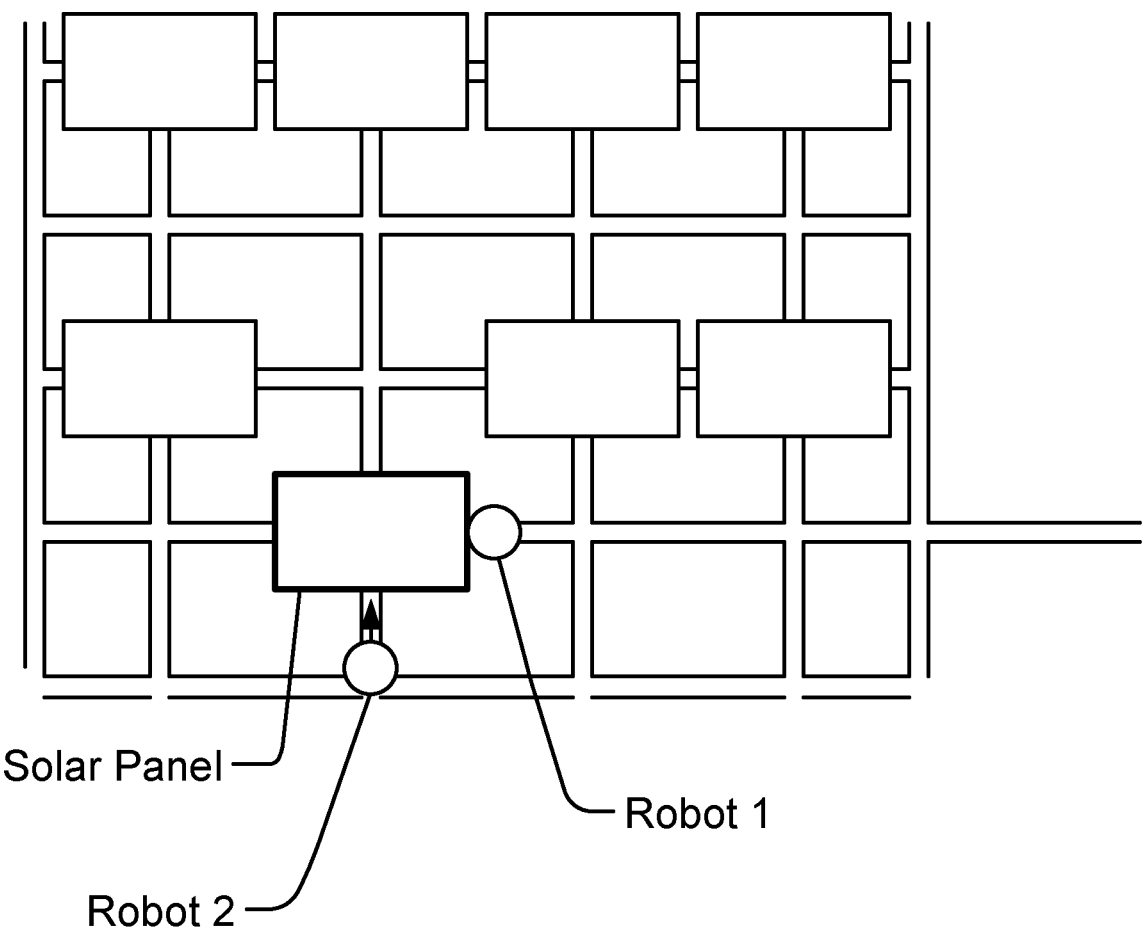
Figure 5F:
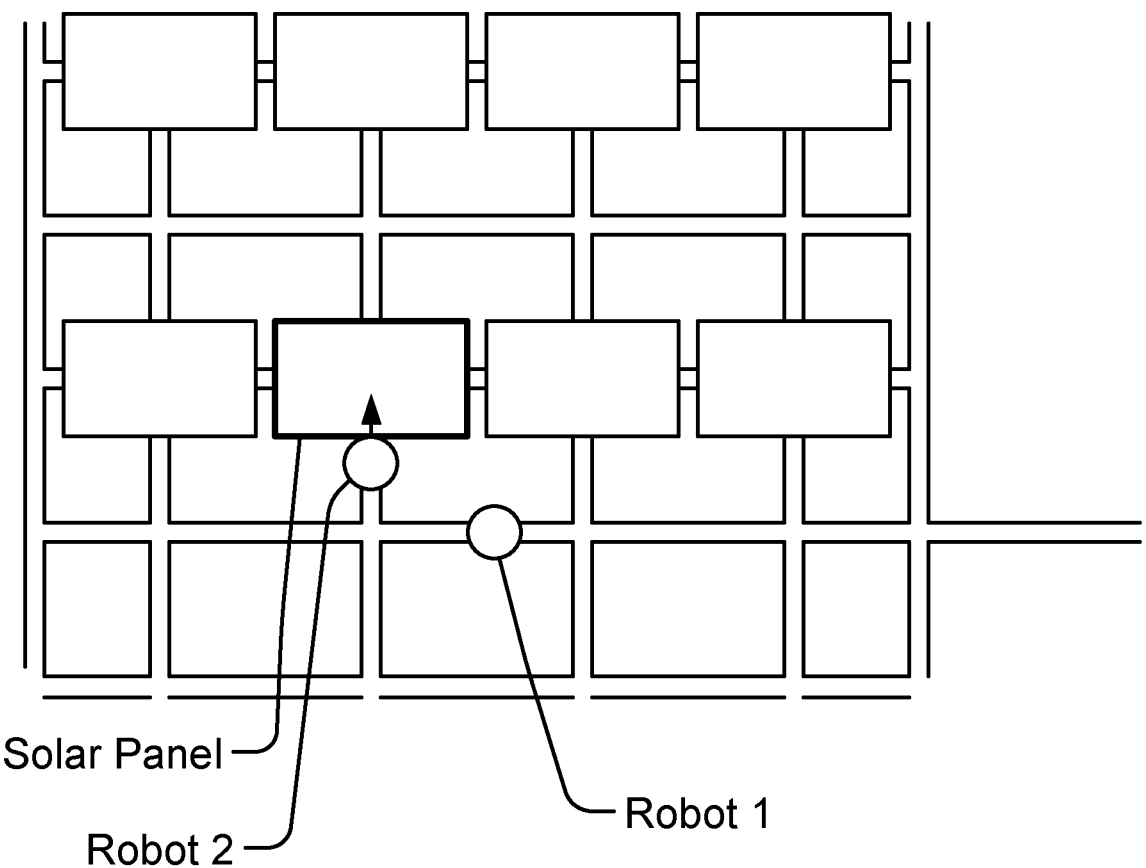

FIG. 4 shows a typical side view of the robot having a lifter and a flat-bed/tray, which is adjustable in terms of height, for the sequence of FIG. 3.

Figure 6:
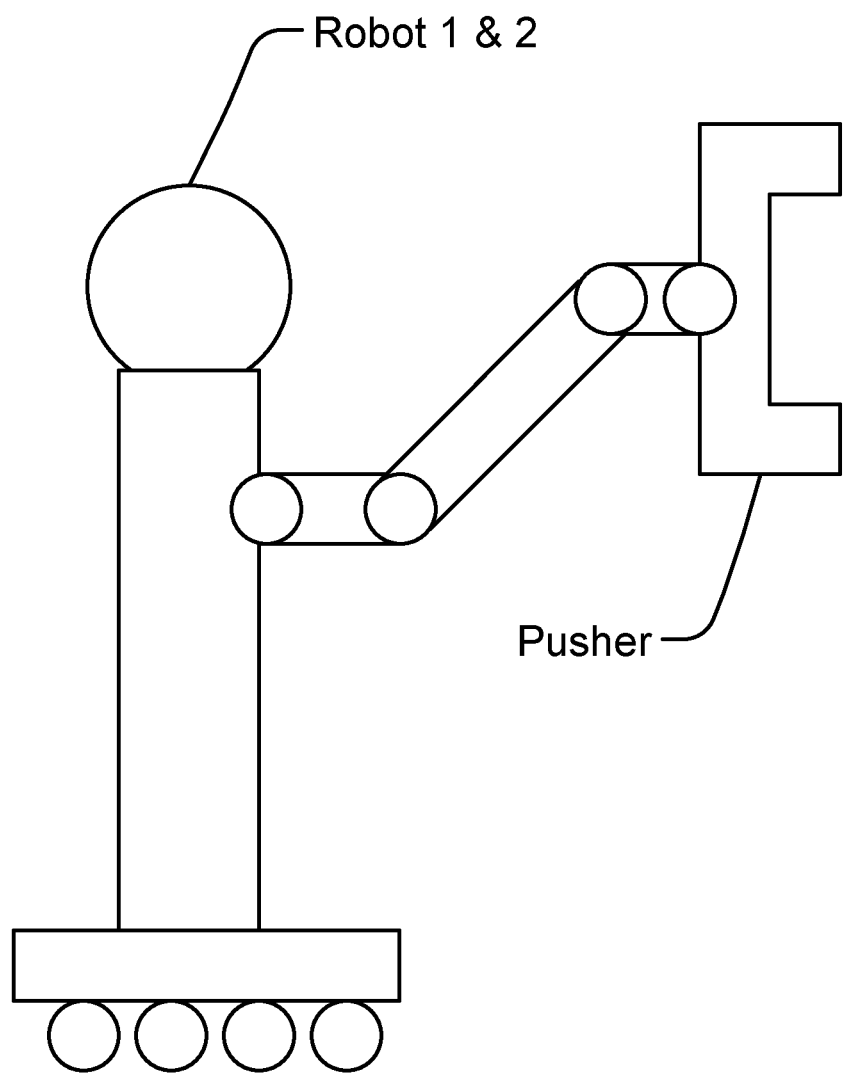
FIG. 6 shows the pusher robot.

FIG. 6 shows a pusher robot with a wide or narrow hand or frame or perpendicular tray or extensions or blade (similar to a bulldozer), on an arm(s), with optional hinges, for pushing/moving the panels (e.g. panels moving on wheels, on tracks), as shown in the sequence of FIG. 5 (for Robot 1 and Robot 2). FIGS. 5a-d show the removal sequence for an old/defective panel. FIGS. 5e-f show the placing or installing sequence of a new panel.

The rails and tracks and wheels are generally protected against the natural elements, such as water, sand, and ice, by having a cover on them, at least partially (such as FIG. 8), and having a gutter underneath, or holes, to move the water out of the railing system, as is conventional in the railing technology, e.g. for the protection of the high-voltage line/power lines for metro or train systems.

Figure 8:
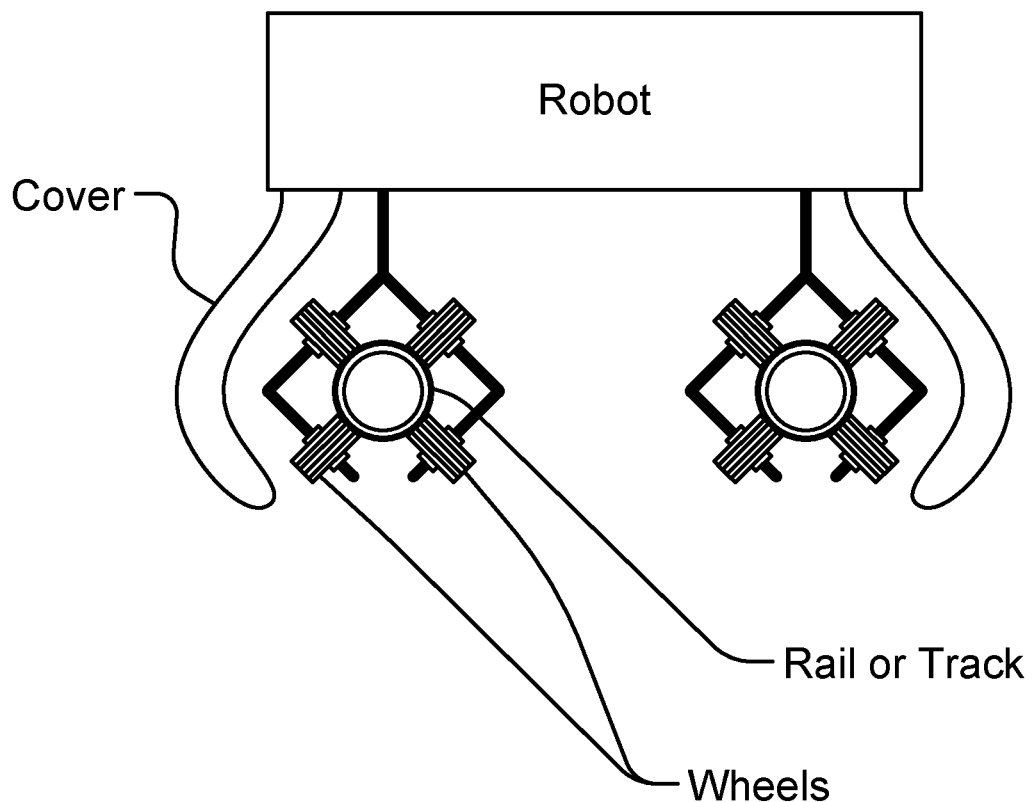
FIG. 8 shows wheels arrangements for rails or tracks or conduits, for robot movements.

FIG. 8 shows the 2 rails coming out of the page, perpendicular to page of the figure, and the wheels rotate on those rails, causing the robot to move on those rails. It also has an optional cover for a better protection of the rail system.

Figure 9:
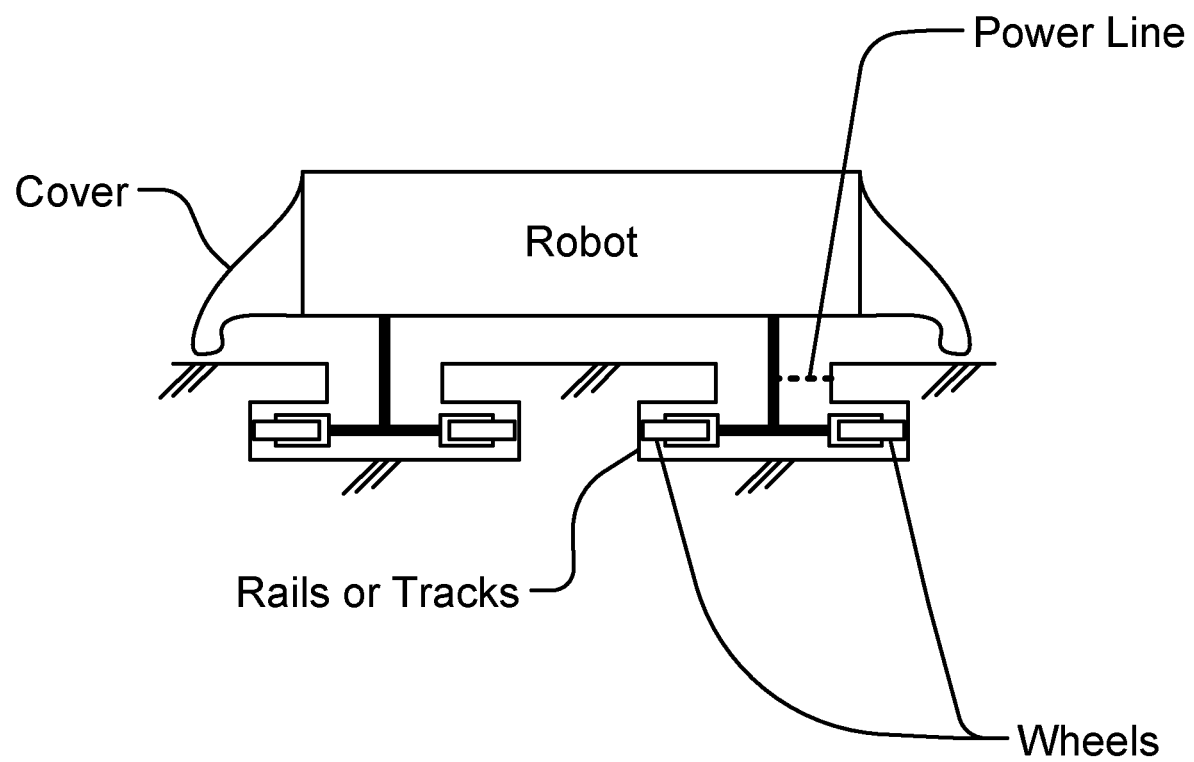
FIG. 9 shows wheels arrangements for rails or tracks or conduits, for robot movements.

FIG. 9 shows another rail system, with wheels situated horizontally. However, for better support, one can add a vertical wheel under the horizontal wheels, to hold the weight better. That vertical wheel can be on a hinge (or flexible connection), so that at the curved places, for rotation, e.g. at the corners, it can work properly, without breaking the wheels. The connection between the horizontal wheels can also be on a flexible basis, rather than a fixed rod, similar to the conventional car steering system, with differential system, for steering the vehicle, with one wheel moving much more than that of the other pair/wheel, without breaking the whole system under stress (of being asymmetric movement, between the pair of wheels). In one embodiment, there is an extra wheel for balance, to keep the robot on the track, and to prevent the fall of robot. In one embodiment, there is a gyroscope for adjusting the balance of the robot on tracks.

The power line can be fed through a cable or brush or broom or hook, on the side of the track, as shown in FIG. 9, very similar to the conventional power supply/connections for electric trains and subways/metros/undergrounds. In addition, a spring-loaded or telescopic-arm contact or brush can be used for electrical connections, e.g. for commands, data, or electrical connectivity, for inbound and outbound directions.

Figure 10:
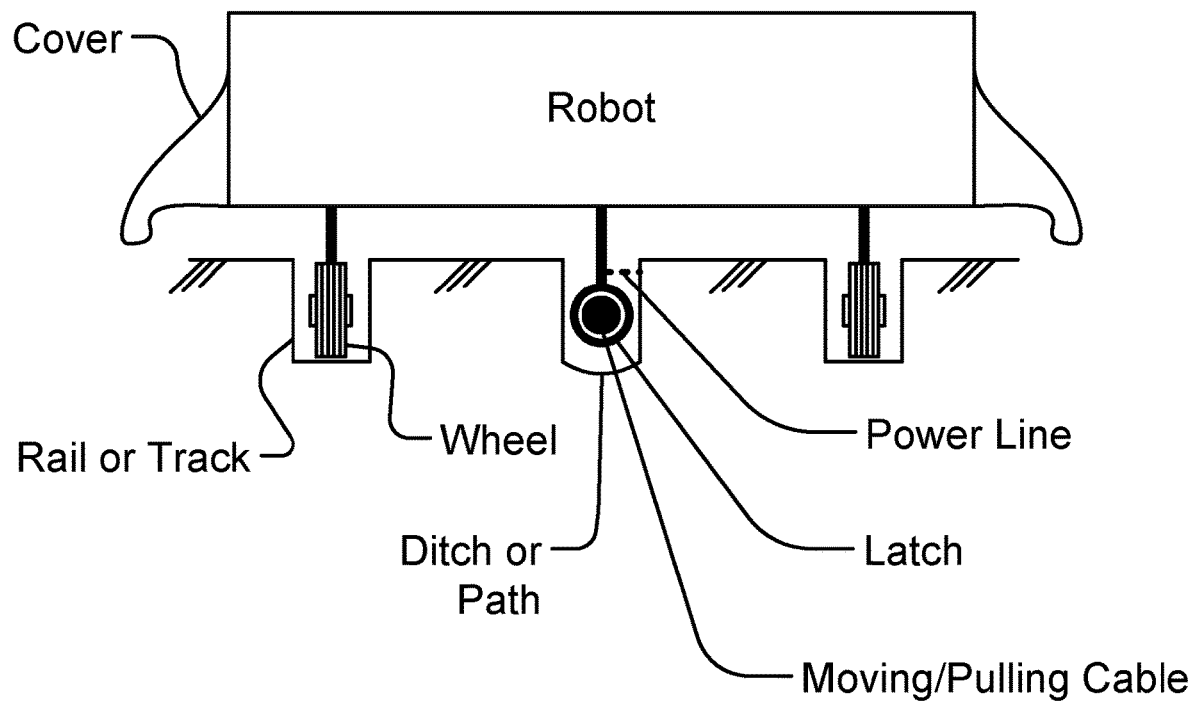
FIG. 10 shows wheels arrangements for rails or tracks or conduits, for robot movements.

FIG. 10 shows another system for rails, where a moving or pulling cable moves, and when a robot is done with its tasks and wants to move to another location or next panel, the robot can engage (attach itself to) (latch to) (or grip) the moving cable, to move to the desired location. Then, once it is getting close to the destination location, the robot disengages the moving cable, to stop at the desired location, by friction, or by applying a brake system.

Figure 11:
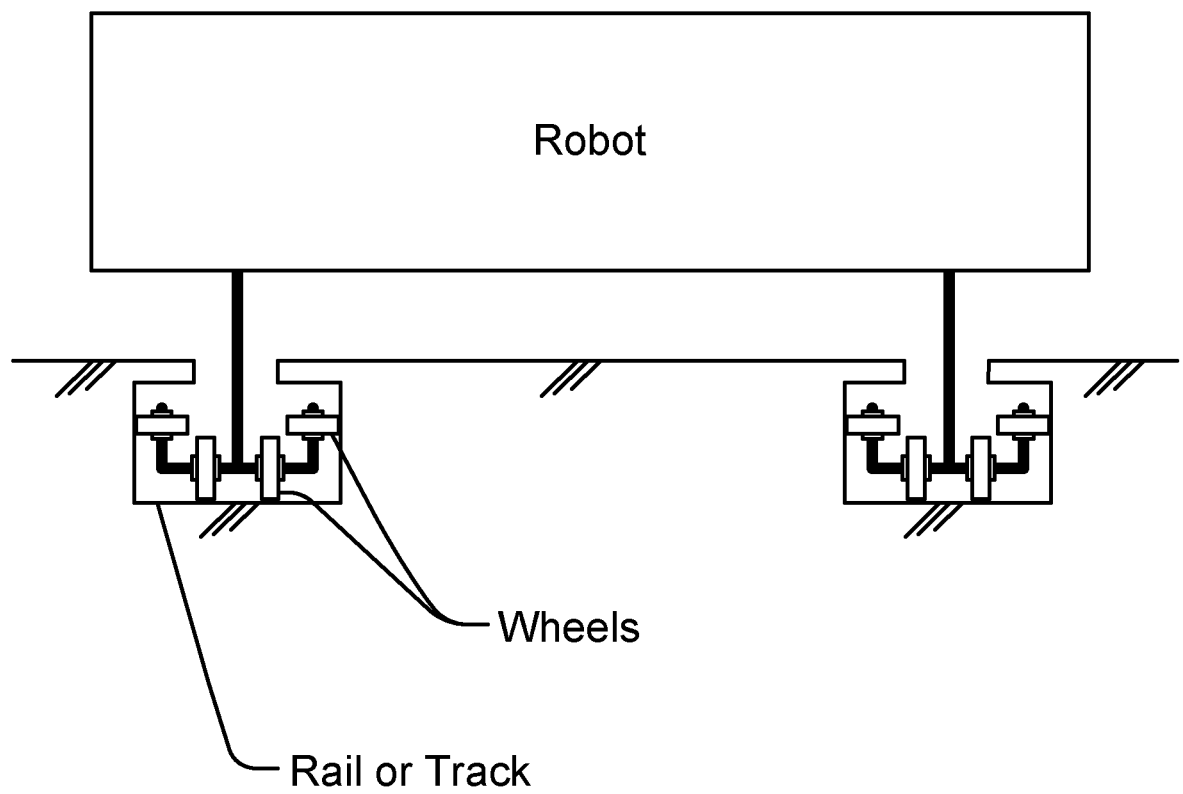
FIG. 11 shows wheels arrangements for rails or tracks or conduits, for robot movements.
Figure 12:
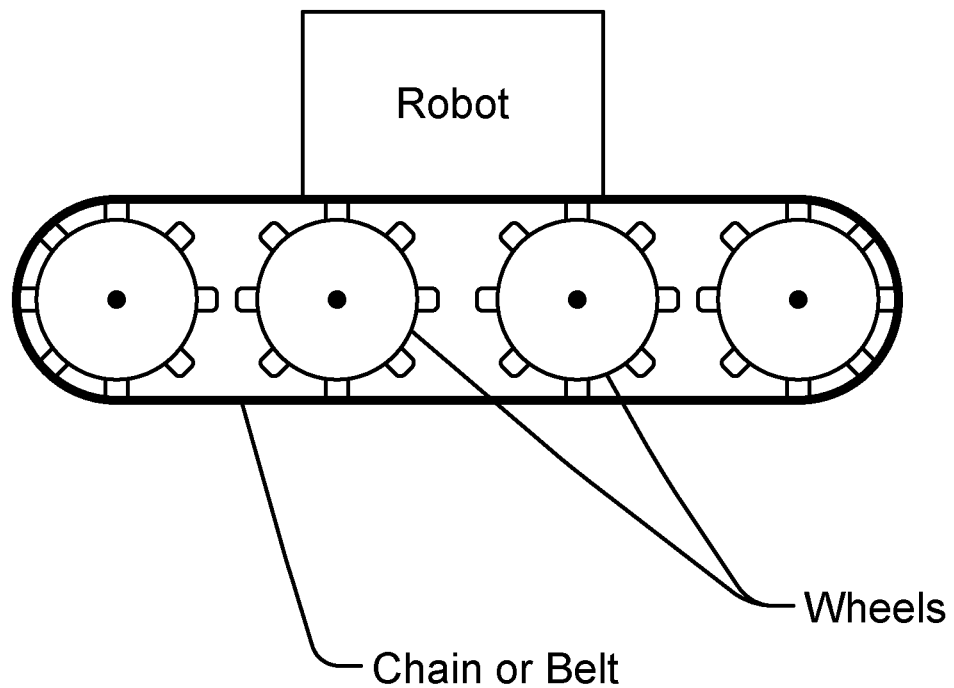
FIG. 12 shows a mechanism for robot movements, similar to a tank.

FIG. 11 shows another system for rails, with one pair of vertical and one pair of horizontal wheels on each side (per track). FIG. 12 shows another system without rails (free-movement robot) that employs the moving mechanism of a conventional tank or a bulldozer. Alternatively, the robot can move on 3-4 wheels, or more, similar to the conventional car or vehicle. Alternatively, the robot can move based on hovercraft mechanism, jet, gasoline engine, electric motor, or any other system conventionally used in the prior art.

In one embodiment, the robot puts a cover on the panels during/before sand storm or ice storm, for example, for protection, such as a plastic cover or heavy duty flexible material. The cover can be built-in, on the side of each panel structure/frame. Or, the cover can be carried by a protective robot, in its bag or container or basket, located inside, on top, bottom, or on side of a robot. The cover can be Venetian-type curtain or spring-loaded curtain. The cover can be opened/closed by HQ, by panel itself, or by robot intervention/help (or all of the above), using motor, spring, lever, air pressure, magnet, electrical coil magnet, or any similar methods.

Solar farm in this invention applies to the farms with panels for solar cells. Also, it applies to the solar heating panel farms (or solar heating sheets or containers or collectors or tanks or storages), which use liquid, water, or oil, to heat up and absorbs the Sun energy, to move a turbine or heat up a water tank for use of hot water, for water usage or heat up a house or room. All the teachings in this disclosure also apply to the mirror farms, in which the panels are huge mirrors for the reflection of the Sun, to concentrate on a small space for heating up a container. It also applies to any reflector surface farms, curved or flat, or mirror or lenses, metal or glass, or concentrator farms, with any types of surface, to absorb, direct, re-direct, or concentrate the Sun light, using semiconductor or direct heat/energy from photons/light (or from phonons, as lattice vibrations, due to heat, sound, or other energy sources, caused by Sun energy). In general, it applies to any farm or array of devices and panels, or in matrix form, in 1-D, 2-D, or 3-D arrangements, in any shape, even curved and non-rectangular, or circular, or symmetric, or irregular, using the power of Sun.

Figure 13:
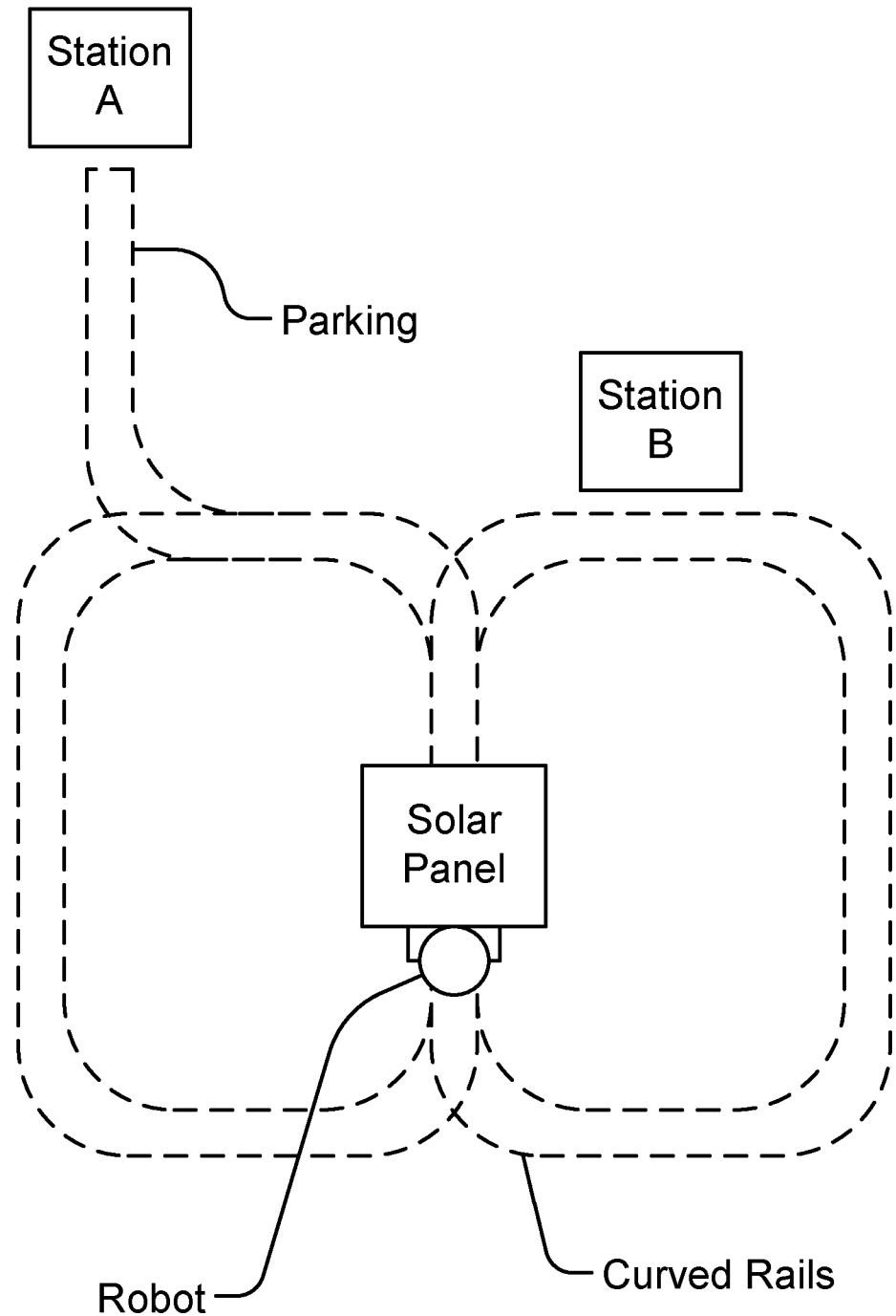
FIG. 13 shows rails or tracks or conduits or canals, for robot movements, with stations (e.g. for repair or supplies), multiple loops, and parking spaces, along the tracks.
Figure 14:
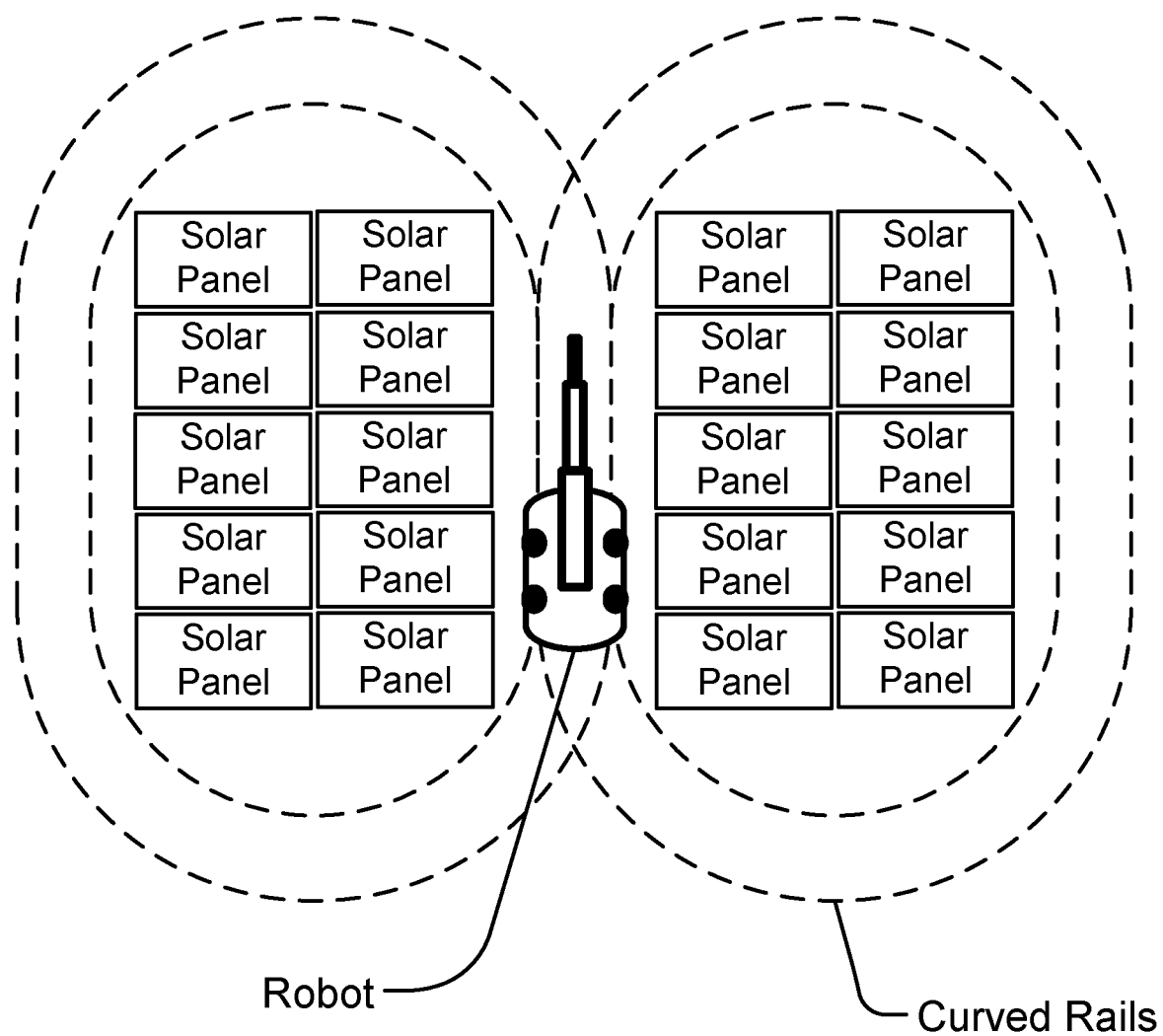
FIG. 14 shows rails or tracks or conduits or canals, for robot movements, around or between the panels.

In one embodiment, FIG. 13 shows another system for rails, in which a robot can go from one loop to another loop or subsystem, using a common track, e.g. to move solar panels, e.g. from the installation point to depot. It also shows a side track extension, for (or as) a parking space, to store the robots temporarily, or for multiple robots using the same track, moving in different directions, to be able to pass each other without collision. It also shows 2 stations near the tracks and near the parking space, as an example. FIG. 14 shows an arrangement of the loops, with a curved rail, which can be cascaded with many more loops, on each side.

Figure 15:
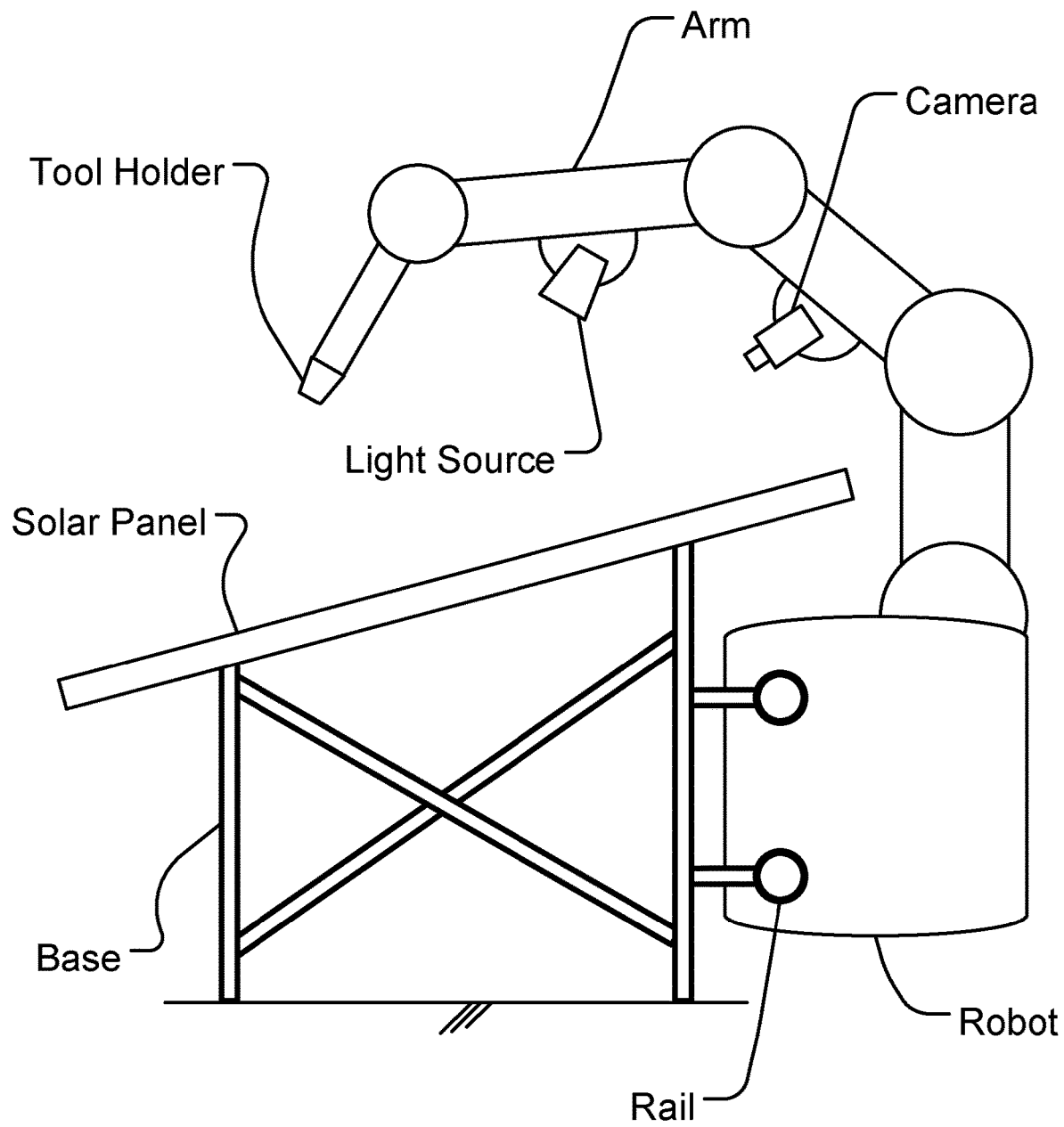
FIG. 15 shows a robot moving on a rail(s) near a panel, and/or working on a panel, performing tasks, assigned by HQ or central processor(s).

In one embodiment, FIG. 15 shows a robot which moves on a side rail, on the side of the panel structure, which has camera(s) and light source(s) (for example for night vision and repairs at night), plus one or more arms and tool holder(s), so that multiple functions are possible simultaneously, or one at a time. The tool handle can be added to the tool holder, which has multiple tips for various tools, e.g. different screw drivers. Tool holder can also function with tools directly, without tool handle, with tools from its own toolbox, or a toolbox at or near the rail, stations along the rail, or near/on a panel, e.g. as a box or container.

Figure 16A:
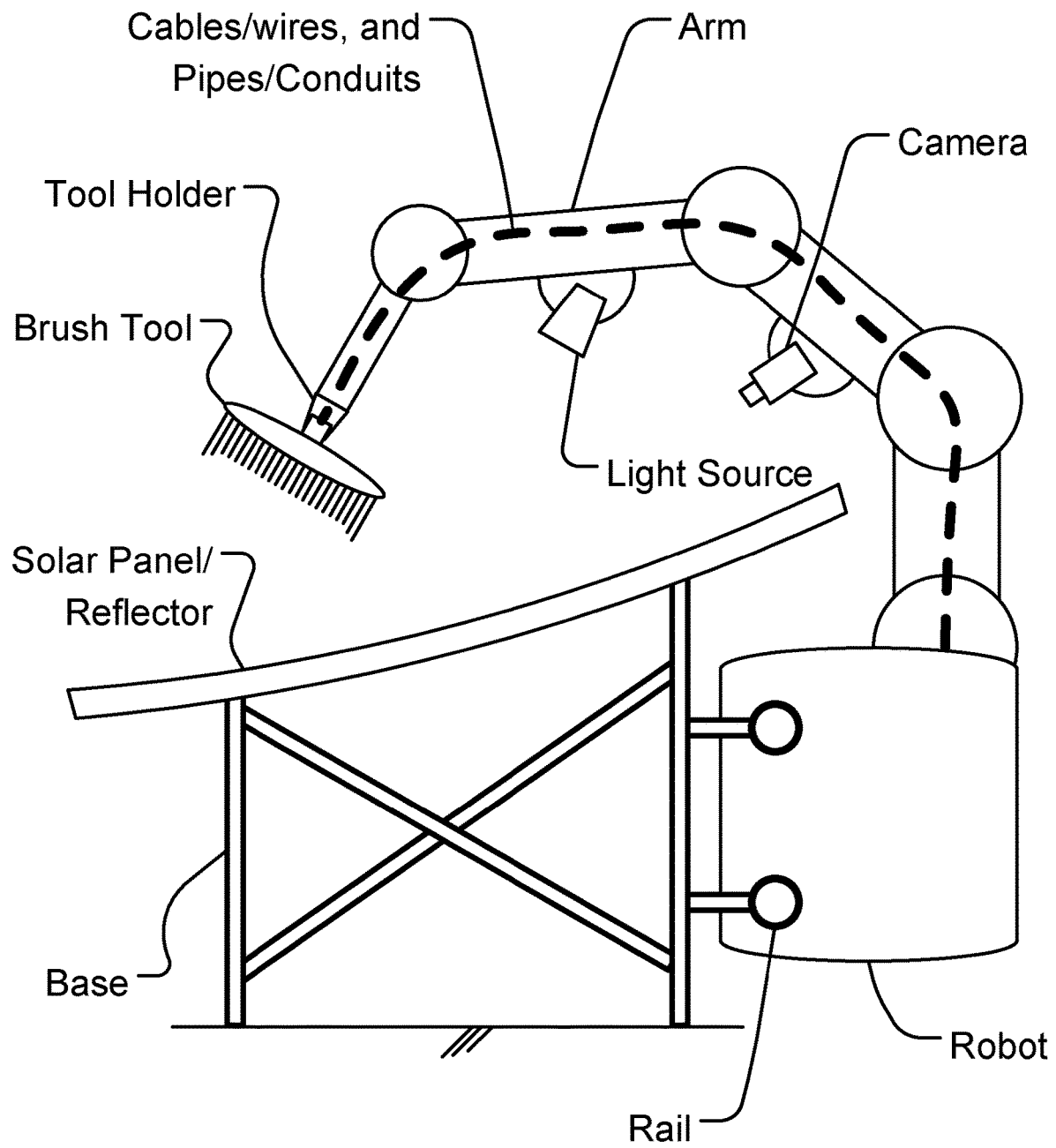
FIGS. 16a-c show a robot with a brush, on a curved panel.

In one embodiment, FIG. 16a shows a robot on the side rail, that includes cables, wires, pipes, or conduits, for control wires, power wires, air pump, air supply, vacuum suction, water jet, air jet (e.g. for the nozzle at the tip of the tool holder), soap, chemicals, cleaner liquid, and other material supply to the tip of the tool holder, e.g. for welding or sputtering or sand-blasting. In one embodiment, tool holder has an exchangeable tip, with different tools attached to the tip, such as brush, to be changed or installed by a human user, same robot, a machine at a station, or different robot. In one embodiment, tool holder has a fixed tip, e.g. with a single handle and a single tool attached permanently.

In one embodiment, the brush may have a tilt, curvature, multiple mini-brushes at different or flexible angles, or telescopic arm/extension, or flexible/spring-loaded plate(s), to be fitted on (hugging or leaning against or touching) the surface of the curved plane, panel, mirror, or lens.

In one embodiment, to change the tool tips, the robot puts its arm or tool tip into a hole (located at a station, or depot, or on another robot, or on itself), so that a jaw or hand grabs the tool, and a wrench disengages and separates the tool from the arm. Then, the robot withdraws its arm from the hole. Then, optionally, the robot puts its arm into another hole (located at a station, or depot, or on another robot, or on itself), and a wrench attaches a tool tip (which is a tool with no handle) to the robot's arm (or attaches a tool tip to the tool handle, which is attached to an arm of a robot). Then, optionally, the jaw (or hand or gripper or holder) that holds the tool tip (if any) will let go (opens its jaw), so that the robot arm can take the new tool tip and withdraw from the second hole. In some embodiments, there is no jaw to hold the tool tip, and the tool tip simply sits in a hole or horizontal cylindrical cavity, until it is picked up by a robot arm, as described above.

In one embodiment, to change the tool tips, the robot has 2 or more arms, or alternatively, uses an arm of another robot, to grab and engage/disengage (attach/separate) the tool tips. Alternatively, the second or extra arms or hands are coming from a machine located at a depot or station or near a panel or near rails.

Figure 16B:
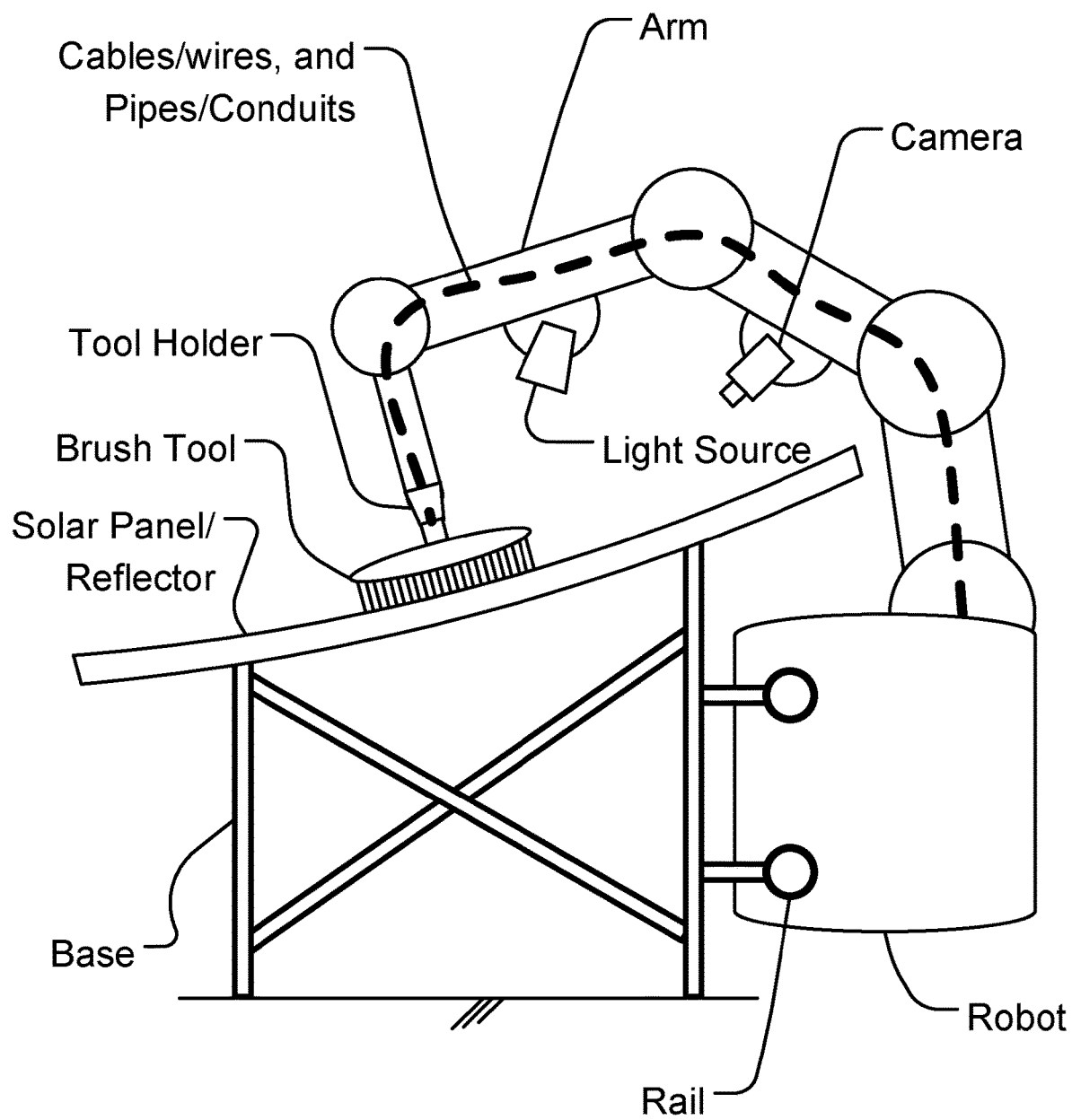

In one embodiment, FIG. 16b shows a robot in action/cleaning, which is monitored in real-time or on-spot, using a camera connected to HQ, with a light illuminating the panel for inspection, analyzing the images at HQ, for pattern recognition or surface analysis, to stop the cleaning or do more, depending the quality (status) of the surface, if needed, based on some threshold or range of cleanliness, as a number, percentage, or parameter for quantization of surface status. The brush can have a sensor, e.g. on the back, such as using piezoelectric sensor, to measure pressure, for adjustment of the force behind the arm/brush, for good attachment to the surface, without too much force, as a feedback, to prevent damage to the brush or robot or panel.

Figure 16C:
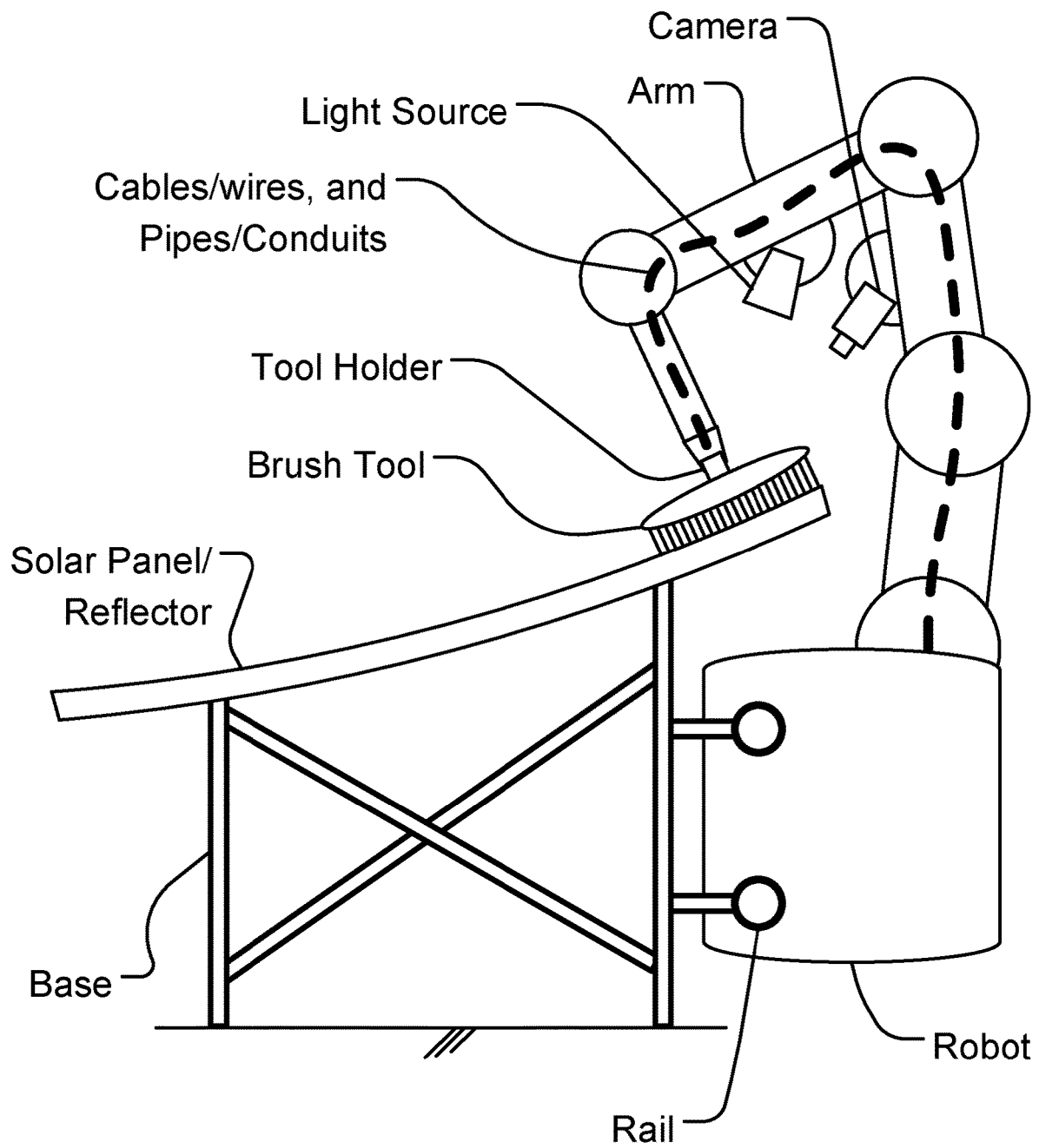

In one embodiment, FIG. 16c shows a robot in action/cleaning, up to an edge, so that it stops at that point or line or boundary, due to a beacon, flag, marker, or mechanical barrier, using pressure sensor, switches (similar to toy cars, bumping to objects, and reversing their directions), light sensors (similar to the garage door openers), or cameras (for digital images or pattern recognitions). Alternatively, it can be done using the already-known dimensions of the panel, to limit the movements of the brush or arm of the robot accordingly, with respect to angle or size of the ranges for the arm or brush movements.

Figure 17:
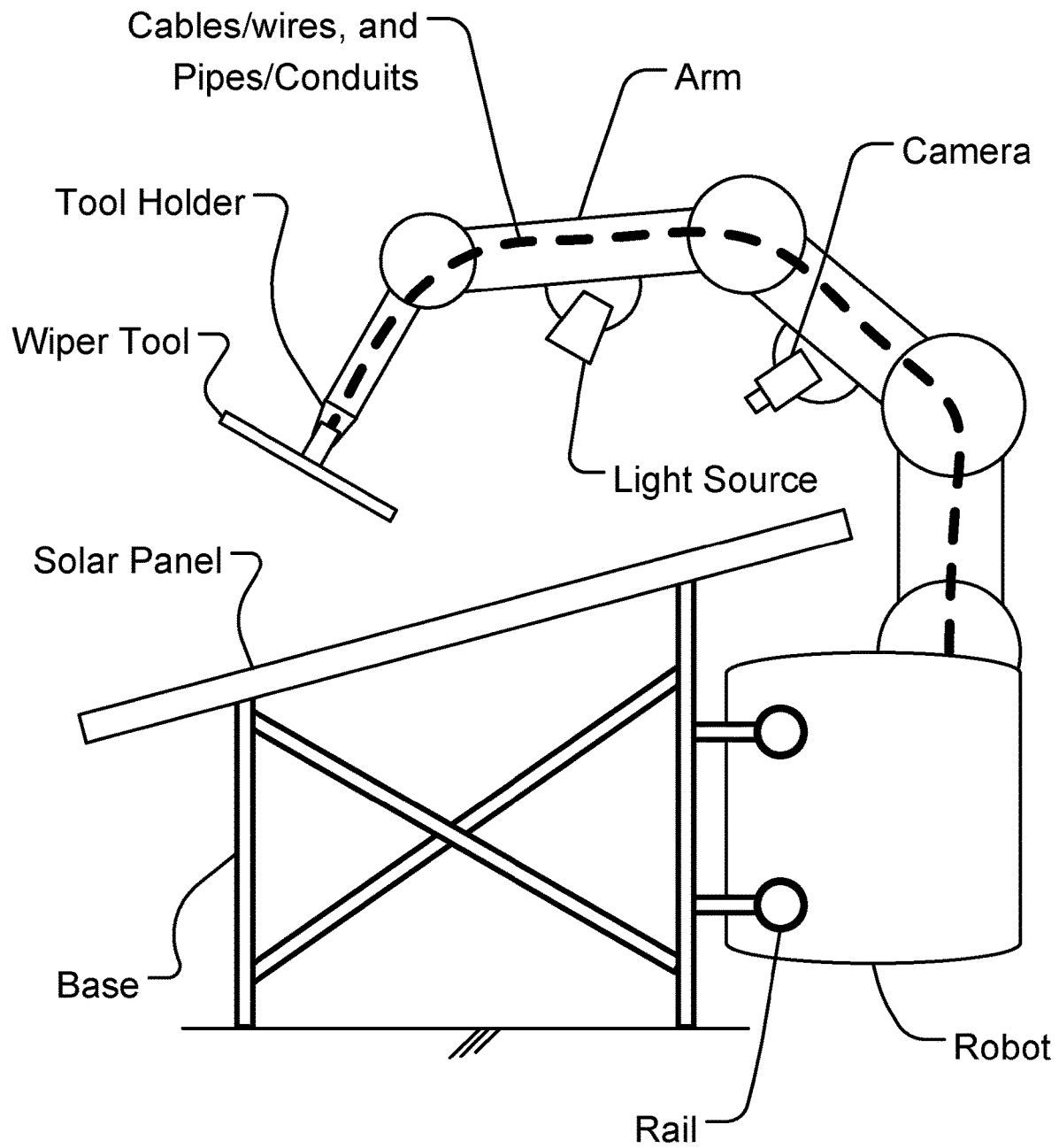
FIG. 17 shows a robot with a wiper tool.
Figure 18A:
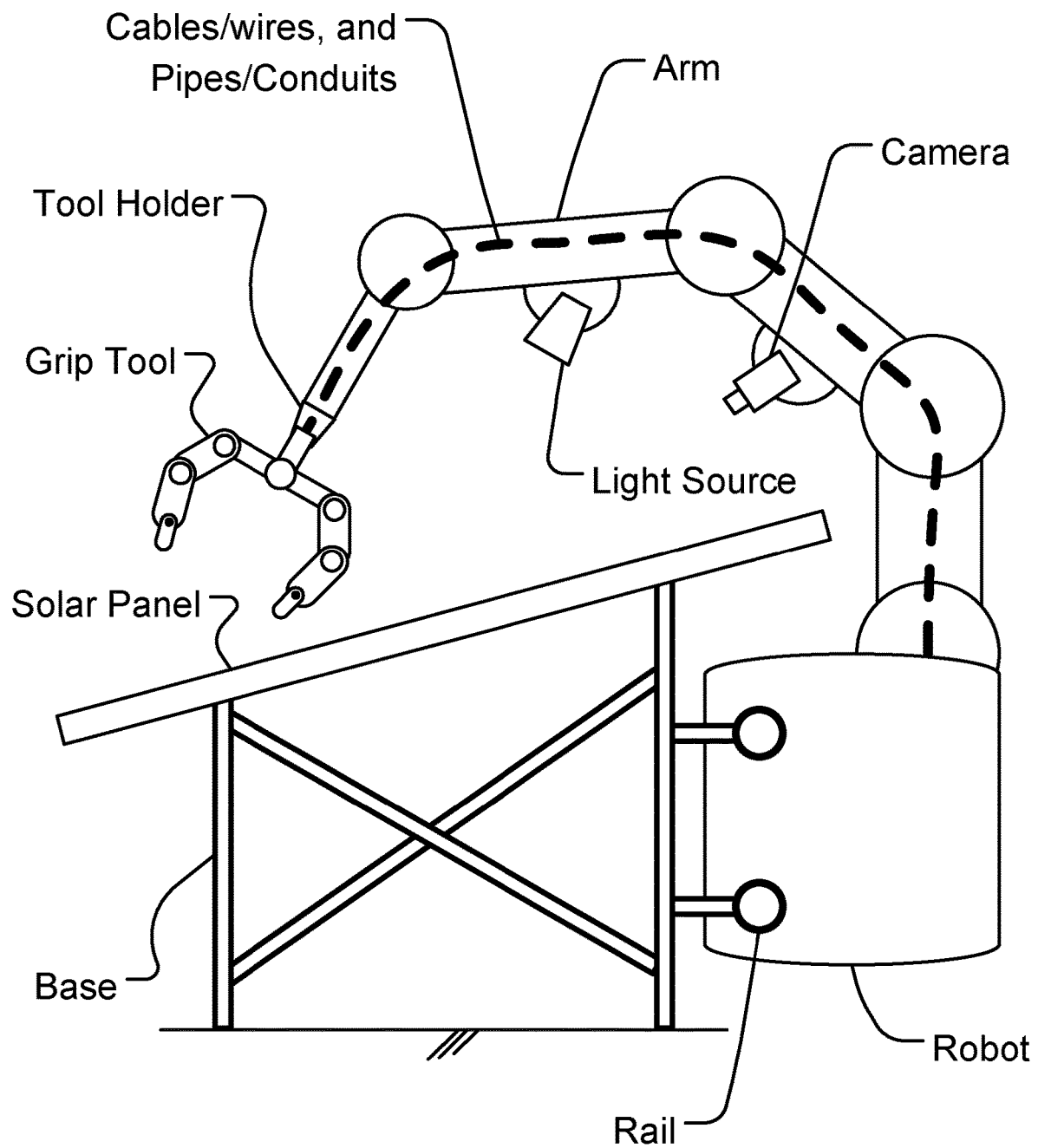
FIGS. 18a-b show a robot with a grip tool, fingers, holder, clamp, or hand.
Figure 18B:
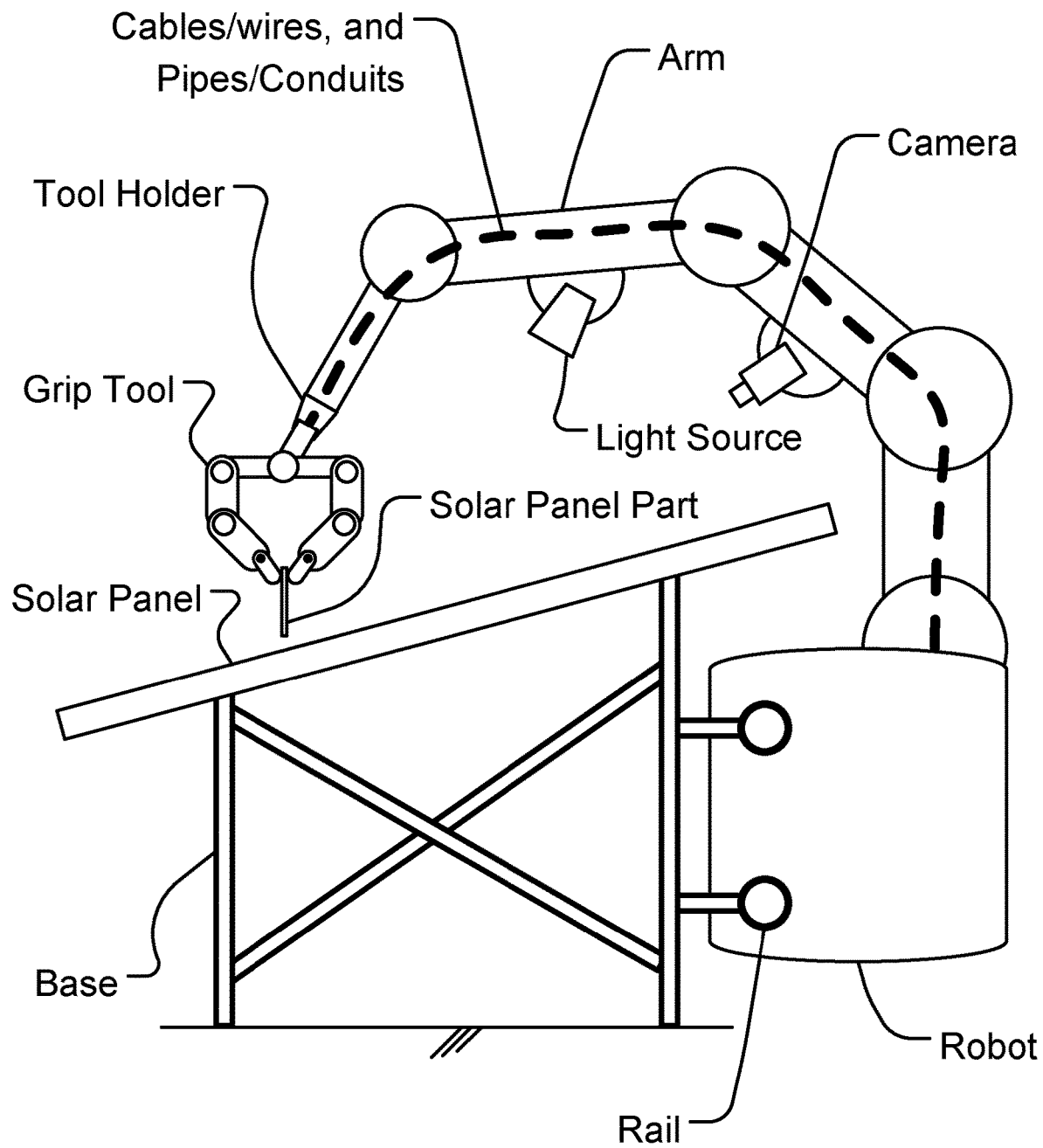

In one embodiment, FIG. 17 shows a robot in action/cleaning, using a wiper tool, such as those on windshield wipers. In one embodiment, FIGS. 18a-b show a robot in action/grabbing, using a grip tool or fingers or vice grip or hand or clamp or jaws, to (e.g.) remove or put or replace a part or component on the panel, for repair purposes.

In one embodiment, the robot is not on a track or rail. Instead, it is on 2 or more wheels (or using wheel/chain combination, belt/wheel combination, horizontal cylindrical roller, ball-roller mechanism, or bulldozer or tank moving mechanism), moving through the solar farm for different tasks, without railing. The movement of the robot is based on, e.g.: (1) a pattern (for the routes it uses, on the ground of the farm, e.g. using a GPS/global positioning system, or marker/flags around/along the routes) instructed from HQ, or (2) direct vision/camera and pattern recognition to analyze and recognize objects, targets, panels, routes, and landmarks to perform its tasks, or (3) using markers or dots or color/paints, on the floor of the farm/ground, as a guide for a camera or detector, to follow the marker, to go from point A to point B in the farm, for different panels, for different tasks, assigned or scheduled by HQ or other processors.

Figure 19A:
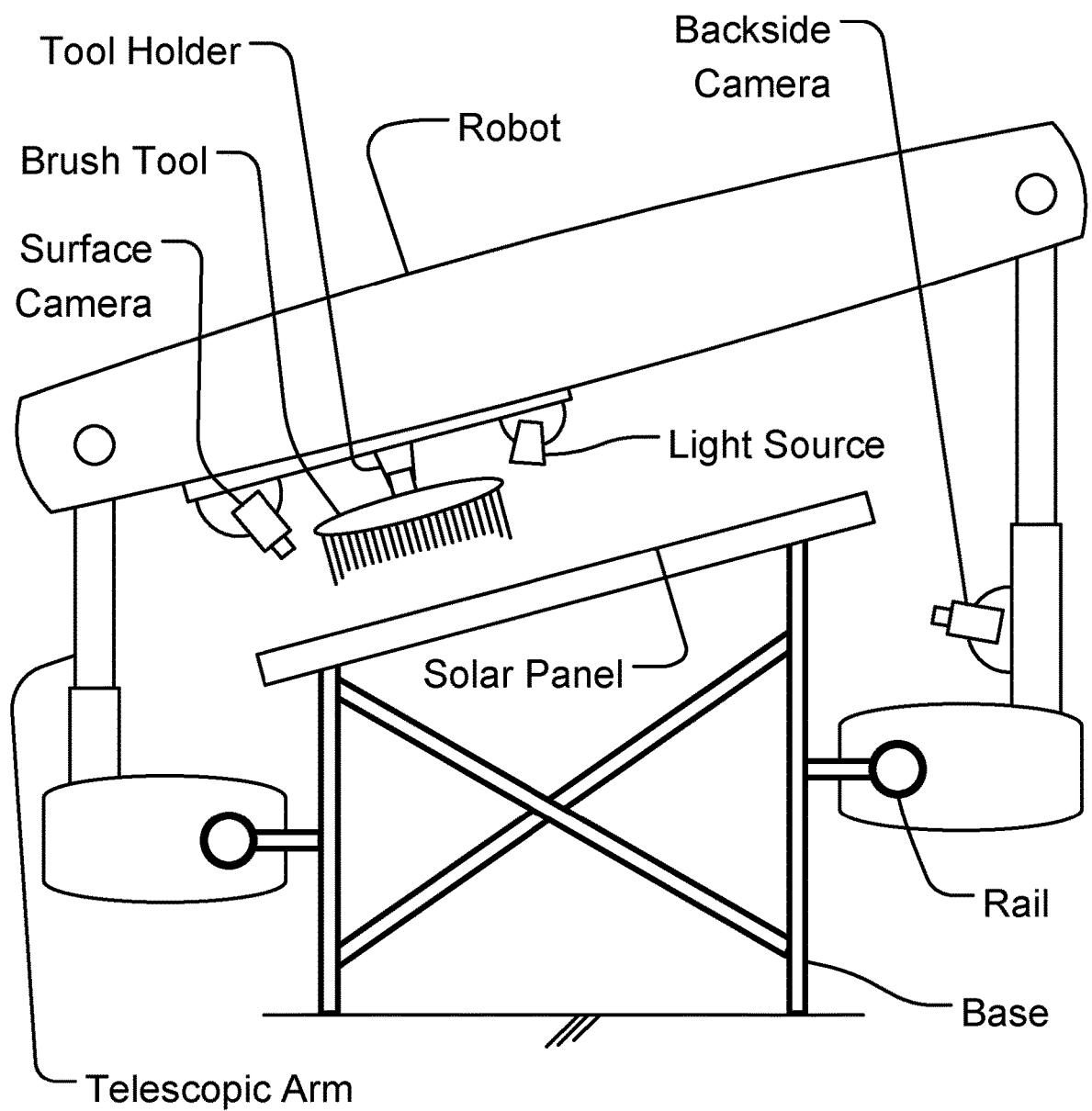
FIGS. 19a-c show a robot with rails on different sides of a panel, functioning with different tools or tool heads/tips or arms or tool handles.

In one embodiment, FIG. 19a shows a robot on 2 rails on 2 sides of the panel, going from panel to panel, with multiple cameras for various position inspections, and multiple lights/flashes/flood lights/LEDs/Halogen lamps/fluorescent lamps, at different wavelengths for various illuminations at different times of the day, and various sensors or detectors, such as for X-ray or backscattering or photomultipliers or photodetectors, to measure or detect or distinguish parts, thresholds, optical characteristics, parameters, problems, dirt, ice, or defects, for the panel or surface or devices or farm or whole system or tracks. The robot has 2 or more telescopic arms (e.g. hydraulic or pump or motor or chain-driven) to move the robot up and down with respect to the panel to do various tasks, or change the angle of the robot with respect to the plane of the panel to do various tasks, for maneuverability, e.g. for big tools.

Figure 19B:
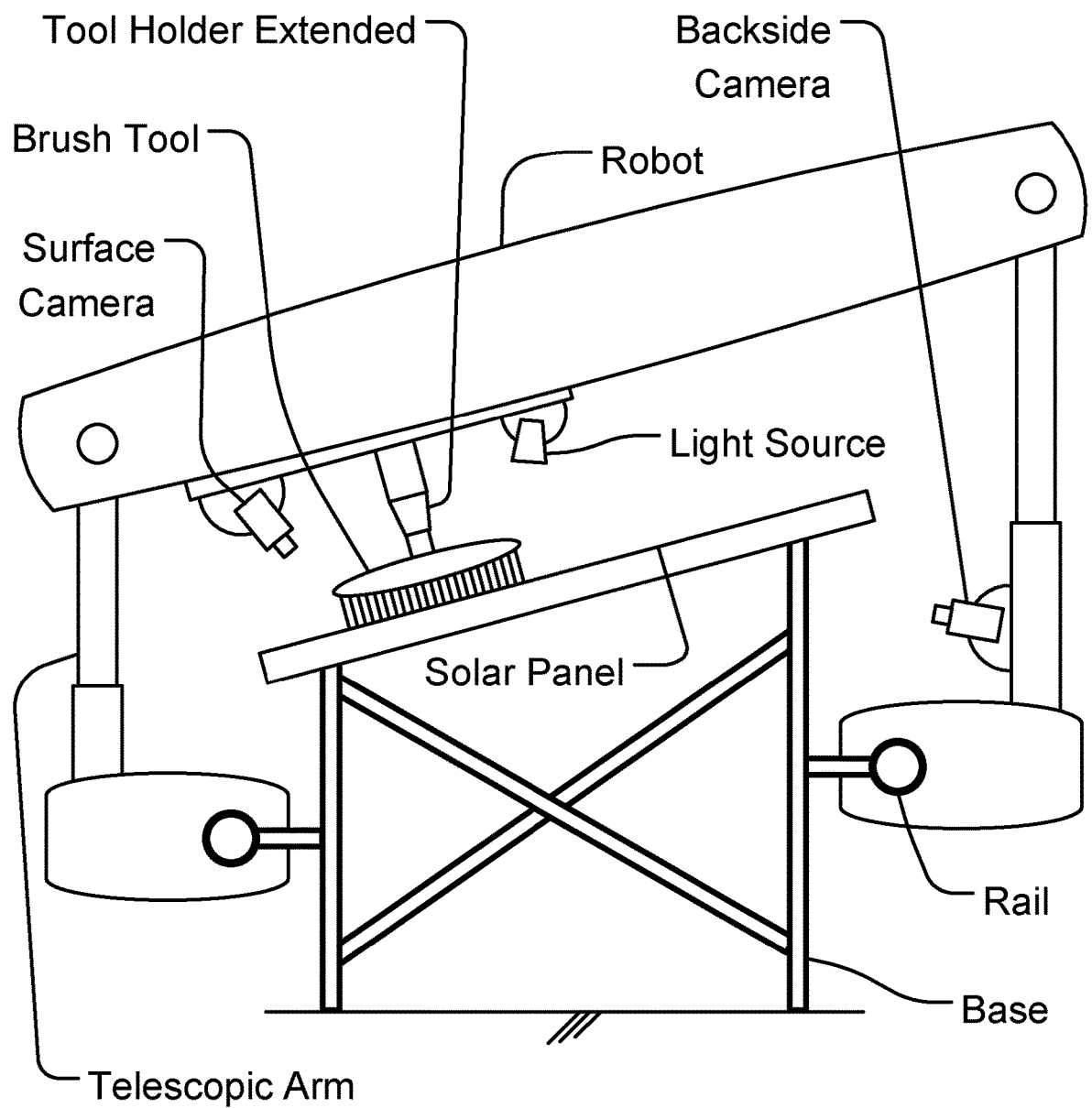
Figure 19C:
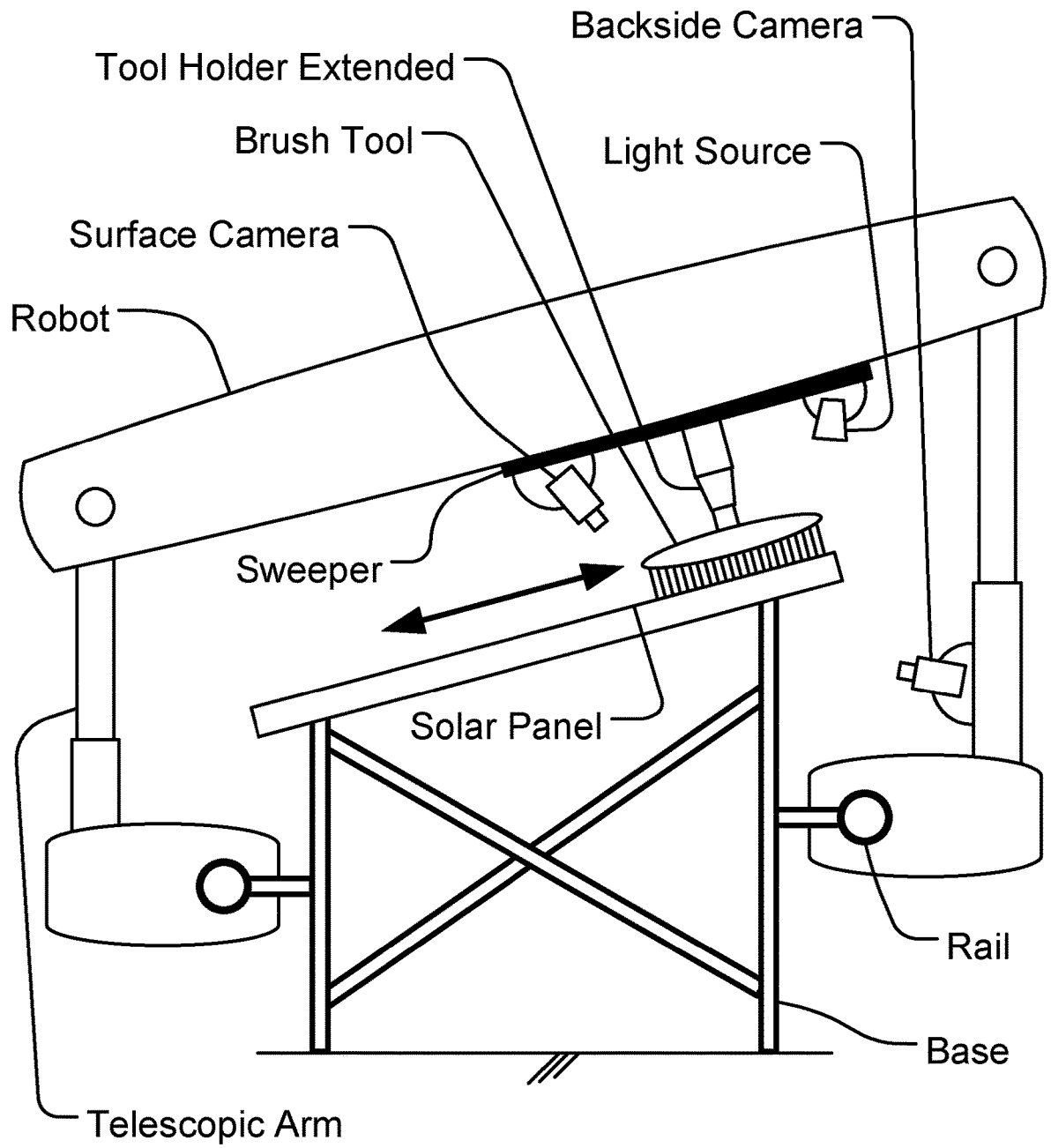

In one embodiment, FIG. 19b shows the robot in action. FIG. 19c shows that the whole assembly for camera or tools can be installed on a rail on a robot, to move and scan or sweep or cover one range/area, such as a sweeper, in 3 different directions, as 3-D movements/axes, in Cartesian coordinates, or using/changing angles of rotations and radius of rotations in cylindrical or spherical coordinates, such as a telescopic structure or extension or antenna for changing radius, with a ball at the base as a hinge for changing angle in 3-D space, as is well-known in the art.

Figure 20A:
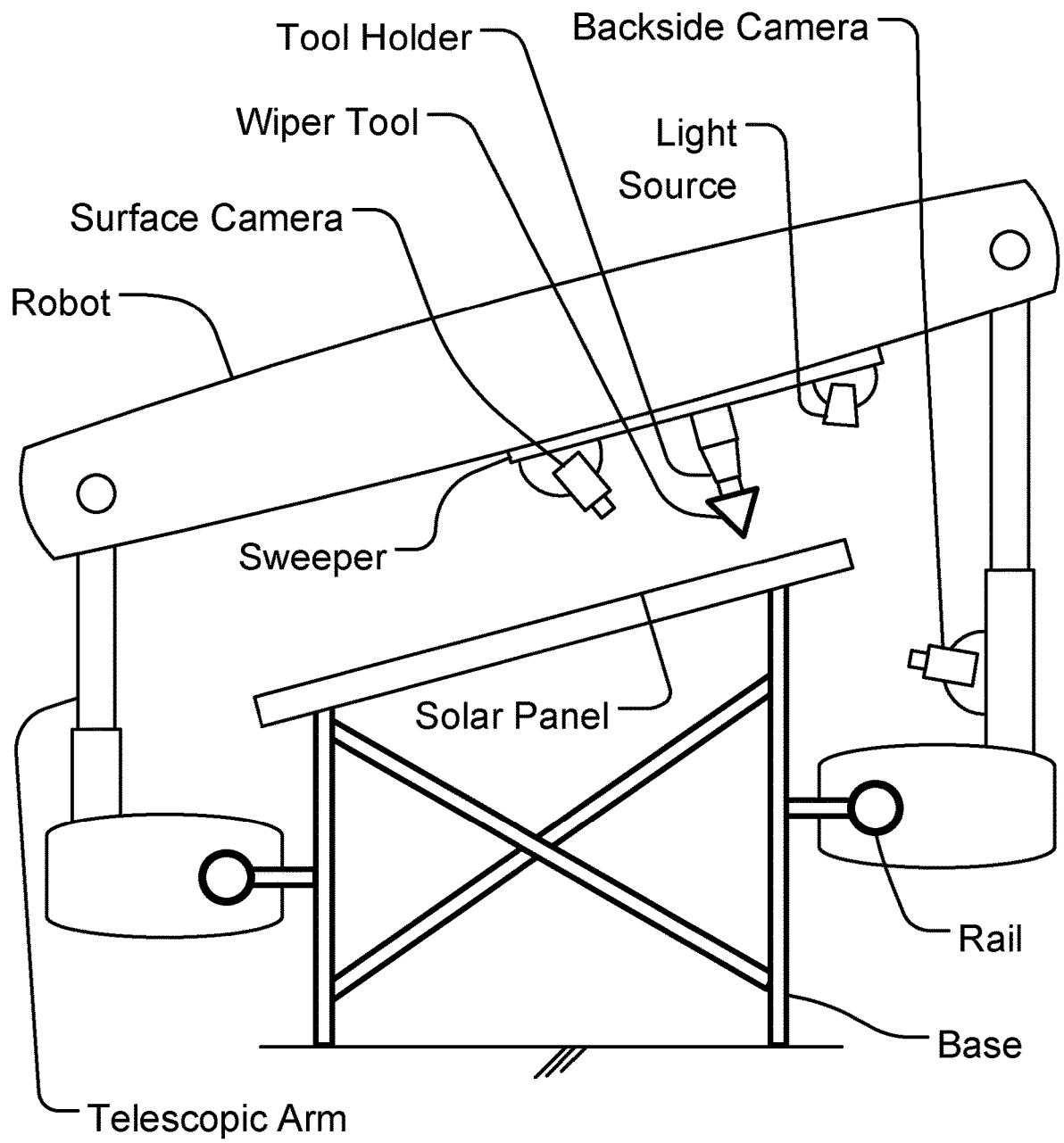
FIGS. 20a-b show a robot with a moveable section/sweeper, with respect to the body/trunk/main section of the robot, sweeping across the panel, to cover all areas on the panel, functioning on its tasks, with its tool(s).
Figure 20B:
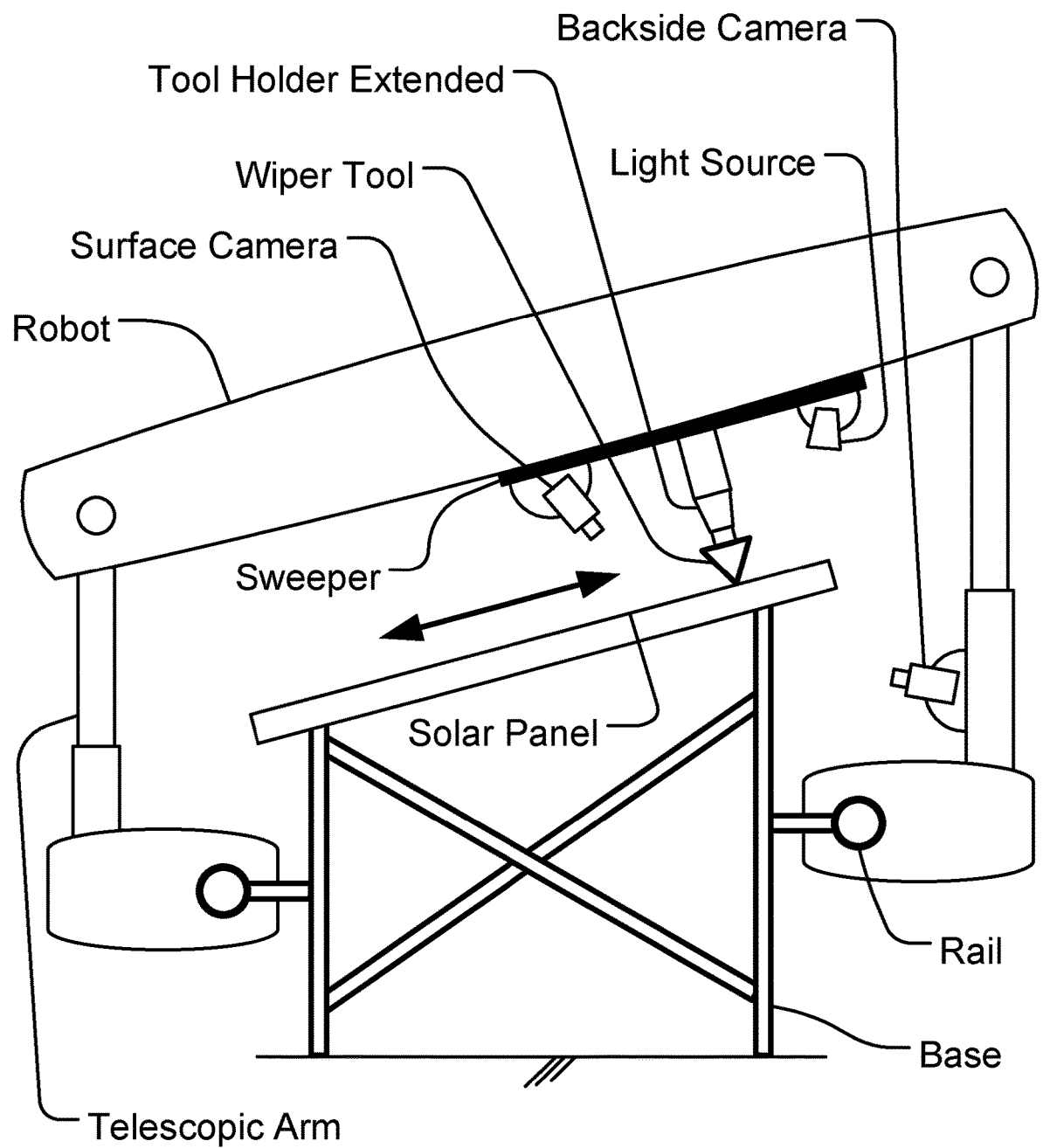

In one embodiment, FIG. 20a shows the robot in action, with a wiper (tool tip) attached to a tool handle or holder, for cleaning purposes or de-icing the surface/panel. In one embodiment, FIG. 20b shows the tool holder extended for performing the task, as needed on some parts of the surface.

Figure 21A:
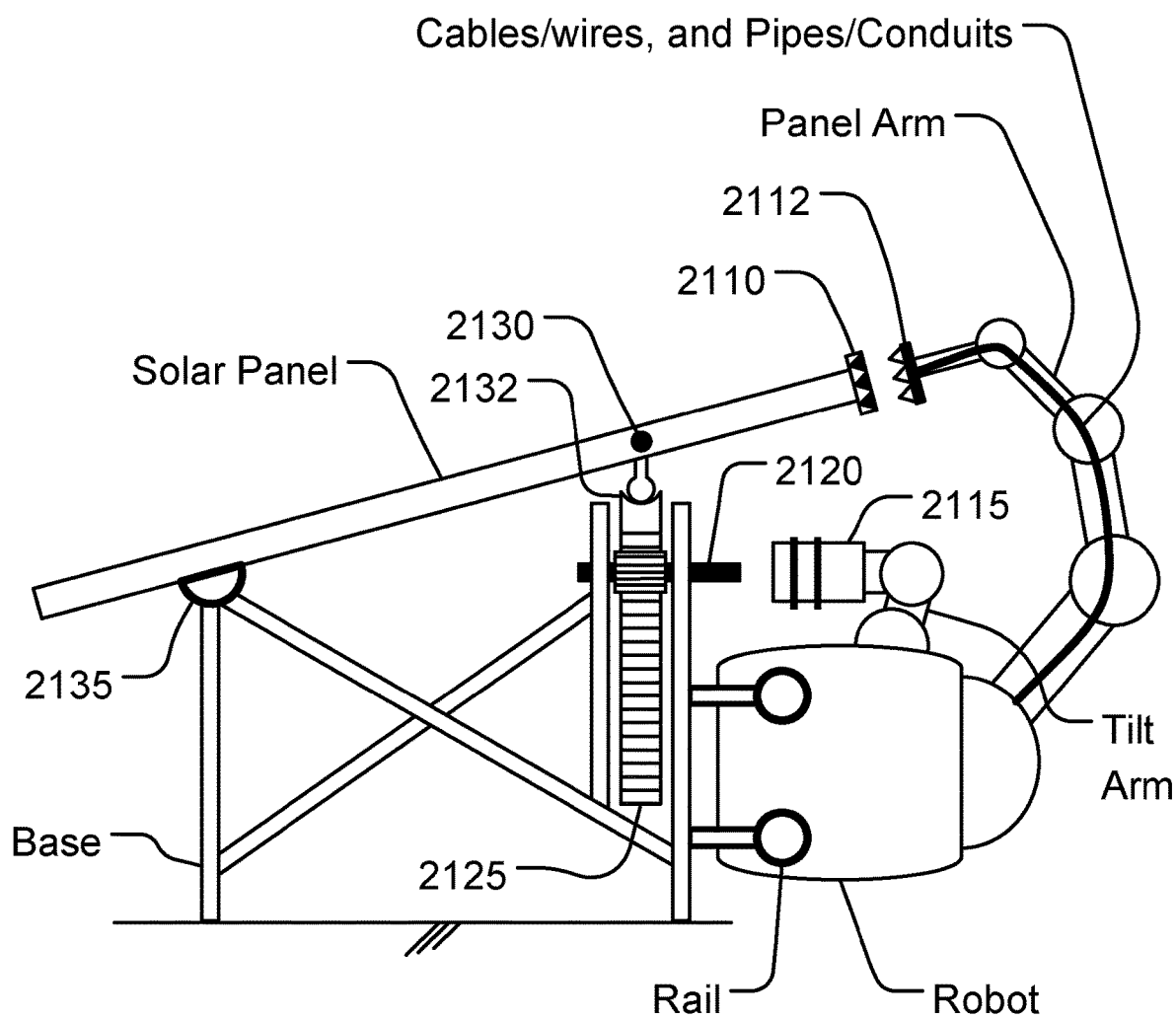
FIGS. 21a-c show a robot with a jack/lifting tool, probe, cables, rail(s), hinges, and adjusting mechanism/tool for the angle for the panel, with respect to the horizontal or vertical planes, for Sun tracking or focusing or other purposes.

In one embodiment, FIG. 21a shows the robot in action, with the following components and features:

2110: Power and Signal Connector to the solar panel for measurement and calibration.

2112: Power and Signal Connector carried by panel arm of the robot, or the electrical probe for electrical measurements on the panels or devices or cells.

2115: Tilt Adjuster Wrench Driver or motor

2120: crank axel

2125: Lift or jack 2130, 2132: Lift support (e.g., axial or spherical joint) coupler 2135: Joint (e.g., spherical), hinge, or ball-joint The robot is located at the side of the panel, with one or more rails on the side, perpendicular to the plane of the picture, with flexible arm, connecting electrically to the panel, for (e.g. electrical) measurements and power supply/power gathering and transfer from the panels, or to the panels. The robot uses 2115 motor to crank the shaft 2120 to lift the jack or lift (e.g. screw-shaped/design), to change the angle of the panel, for tracking the Sun, cleaning, repairing, adjusting, storing/protecting during storm, or optimization of the position and angle for the panel, using feedback from the electrical measurements (or optical), as described above. Various contacts, hinges, or ball-hinges are used, e.g. at 2130 and 2135, to make the lift of the panel possible. The lift of the panel can be done with one or more jacks/lifts, from one or more sides, as an embodiment.

Figure 21B:
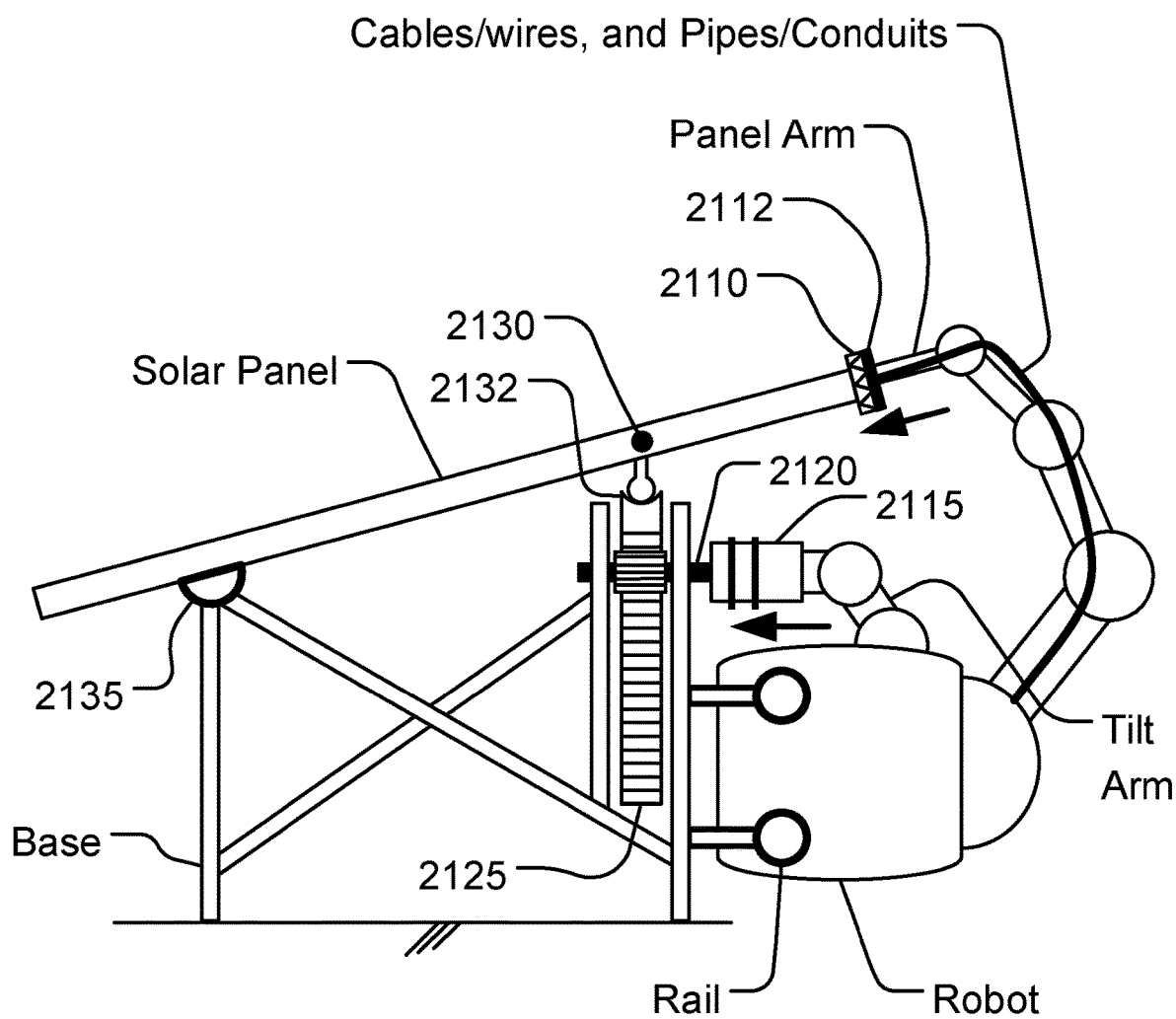
Figure 21C:
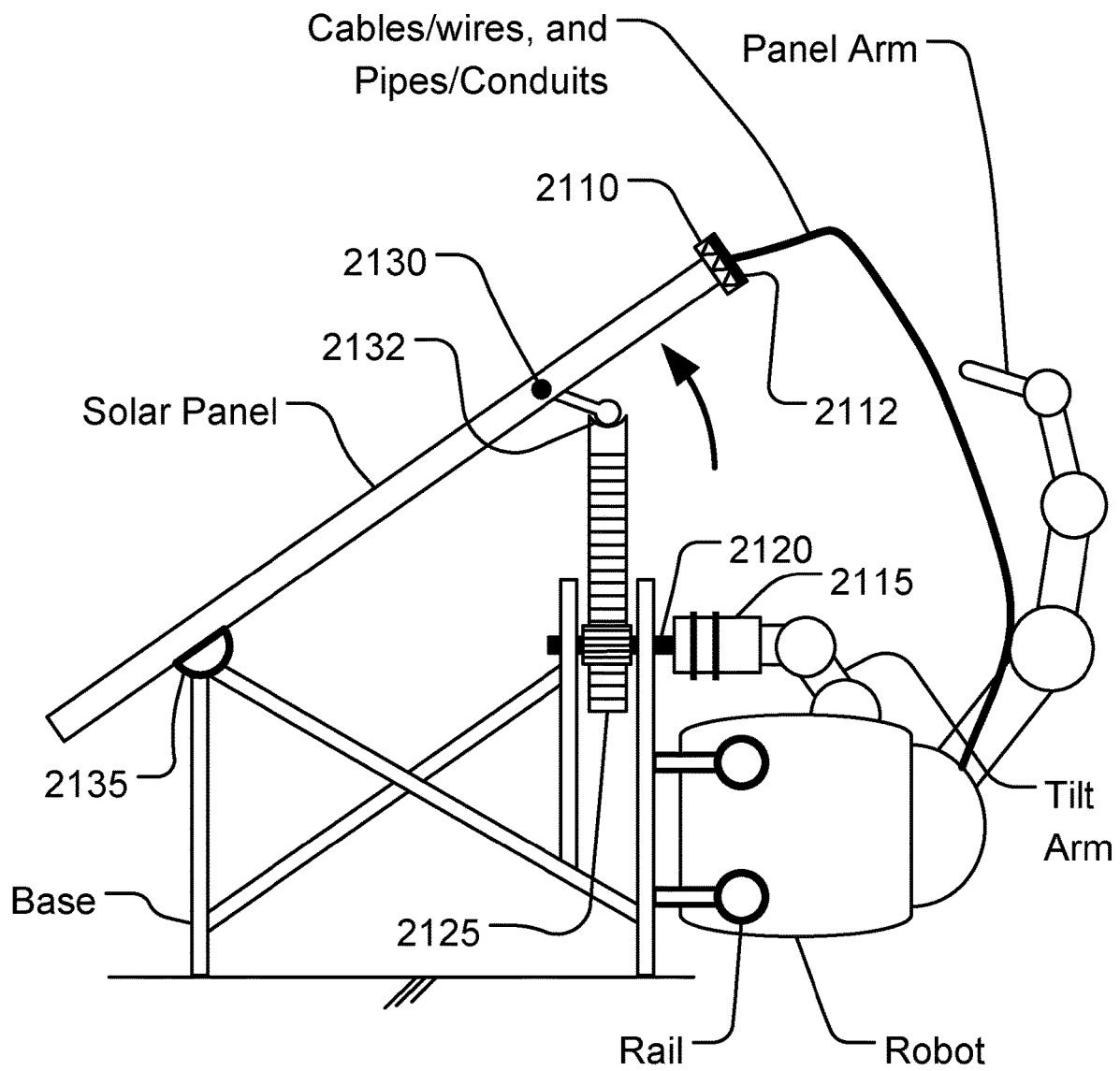

In one embodiment, FIG. 21b shows the lifting process, and 2112 engaging and connecting to 2110, for electrical connections, as mentioned above. In one embodiment, FIG. 21c shows the lifting, and stretching at the hinge or ball-hinge or spherical-hinge 2132 and 2130, by moving the jack up, using 2115 and 2120.

Figure 22A:
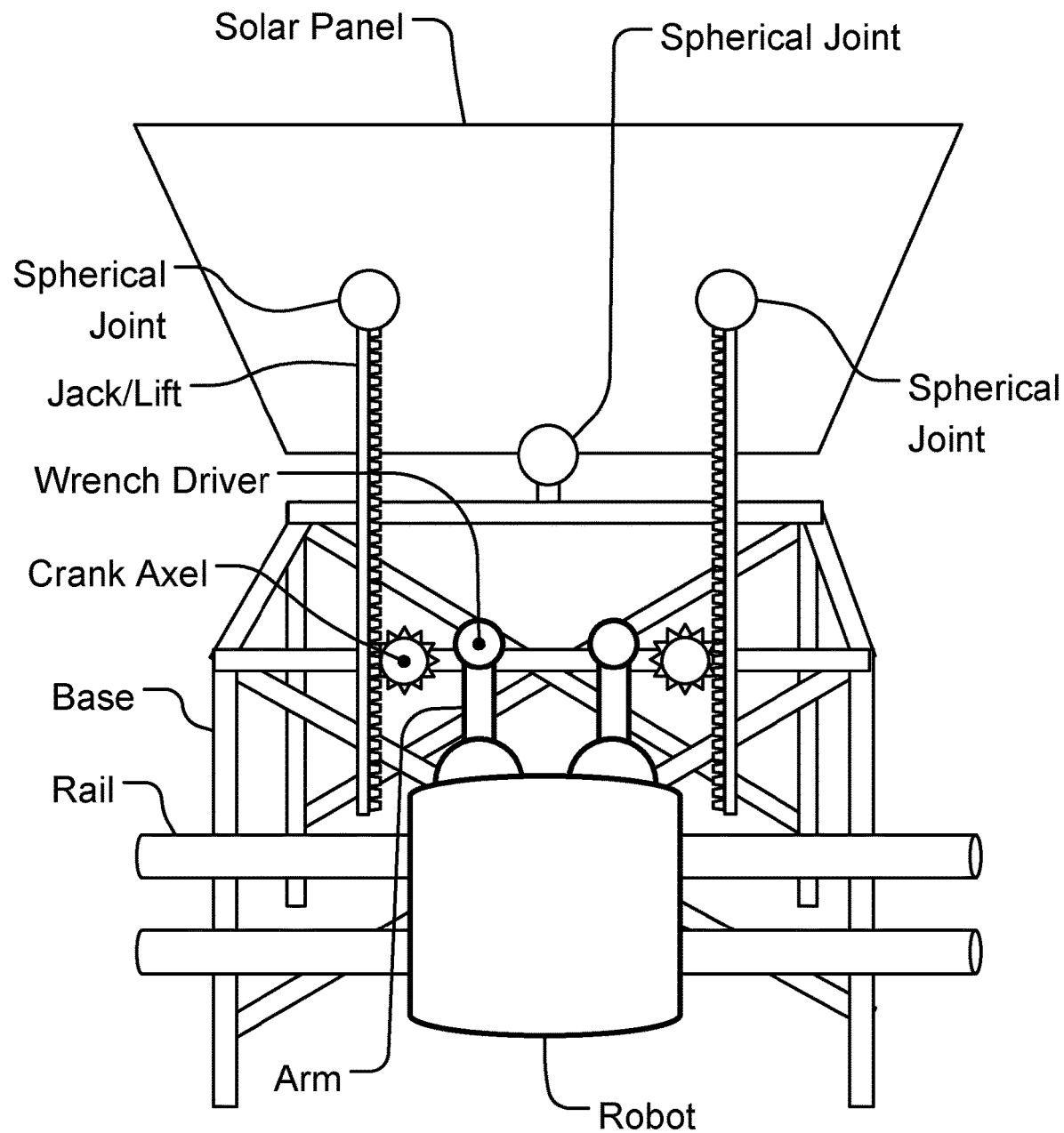
FIGS. 22a-e show a robot with spherical joints/hinges, lifter(s)/jacks, gears, angle adjusters, engaging mechanism, motor(s), and tracking mechanism.

In one embodiment, FIG. 22a shows a robot on rail or rails, moving around, with wrench driver, cranking axel to lift the jack, to lift the solar panel, from one or more points or directions (or lowering the panel, in the reverse direction, using the same jack). The relative angle and slope of the panel (with respect to the horizontal plane) can be changed using the relative height of one or more jacks, under the panel. The spherical joints, ball joints, or ball hinges are used to connect to the panel, to enable the one or more jacks being applied to the panel, to change the height and slope/angle of said panel, e.g. for tracking the Sun.

Figure 22B:
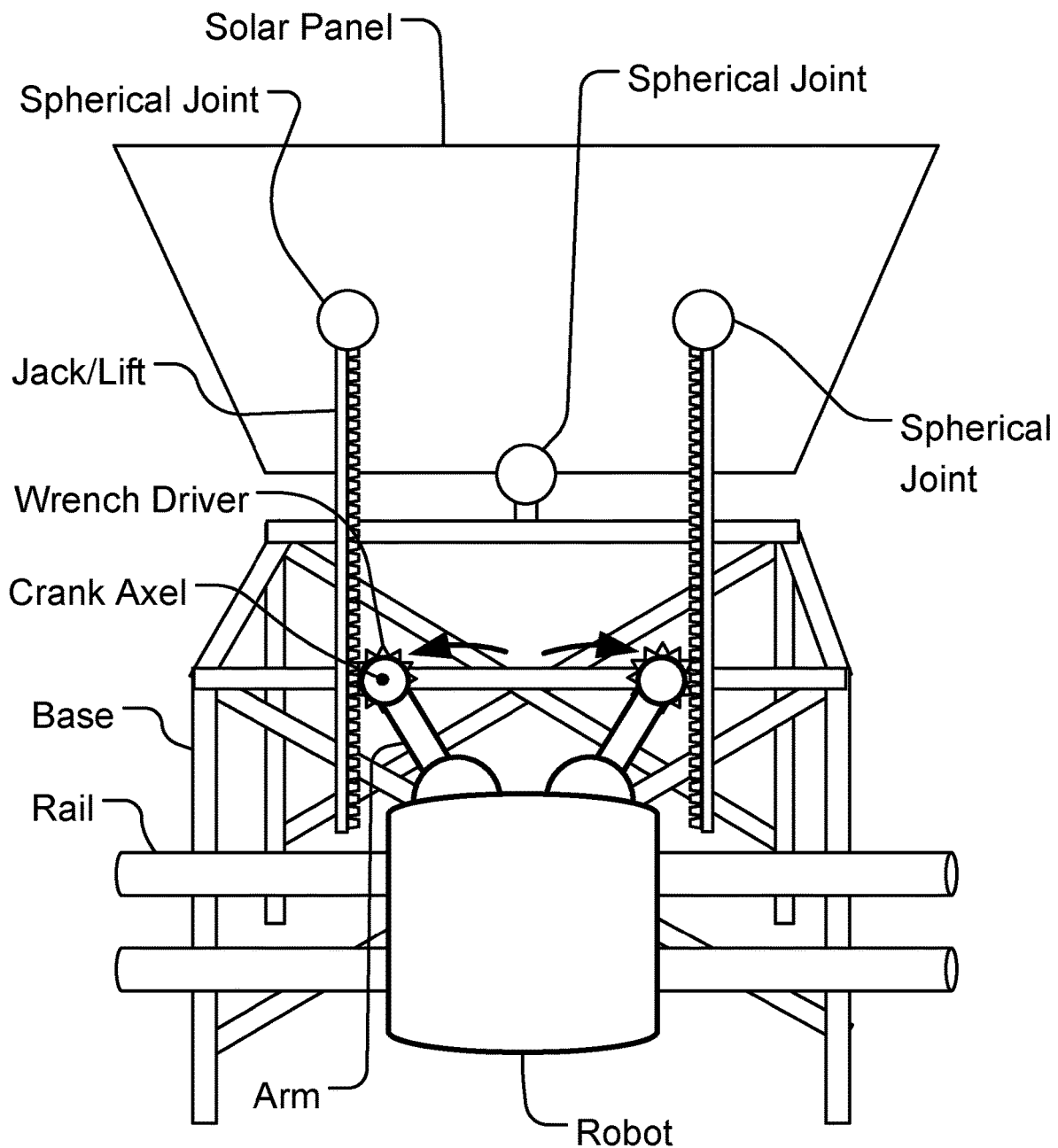
Figure 22C:
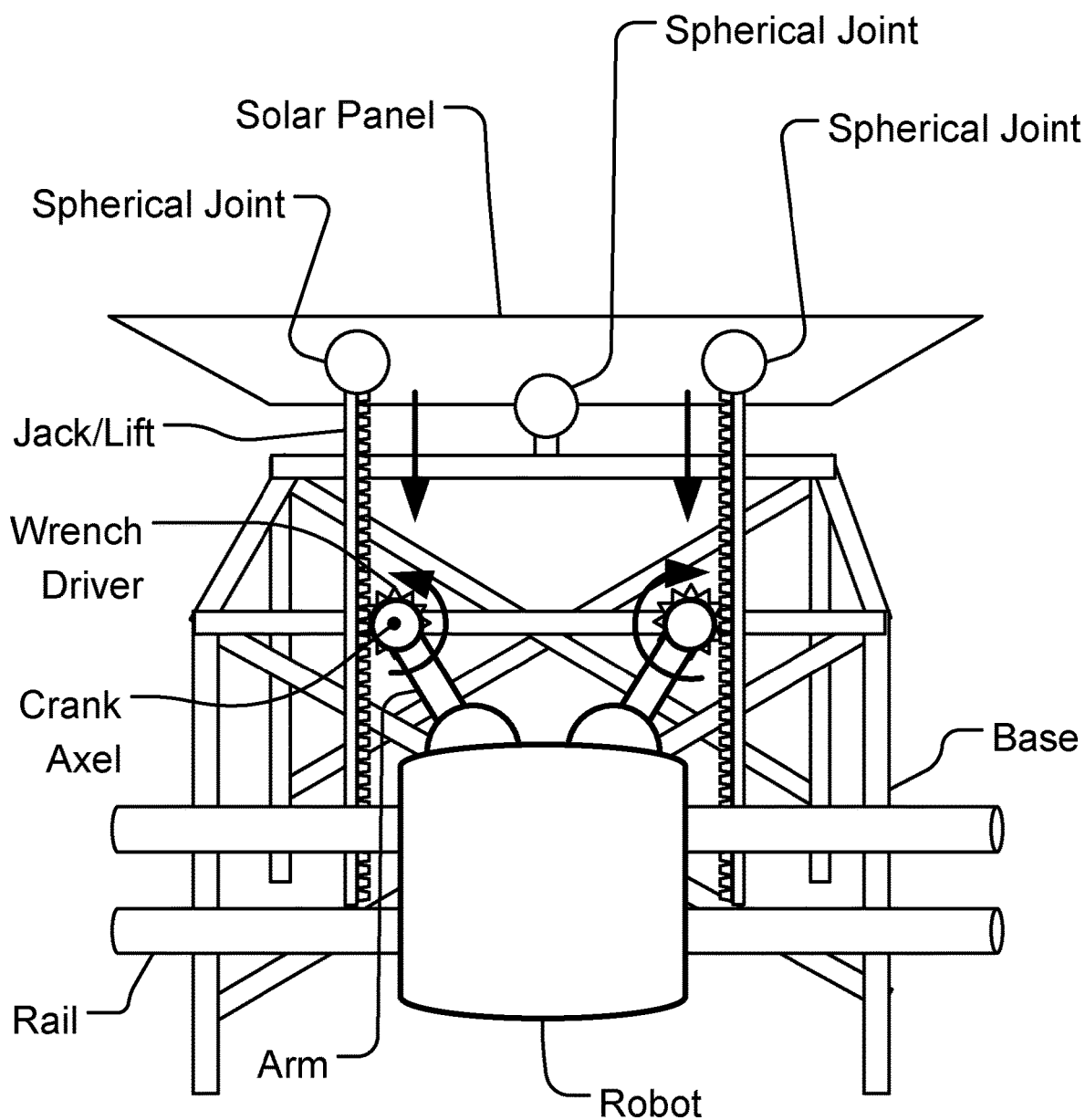

In one embodiment, FIG. 22b shows a robot in which the arm is engaged with the crank axel, to lift or lower the jack, for one or more jacks. The arm is moved/rotated, to connect to the crank axel. In one embodiment, FIG. 22c shows a robot in action, in reverse direction, to lower/bring down the panel or one side of the panel, changing the slope/angle of the plane of the panel.

Figure 22D:
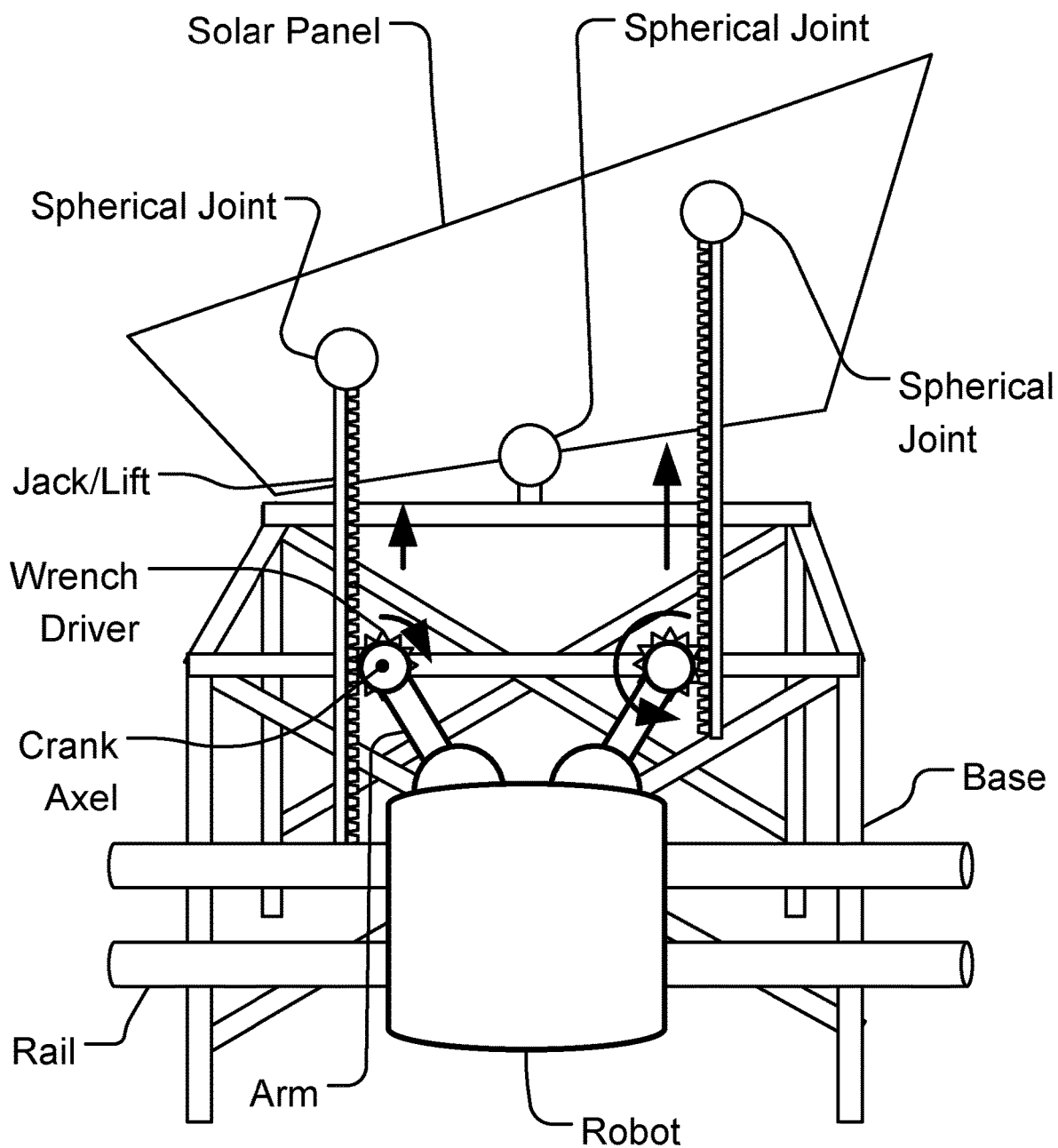
Figure 22E:
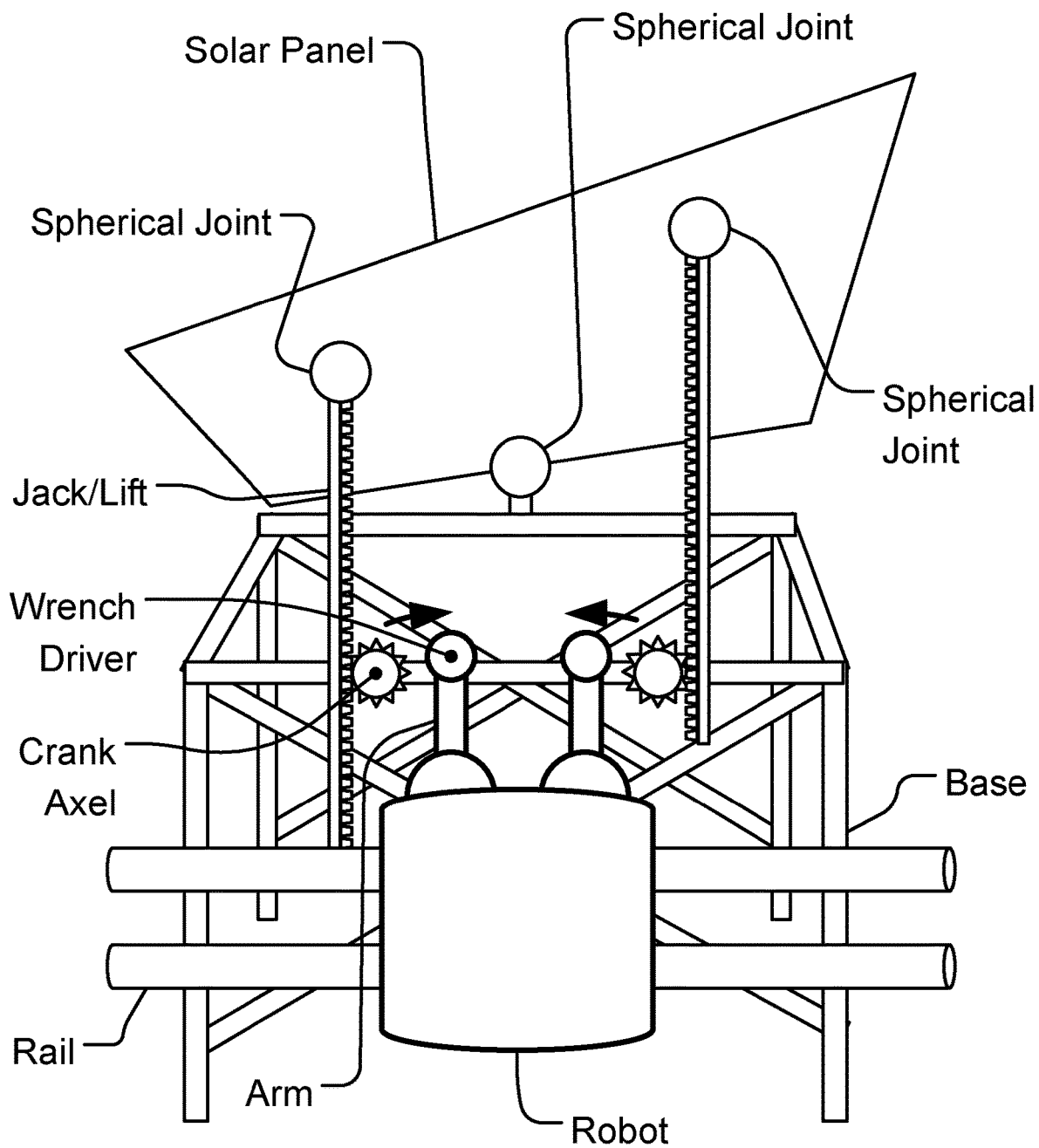

In one embodiment, FIG. 22d shows a case in which one side rotates faster for crank axel, lifting faster for that side, by engaging the gears inside the chain, bar, belt, or jack, to tilt the panel toward one direction or the other. In one embodiment, FIG. 22e shows the disengagement of the arm(s) from the crank axel(s), to leave the panel in the same position and angle/slope.

Figure 24A:
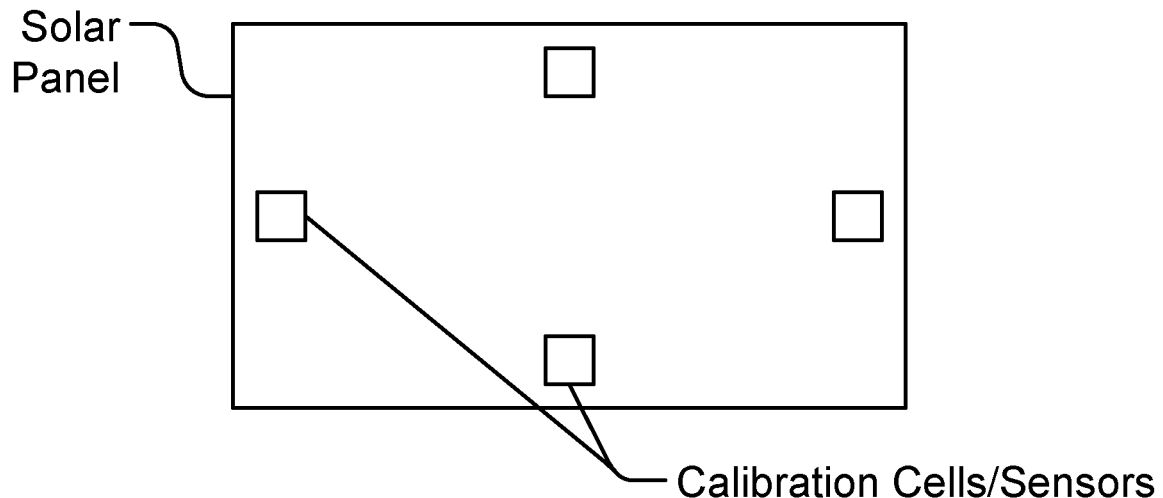
FIGS. 24a-b show a panel with calibration cell or sensors or markers or beacons, positioned randomly or in a pattern, located on top, over, below, behind, or sides (on a blank plate or surface, or on a panel full of devices or solar cells), for electrical, optical, or positional measurements, to optimize the performance or test the performance or normalize the performance of the devices, cells, panels, sub-panels, or sections of panels. One example is for the measurements and analysis during the cloudy days, in which case the performance is normalized to consider (take that into the account) the overall reduction in energy absorbed across the farm, due to cloud absorption, to have a better comparison on the performance of the panels during different days or seasons, such as using electrical/voltage/current measurements, to calculate solar cell or panel's efficiency, or find defects on panels/devices/cells more efficiently or precisely, or evaluate panels, normalized to the degree or effect of cloudiness/cloud.
Figure 24B:
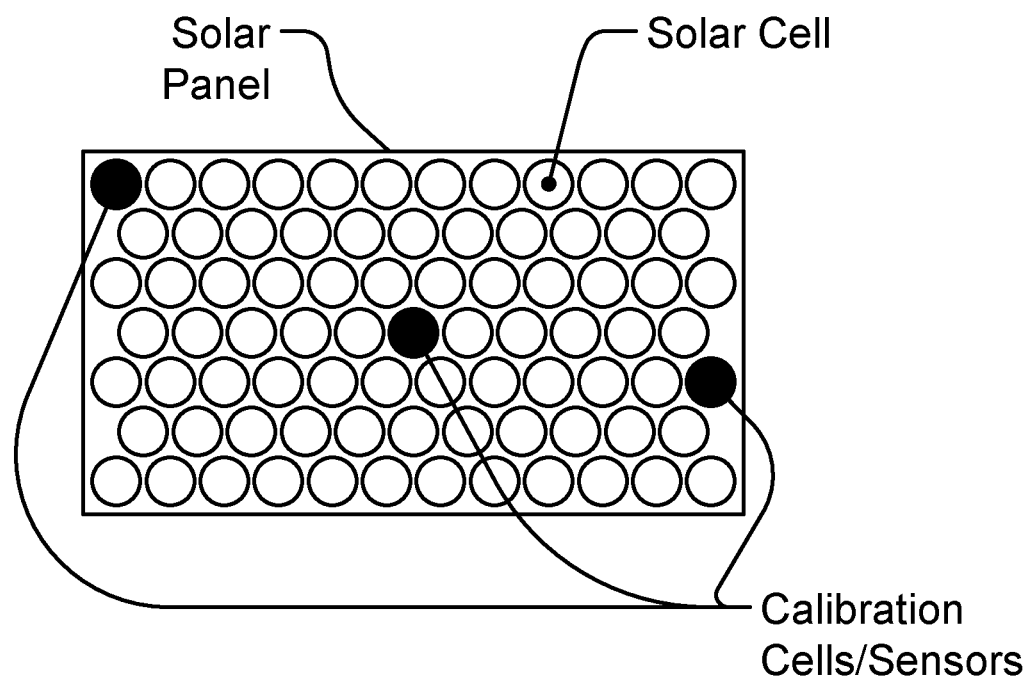

In one embodiment, FIG. 24a or 24b shows calibrations cells or sensors, for calibration or analyzing or testing the panel, located in patterns, in order, or randomly, to find the ice or dirt or problems or defects on the panel. For example, if the day is cloudy, one can get that information, about loss of energy/reduction in efficiency, using the calibrated/calibration cells or devices on various panels in the whole farm/system, as a pattern observed across the board. The calibration devices may be among other regular devices. Or, alternatively, they may be isolated/located on separate panels/panel.

In one embodiment, supplies (e.g. water, chemicals for de-icing, soap, or electricity, e.g. using battery or outlet, from grid or from solar farm itself) can be held by the robot itself, or by another/carrying robot or supply robot, or at a station near tracks at some intervals (inside containers or cylinders or tanks or storages), or using a hose, outlet, valve, or switch at a station with supply on pipes or conduits along the track at intervals (or at specific distances), coming from a "central location" at the farm, with huge supply or containers, distributed/used along the tracks to different panels or robots for various tasks, such as repair, soldering, welding, cleaning, or de-icing.

In one embodiment, the same concept (mentioned above, for supplies) also applies to the deposits. For example, for deposits such as collecting garbage or dirt, a cleaning robot empties its vacuum cleaner bag (periodically or when it is full) at a (local) station along the tracks (depositing locally), for future pickups, by a garbage robot, to carry all of the collected garbage and dirt, to a "central place" at the farm, e.g. for disposal out of the farm area at a later time. Or, the station is connected to the central place via a vacuum hose(s), so that a motor can suck the dirt and move that to the central place, through the vacuum hose(s).

In one embodiment, the water or soap or chemicals used, e.g. for cleaning, are separated and recycled through some trays (under the panels or robots), for recycling and re-usage. The recycling unit can be centralized or localized. The recycling unit can have a small motor for carrying the material through the pipes or conduits. The recycling unit can have storages, for storing or recycling different components and materials.

Figure 25:
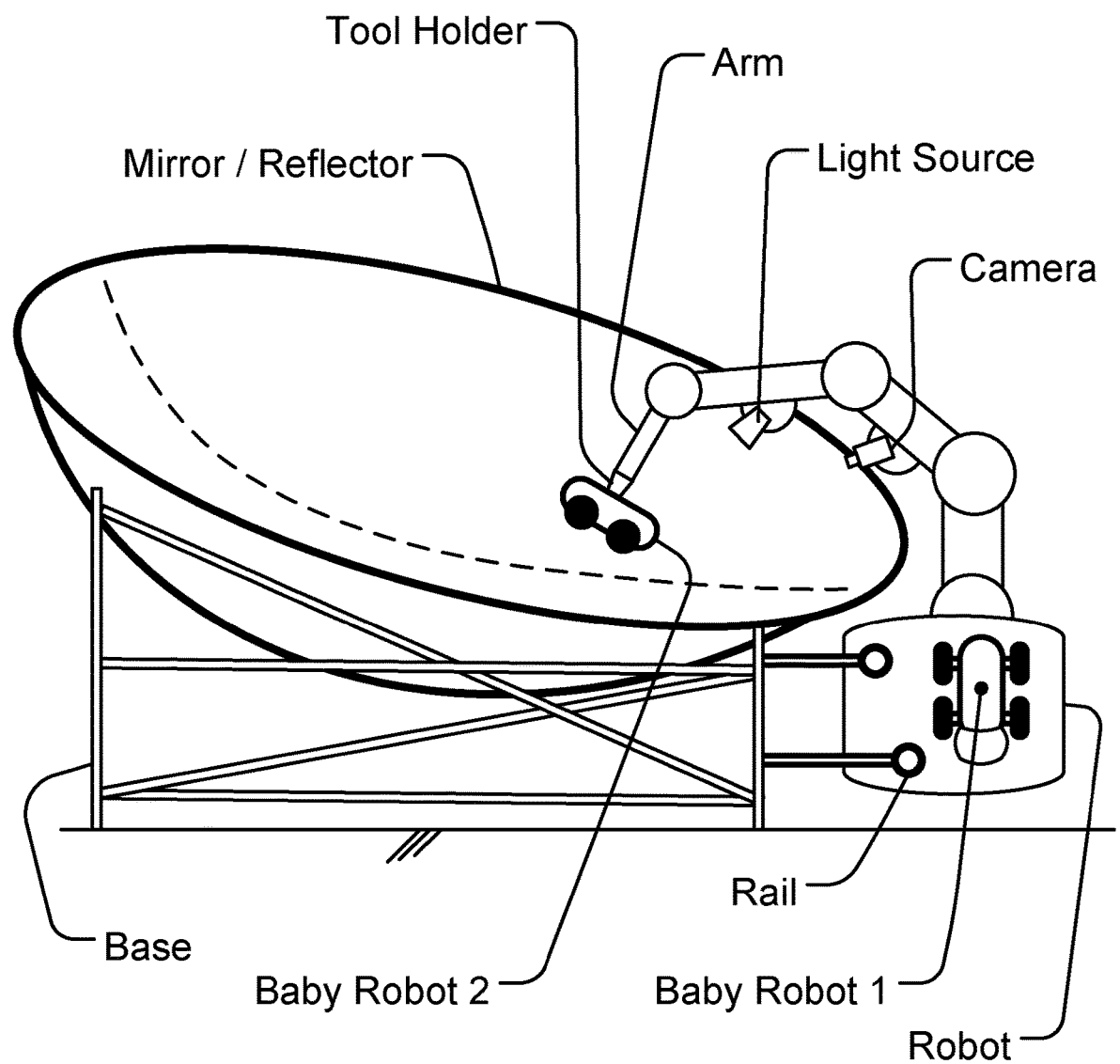
FIG. 25 shows a mother robot puts a baby robot on a curved panel, for various tasks, e.g. cleaning or brushing the surface.

In one embodiment, FIG. 25 shows a curved/concave/mirror/reflector as a panel, tilted on a base/supporting structure, with a mother robot coming to it, on a rail(s) on the side, with one or more baby robots on the mother robot, inside the pouch, pocket, purse, bag, container, or storage(s). For example, a baby robot is picked up/grabbed by the mother robot, using tool holder and arm, from the pouch, and either released or directed/moved around on the surface of the panel, to do a task or function, such as cleaning task, e.g. using a brush, soap, or air.

Figure 26:
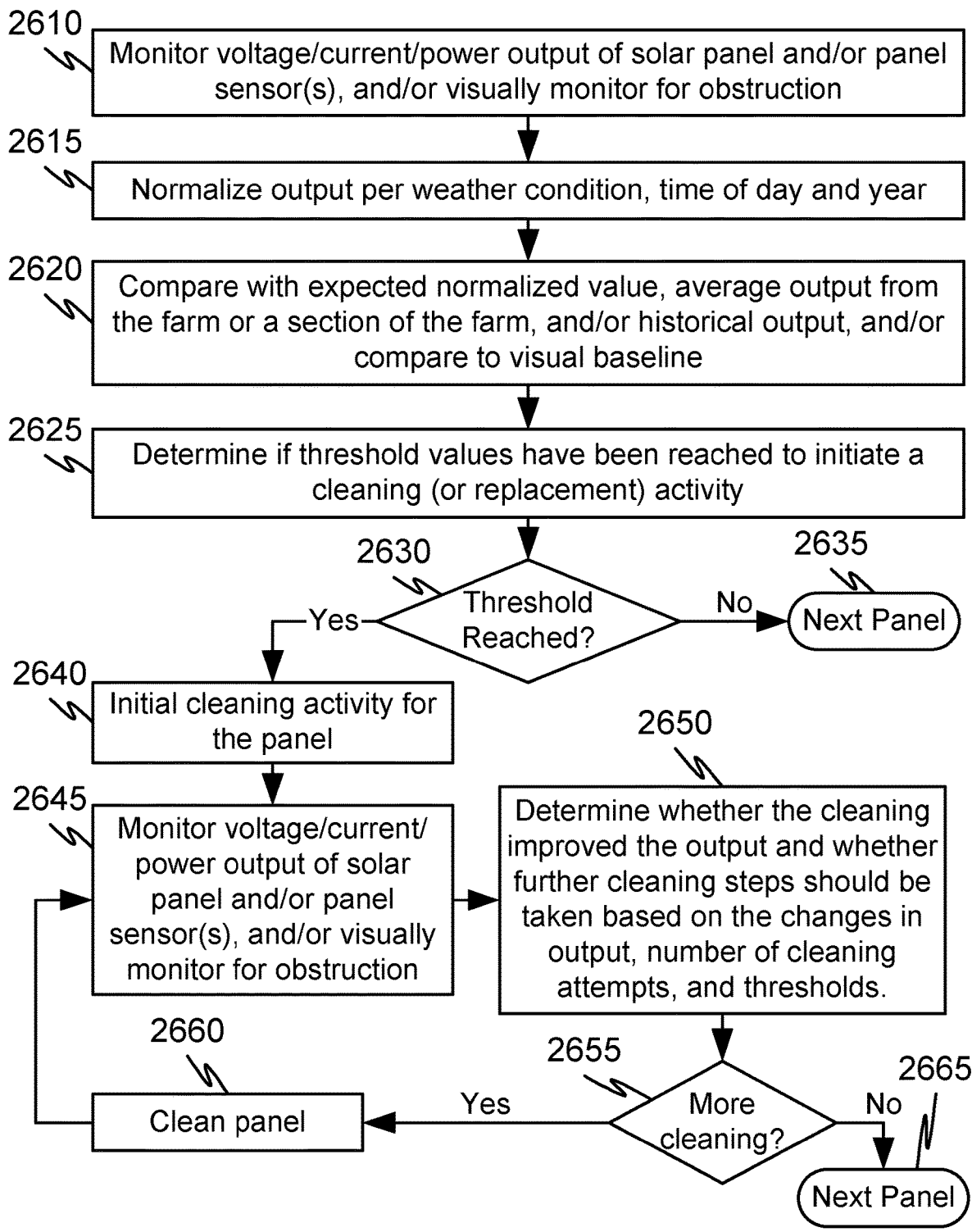
FIG. 26 shows flow chart/method for monitoring panels, e.g. for cleaning or repairs.

In one embodiment, FIG. 26 shows monitoring the panel or surface based on many methods mentioned above or at 2610. The measurements are normalized based on the season and weather conditions and other parameters affecting the output, 2615, e.g. voltage, current, or power from a panel or device (or solar panel efficiency or performance). That is, for example, if the weather is cloudy, the calibration devices, mentioned above, will register less current or power, indicating the there is less Sun and energy at this time or day, which means that the low power is not due to the ice or dirt, which means that the surface is still clean, and no cleaning is needed now.

In one embodiment, the temperature sensors, thermometer, or thermocouple(s) can also help to indicate the temperature outside at the panel surface, to guess/determine if there is an ice forming on the panel. The humidity and wind speed can also be measured by any method of prior art, to help to guess/determine if there is an ice forming on the panel.

In one embodiment, the result(s) is compared to a baseline (2620), theory, history, prior data, similar panels at different locations at the same time, or simulations stored or done real-time/on-spot, to find that there is an unusual data/output, to determine if that is indicating dirty surface, ice, defective panel, component, device, wiring, cable, or solder, broken glass or cover, or any other problem in cell, device, arrays, panel, system, panels, farm, connection, transmission of power, or grid, 2625, using a threshold or criteria, 2630. In case the result is satisfactory and acceptable, it moves to the next panel or task, or retire the subroutine, software, or robot for the moment, or for the rest of the day, 2635.

In one embodiment, if the result (from further measurements and monitoring) is indicating that a repair, exchange, cleaning, or adjustment is needed, 2630, then the cleaning or repair is initiated. Then, the panel is monitored again, to determine this is acceptable, so far. Otherwise, the cleaning or repair is continued or modified. For example, a harsher cleaning or brush, or different or stronger/weaker soap or method (2660), is needed (or being sufficient), to do the job/finish the cleaning procedure or routine, as shown in the loop (2645, 2650, 2655, and 2660). Once the repair or cleaning or the task is finished/performed, the robot moves to the next panel, 2665.

In one embodiment, the robot does the adjustment on the panel, such as Sun tracking, using jacks to lift one side of the panel, for optimum angle of Sun rays on the panel, for higher electrical or energy generation/conversion efficiency. In one embodiment, the robot does the protection, by pulling a cover on the panel, or using an umbrella, from/stored in its bag, over the panel, to protect against hail, frozen rain, storm, or dust.

In one embodiment, the farm consists of a main processor(s) at HQ and multiple smaller processors locally for local/simple decisions on the robot (e.g. local pattern recognition for finding defects or problems on a panel) that do not require the coordination of all system or robots together (such as scheduling, prioritizing, robot movements, movement on tracks, parking scheduling, or emergency situations, e.g. storms prevention/protection and repairs).

In one embodiment, everything is done at one place, at HQ, "central location", for all decisions. The communications in-between HQ and robots (or stations or depot or storages or grid or switches or tracking movers (to move tracks for re-routing the robots, such as those in railroads) or parking or garages (multiple level track system on multiple floors, to store robots, similar to those used for cars)) can be done wirelessly (e.g. antennas or satellite dishes/receivers), by wire, by cable, by Internet, remotely, optically, by laser, electromagnetic waves, Morse code, sound, voice, notes, marked papers, marks on papers, computer instructions on papers or cardboards or plastic cards, magnetic cards or memory, optical memory or disk or devices or storages, or computer-readable instructions on any media.

In one embodiment, the robot can move freely on its feet (2 or more), without wheels or rails. In one embodiment, the statistics or history of the measurements and data indicates the repair needed or scheduled maintenance, as preventive maintenance. In one embodiment, the robot or farm have redundancies in operations and functions, e.g. for preventive maintenance (e.g. lubrication, cleaning, or parts exchange), or for the sake of efficiency, or less down-time during the day or noon-time. Most repairs are done at night, to have more efficiency during the day/Sun exposure/day operation. In one embodiment, the robot uses infrared camera, heat sensitive detectors, X-ray to find defects, or ultrasonic waves/detectors to find defects, e.g. cracks in material or structures or panels.

In one embodiment, the robot is self-repairing, e.g. use screw driver to tighten or replace screws or parts/components, on itself. In one embodiment, the location of robot is determined wirelessly, e.g. by (active or passive) RFID and WiFi, or by magnet, GPS, triangulations, sensors near the track(s), tags, flags, acknowledgement messages, commands to HQ, message at tracks or stations, antennas, or codes, for scheduling, collision avoidance, overlap coverage, redundancy, or area of coverage, e.g. for task assignment/management, based on the location of all robots active in the field.

In one embodiment, the robot is on one rail, two rails, or more than 2 rails. In one embodiment, the rail is on the ground, on the air, underneath, over, suspended, or on the side of the robot. In one embodiment, the HQ does the risk analysis for time-to-failure analysis, for preventive maintenance. In one embodiment, the brush, spray, jet, soap dispenser, and camera are located in series, in the order they are needed. In one embodiment, the brush, spray, jet, soap dispenser, and camera are located in parallel. In one embodiment, the brush, spray, jet, soap dispenser, and camera are moved in/out of the sight, or front, to do their functions, one at a time.

In one embodiment, the wheels on the track have independent axis or shaft for rotation. In one embodiment, the wheels on the track have multiple diameter wheels attached to each other, as a single concentric unit. Then, like trains, it can be used on tracks on the curved paths, for better rotation/support at the curves. The electrical power can be supplied through the wheels, or through the metal brush structure along the wheels and tracks, or through the small wheel rotating or touching on another track(s) that carries the voltage V (located along the tracks), similar to electrical tram's or trolley's system.

In one embodiment, for aligning the panel with respect to robot, or vice versa, or with respect to Sun (for Sun tracking), knobs, levers, or hinges can be used, with screw drivers or screws for adjustments, and cameras or sensors (e.g. electrical or magnetic or optical) for detecting the edges or positions/markers/beacons (e.g. RFID or magnetic stripe or painted stripe), on the panel or sides of the panel.

In one embodiment, for changing the defective panels, it can be used in serial procedure or parallel procedure, using multiple robots on multiple tracks from 2 sides of the panel (left and right sides). The carrying robot has multiple shelves, to store the good and bad panels, separately, on different shelves or drawers or trays. For different heights for panels on the ground, the rails are located at multiple heights, and thus, they can be used on bridges, tunnels, and overpasses (over another track), similar to a train track/rail system.

In one embodiment, the panels have holes on them, for draining water from rain to ground, or for recycling water. The robot or base support system can have a small motor to shake/move the plates slightly, to prevent the formation of ice, for de-icing purpose. The cover for ice or sand or dirt can be screen, plastic cover, metal accordion shape cover that folds and unfolds, umbrella similar to the ones people use during rain that can fold and put aside (or similar to the ones near the beach and swimming pools on the tables), roller shape curtain similar to the curtain on the windows, folding or rolling curtains (similar to the ones for house windows, operating vertically or horizontally), or Venetian Blind type curtain. The robot can have its own umbrella or cover, for its own cover/protection, if needed, e.g. in bad weather.

In one embodiment, the panels or other parts are adjusted using gears, step-motors, motors, levers, bars, screws (e.g. for engaging or disengaging the panels), latches (e.g. for engaging or disengaging the panels), screw/inclined curling/rotating surface mechanism (e.g. an Archimedean Screw or the screw-pump mechanism, which is historically used for transferring water) (e.g. to lift the panel by a jack or lift, using such a mechanism, by a gear or lever/rod or small motor), gear-boxes, clutches, engines (similar to a car), or combination of them. In one embodiment, the major problems/repairs/defects are solved in the depot, for the robot or panel (e.g. using the carrying robot, or transferring to the depot), and minor problems are fixed on spot at the panel site, to save cost and time.

In one embodiment, this invention/panels are used on other planets (or deserts in Africa, or North or South Pole, or on a ship floating on the sea, with extreme weather conditions) for generating electricity, where the stations need electricity, and where the dust/snow storms are possible. However, the robots are much cheaper and more practical than human repair person, to do the repair and cleaning in the remote/harsh/extreme places.

In one embodiment, the robot is controlled remotely, as an option, from HQ, by a computer or a human operator, who can see the whole operation and read the sensors, using cameras and sensors on the robot. In one embodiment, the robot and panels are moved on the same tracks. Alternatively, they can be moved on different tracks. In one embodiment, the robot has a siren or bell to notify others that it is approaching, similar to a train. In one embodiment, the robot has a brake, to stop, similar to a train or car.

In one embodiment, the robot goes to a station for calibration, for itself or a panel, e.g. electrical or optical measurements. In one embodiment, the robot moves by a conveyer belt or chain, with pulley or gear, hooked to it by a latch, grip, or hook, pulled on a track, by the force exerted from belt or chain. In one embodiment, the rails/cross sections look like a dove-tail and notch combination. In one embodiment, the installer robot is used to install the tracks and whole farm initially. In one embodiment, the robot does self-diagnosis, self-repair, self-assembly, and self-test.

In one embodiment, the HQ keeps track of the lifetime and defects to analyze which manufacturer or batch of panels are more defective, for future feedback to correct the problems at the panel factory, or change components periodically to prevent major shut-down. In one embodiment, the robot, panel, and HQ share knowledge, intelligence, data, and processor for decision makings or coordination with other panels and robots, as centralized, distributed, or somewhere in-between. By distributing responsibilities and functions (e.g. modularizing/re-using the system, farm, robots, components, and functions), the repairs and changes are much faster, focused, and cheaper, to maintain the farm operational.

In one embodiment, the robot has a hand or suction tube or sharp pointed bar, to pick up garbage on the track or panel. In one embodiment, the robot has a leak detector (for pipes or containers, for gas, liquid, or solid), or detector for inspecting the rails with camera or ultrasound, to inspect the defects for prevention or repairs. In one embodiment, the baby robot moves on the panel the same way as that the mechanism of the print-head for ink-jet printers, during printing on a sheet of paper.

In one embodiment, the robot has the motor and/or pump(s), rather than the panel having them (which is another embodiment (or both robot and panel having them, which is yet another embodiment, as well)), which saves the user a lot of money, due to having less number of pumps and motors (used for adjustments and repairs) for the whole farm, for future repairs or initial installation costs.

In one embodiment, the robot has a Swiss Army Knife type device for all tool tips needed. In one embodiment, the baby robot has a suction foot, using pump or motor, for a baby robot to walk (e.g. using feet similar to a human) on the panel, without falling off the panel, to prevent damage to the baby robot. In one embodiment, the HQ uses redundancies, backups, and schedule optimization, for tasking robots at different locations at a big farm, to reduce downtime and unnecessary movements of robots (for shortest or fastest route, as an example), using any optimization or scheduling module and software in the prior art/market.

In one embodiment, the robot has a hydraulic for lifting panel/adjustment of the angles for the panel, with respect to the Sun and season, for tracking Sun/optimization. In one embodiment, the robot has a siren or bell or sound box, to scare the birds away, or animals, for cleaner farm, which requires less maintenance. In one embodiment, the robot has an ultrasonic device for surface cleaning, similar to those of the dentists for cleaning the teeth, by vibration (or the vibration used in semiconductor cleaning process, to clean the substrate, using liquid chemicals and cleaners, or using de-ionized or regular or recycled or clean water).

In one embodiment, the panels or robots have gutters, recycling bins, recycling tray, and recycling bags, for water and other objects, such as used and defective screws/metals.

In one embodiment, the robot shines a laser (that it has) on a target, to focus and adjust panels, for optimization, e.g. in mirror farms, focusing on a small area on a tower, or focusing on a water or liquid or fluid pipe or container. In one embodiment, one/single panel, or subpanel, or device, or row, or column, or matrix, or solar cell, or cell is inspected, and only the defective part(s) or devices or panels or subpanels are replaced/repaired.

Figure 27A:
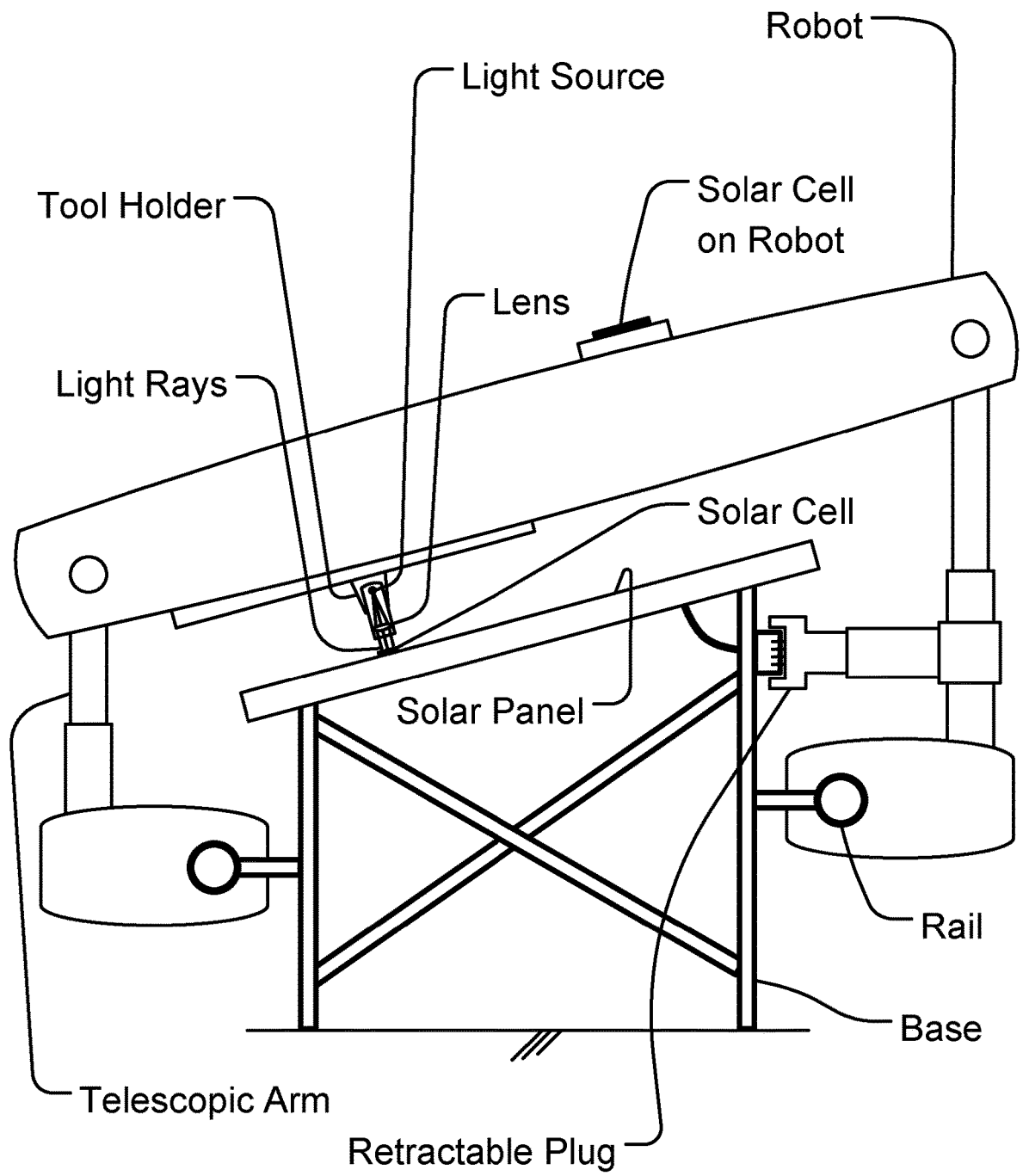
FIGS. 27a-c show a robot with an optical device, with its details.

In one embodiment, FIG. 27a, the solar cells on a solar panel may be monitored by a robot by shining light (e.g., a white source or monochromatic), on a solar cell, and measure the output of the cell (or panel or a row of cells). The light source may be previously calibrated. Various calibration checks for the light source may be achieved, e.g., 1) by moving the robot over a calibration panel and measuring the consistency of the light source, 2) using calibration cells on the solar panel itself, and 3) using the calibration light detector on the robot, e.g., by diverting it (e.g., reflecting the light from the light source onto a calibration photo cell, or placing a photo cell at proximity of the light source to capture portion of the incident rays from the light source). A location that the visual or output level indications point to an obstruction or a residue, the affected solar cell/panel may be tested against calibrated light source to determine the effect of obstruction (e.g., by comparing to the baseline/historical values).

In one embodiment, testing and monitoring the solar cells may be done at night, early morning, or late afternoon, when there is no substantial Sun rays to capture by the panel, so the monitoring would not interfere with power production of the solar panel. The telescopic arms of the robot can change the inclined angle of the robot, as well as the height of the robot, by moving the sides of the robot up or down, e.g. to make the robot substantially parallel to the current inclination or position of the solar panel.

In one embodiment, the robot on top shines light on the panel/sensors, and measures the output (and compares against the calibration/baseline). Also, it needs to perform self-calibration, e.g., reflecting light on its own sensor and/or measuring Sun light intensity with its own photo-detector. This will help adjusting for variations in Sun light, as clouds interfere, or as other elements affecting the measured parameter/output/efficiency.

FIG. 27a also shows a solar cell/small panel on robot itself, for power supply for the robot. It has a light source and lens assembly. The robot has telescopic arm(s) for height and angle adjustment for moving, repairs, Sun tracking, optimization, and other functions. The robot moves on multiple rails on both sides. The retractable plug is useful for electrical connections or disengagement, for electricity in/out, and/or measurements/signal/data collected (e.g. electrical/optical), through probes connected to the panel, at the side of the panel.

Figure 27B:
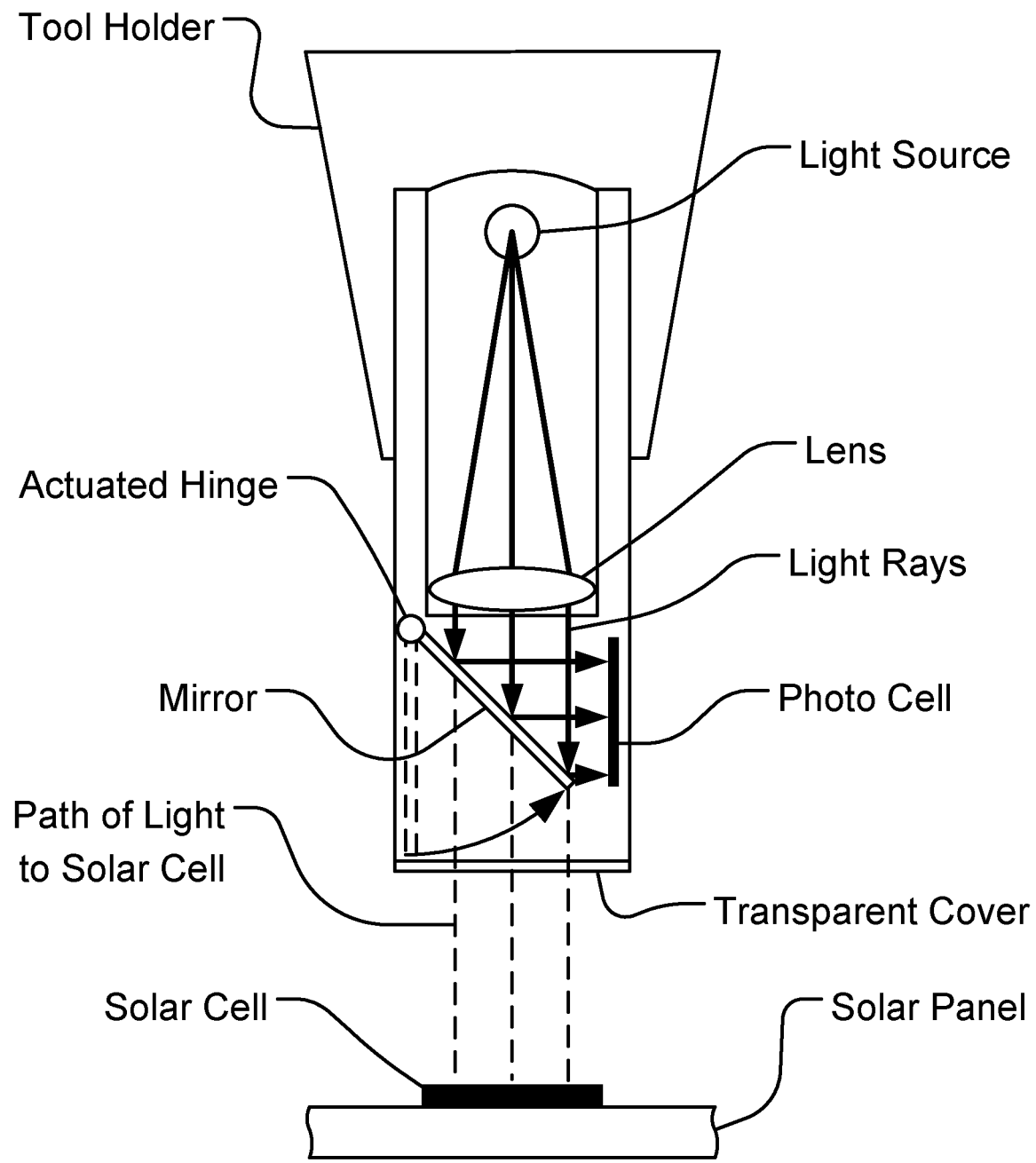

FIG. 27b shows the optical setup shown in FIG. 27a, as an example. The light source shines light on the solar panel, and using an actuated hinge, to open/close the shutter with a mirror, the robot can divert the light to a small local photocell sheet/plane/bracket/piece, in the assembly, for calibration purposes, for comparison, to normalize, and get a better result for variations, to calculate panel efficiency, or finding the defects or problems or dirt on the panels. Once the shutter is open, using a motor, step motor, or a rod from robot, the light shines onto the panel/solar cells again, through the focusing lens and transparent cover.

Figure 27C:
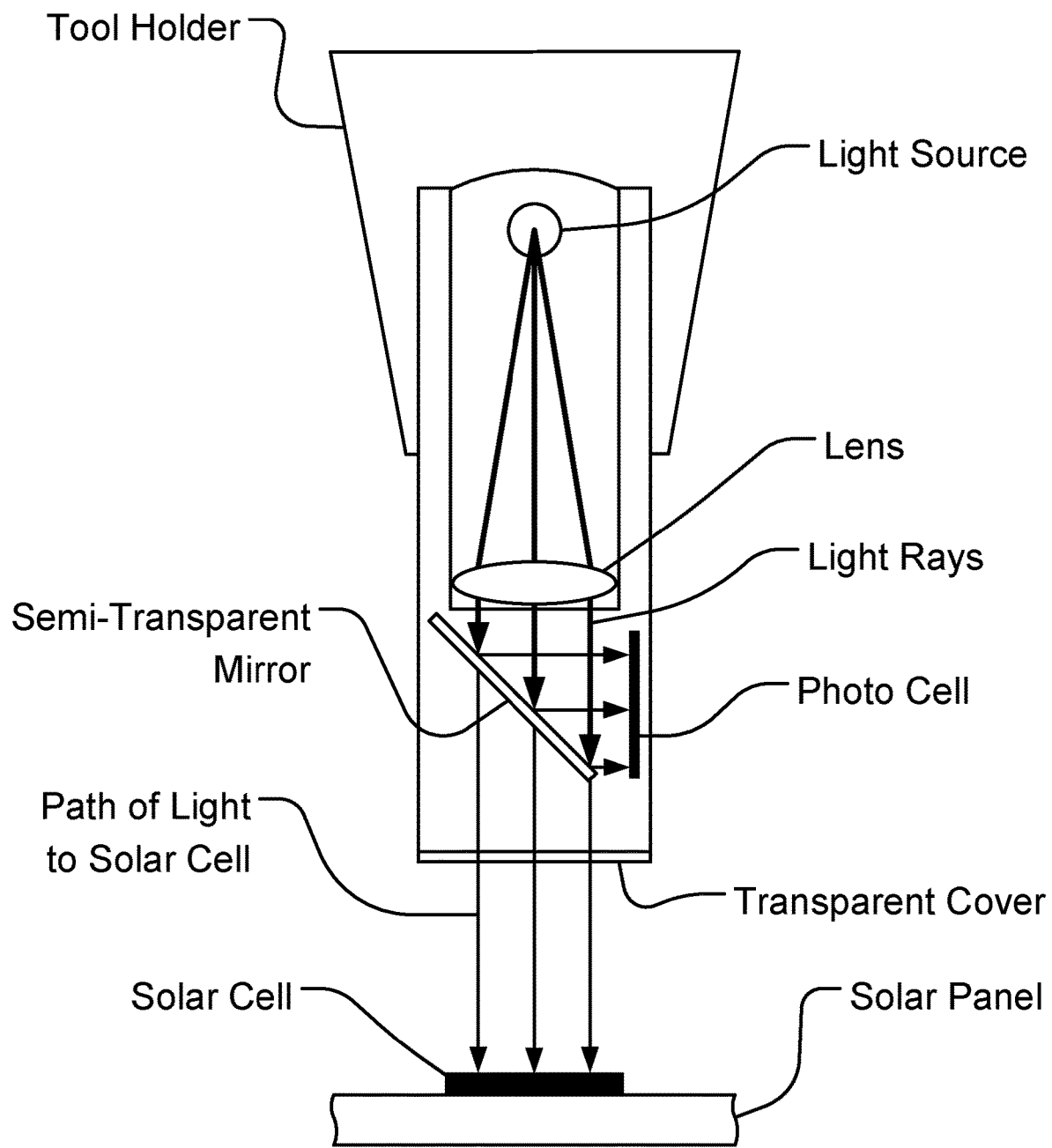

FIG. 27c shows the optical setup shown in FIG. 27a, as an example, similar to FIG. 27b. The difference with FIG. 27b is that the moveable shutter is replaced with a stationary semi-transparent mirror, which can reflect and transmit partially the incident light (mostly transmitted), to remove the need for the mechanical mechanism shown in FIG. 27b for the shutter.

Figure 28:
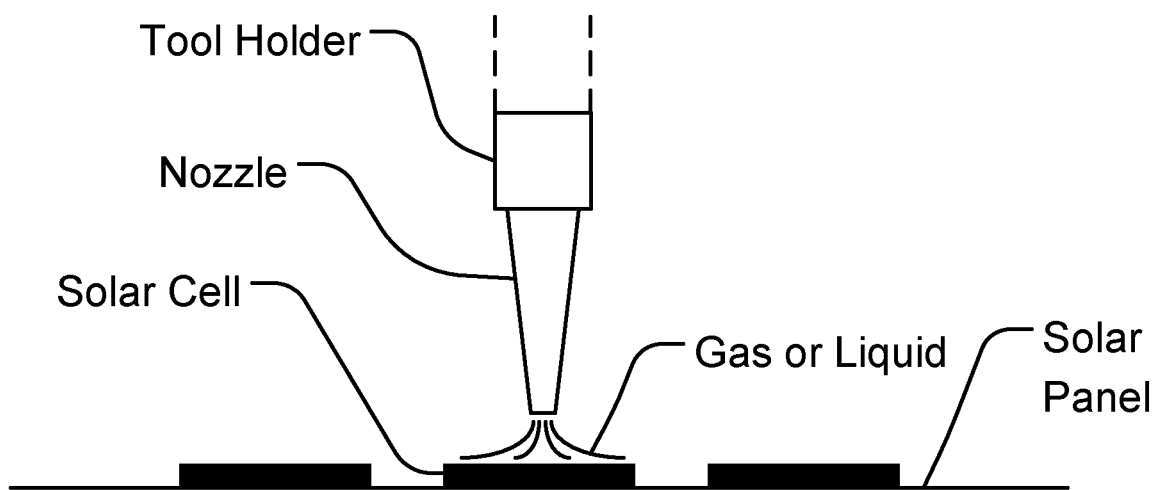
FIG. 28 shows a nozzle used for panels and other applications/locations.

FIG. 28 shows another example for the use of gas (e.g., air or compressed/pressurized air or hot air, from a tank/cylinder/pipe/valve/manifold, from station, HQ, central location, robot supply tank, panel supply tank, or pipes along the tracks), to dry or clean the solar cells or solar panel, from water, rain, dust or debris. Or, one can use a streak free liquid or cleaning detergent, or multiple liquids in a sequence applied to the surface of the panel, from one or more nozzles or valves, one-by-one, one at a time, or pre-mixed, or mixed at the surface, or simultaneously at the same time, in parallel. Or, one can use a nozzle (through the nozzle), after positioning the nozzle above the solar cell/panel. The nozzle may be moved laterally or be tilted to run the water or debris off of the solar cells/panel, in a direction closer to the edge of the panel, as determined by the robot on a case by case basis, or push them in the direction of the slope of the panel, for easier pushing to the edge of the panel, to get rid of the water or debris.

In one embodiment, the nozzle may be attached to the tool holder. The gas may be supplied directly to the nozzle or through the tool holder and the robot. The gas may be switched on/off at the tool holder by, for example, a relay or at its source by a controllable valve, or via a valve in the robot. The robot or HQ can control the on/off switch/valve. The robot may carry multiple containers for detergent, water, and gas. Multiple nozzles may be used to dispense or spray various materials (e.g., liquids or gas or powder or mixture or compound or fluid or detergent or chemicals, e.g. for de-icing or cleaning). A nozzle may be used to dispense multiple materials.

Figure 29:
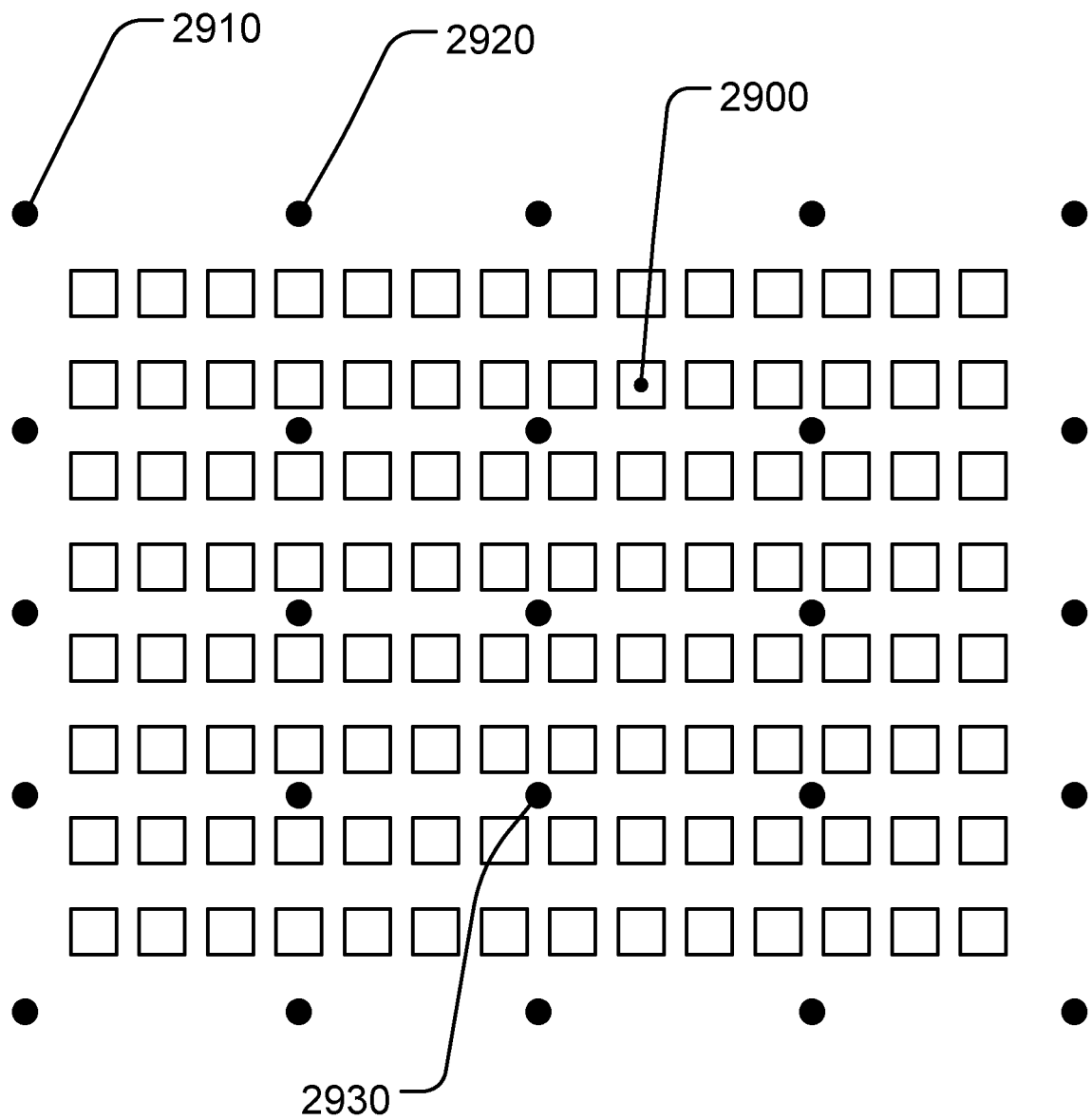
FIG. 29 shows an array or matrix or 2-D (two-dimensional) set for a farm.

For FIG. 29, it teaches multiple small antennas (similar to LoJack system for stolen car recovery and e.g. 3-4 antennas on the police cars) or GPS (similar to GPS system for the cars or other vehicles or phones) or RFID (similar to the ones for inventory tracking in a big warehouse, such as those used by Walmart Corporation, e.g. for tags or IDs, passive or active RFID systems) on a robot, used for GPS or triangulations, interacting with satellite or local stationary antennas or markers, distributed in the farm, to find the (relative or absolute) position of the robot or panels. Multiple positioning stations are located in the farm (e.g., 2910 at corner, 2920 at side, and 2930 in the middle), for robots to determine their positions in the farm. In the farm, the solar panels (e.g., 2900) may be arranged in an array. A robot may determine its position via one or more of the positioning stations. The stations may wirelessly communicate with the robot, each other, and/or a network infrastructure. The stations may use a line of sight technology, such as infrared, to detect an obstruction (e.g., a robot) crossing the line of site (or using a motion detector, or a pattern recognition module). Each positioning station may compromise of two or more positioning elements that provide boundaries, and either detect or let robot detect when it is crossing the boundary, e.g., by using line of sight beams (e.g. that are crossed, similar to the automatic garage door opener safety feature). The position of the robot can be used by the robot or other robots or HQ, to find the optimum route to the next assignment, to reduce time delay and cost, using any scheduling and optimizing module available in the market.

Figure 30:
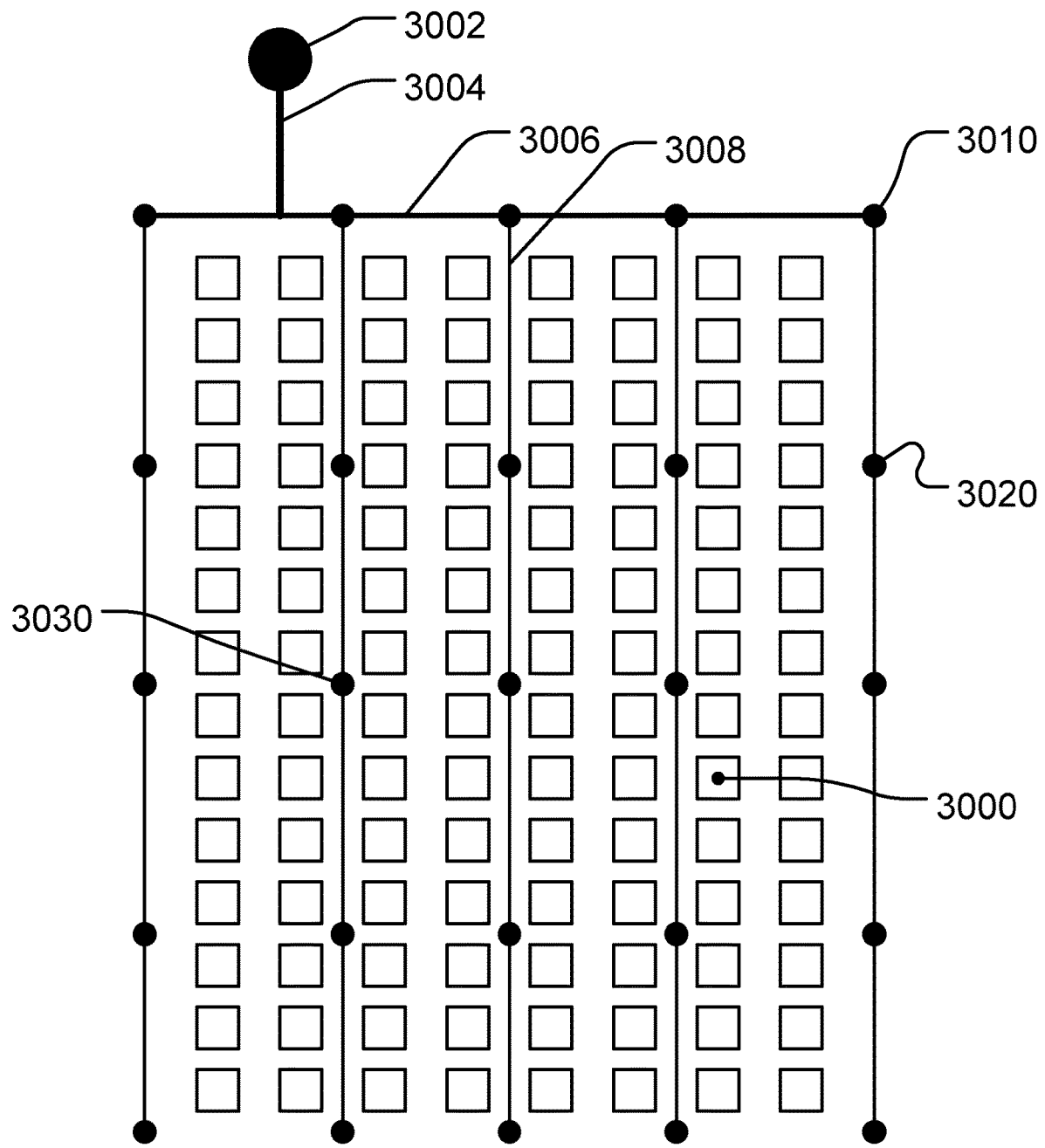
FIG. 30 shows an array or matrix or 2-D (two-dimensional) set for a farm, plus a network.

FIG. 30 represents the structure for supply routes, such as wires, cables, pipes, or conduits, e.g. for water and soap and electricity and data and gas. It can also be for electricity in/out of the robot or panel, or measurement connections for data and calibration or status of a panel or robot, such as efficiency data, repair data inbound/outbound, analysis, scheduling, tasking commands for robots, reports by robots, acknowledgement signals by robots or stations, any wired or wireless communications transmitted (along with cables and wires or probe wires for those purposes), voltages, powers, or currents measured data, optical data, or any other measured parameters from panels/cells/devices/solar panels/subpanels/rows of devices. The HQ or main supply tank or depot 3002 is connected through the lines or conduits or pipes 3008, 3006, and 3004, to supply or communicate with stations or nodes 3010 at corners of the farm (and 3020 at the boundary stations or nodes, or 3030 in-between stations or nodes along the tracks or routes), inbound/outbound, in multiple directions, for the whole farm for communication and supply and power management, for the panels management and repair, e.g. 3000. In one example, wireless devices or antennas can also be added to the stations or nodes for communications or data or power transmission, in addition to wires and cables.

Figure 31A:
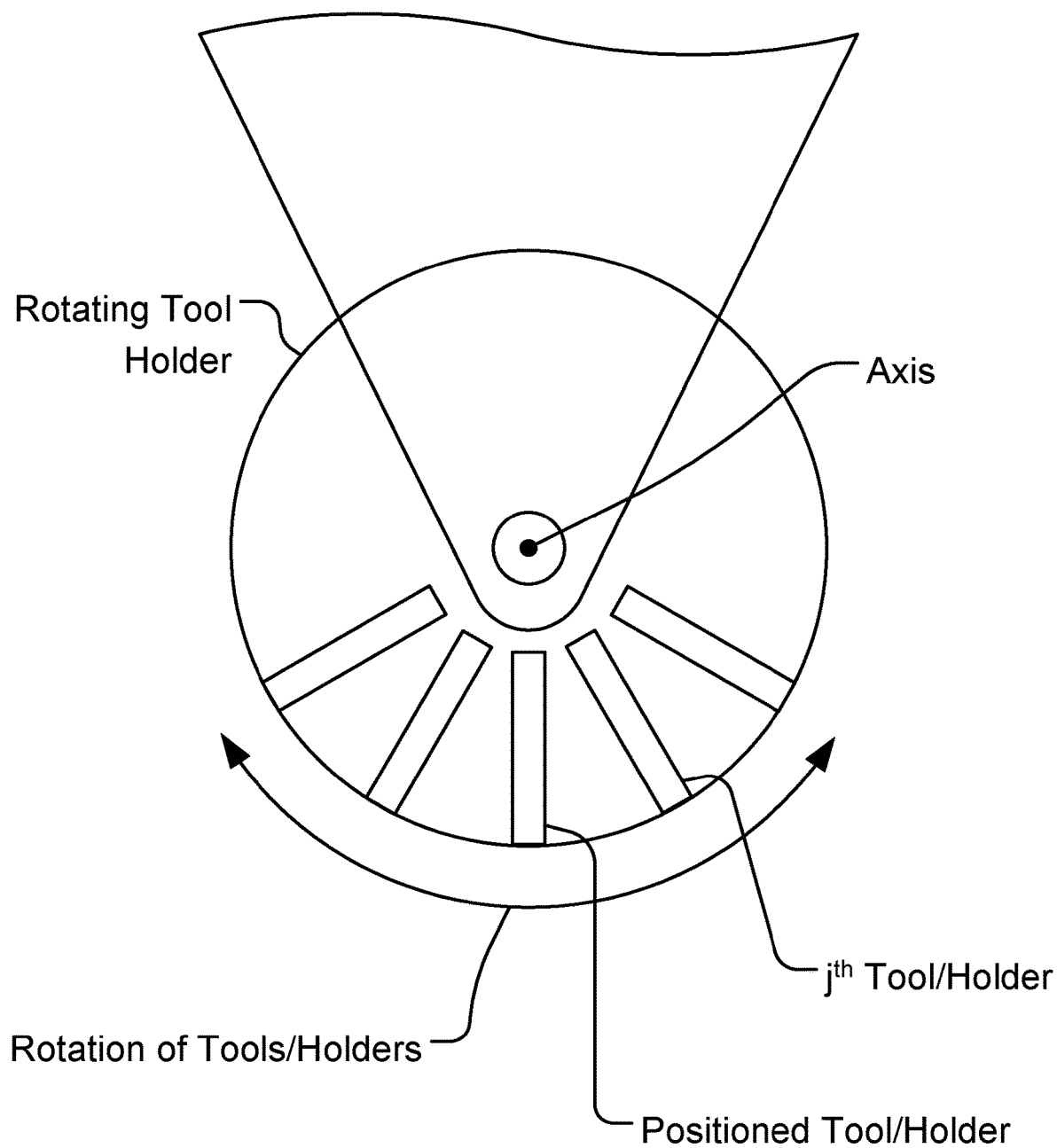
FIGS. 31a-b show rotating tool holder.

FIG. 31*a* teaches rotating tool holder with axis of rotation parallel to the plane of solar panel, as an example, connected to the panel or robot or at a station along the tracks. It can also be inside the body of the robot. The holder rotates to a correct position, for a robot to pick up a needed tool, from the j-th position/hole/shelf on the holder.

Figure 31B:
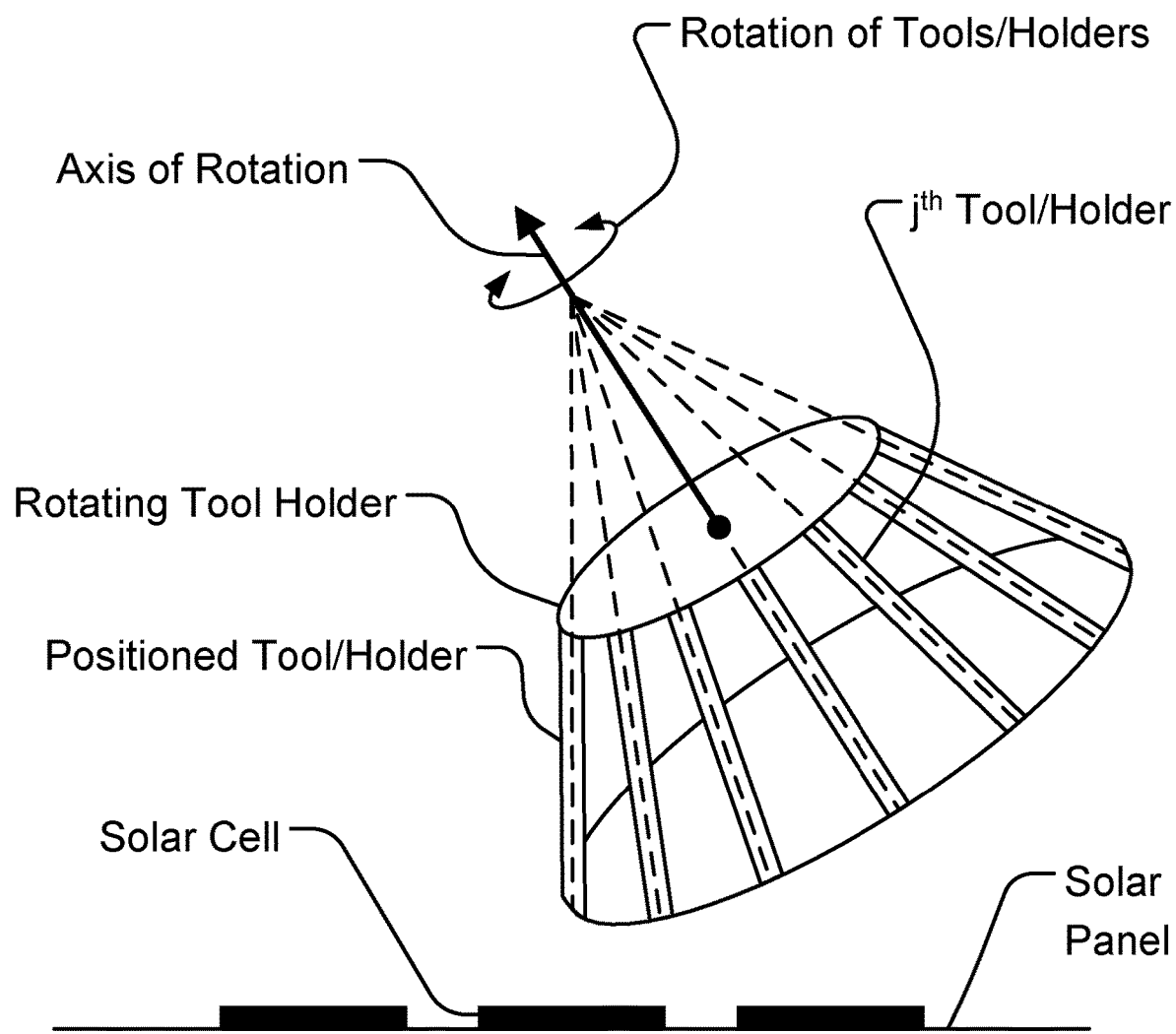

FIG. 31*b* teaches rotating tool holder with axis of rotation not parallel to the plane of solar panel, as an example, connected to the panel or robot or at a station along the tracks. It can also be inside the body of the robot. The holder rotates to a correct position, for a robot to pick up a needed tool, from the j-th position/hole/shelf on the holder. Alternatively, the tool can be engaged on the surface of the panel, directly, without being picked up by the robot, e.g. a screw driver tip, out of the tool holder, can engage a screw on the panel, and tighten the screw, using the tool holder as a tool handle or arm of the robot.

Figure 32:
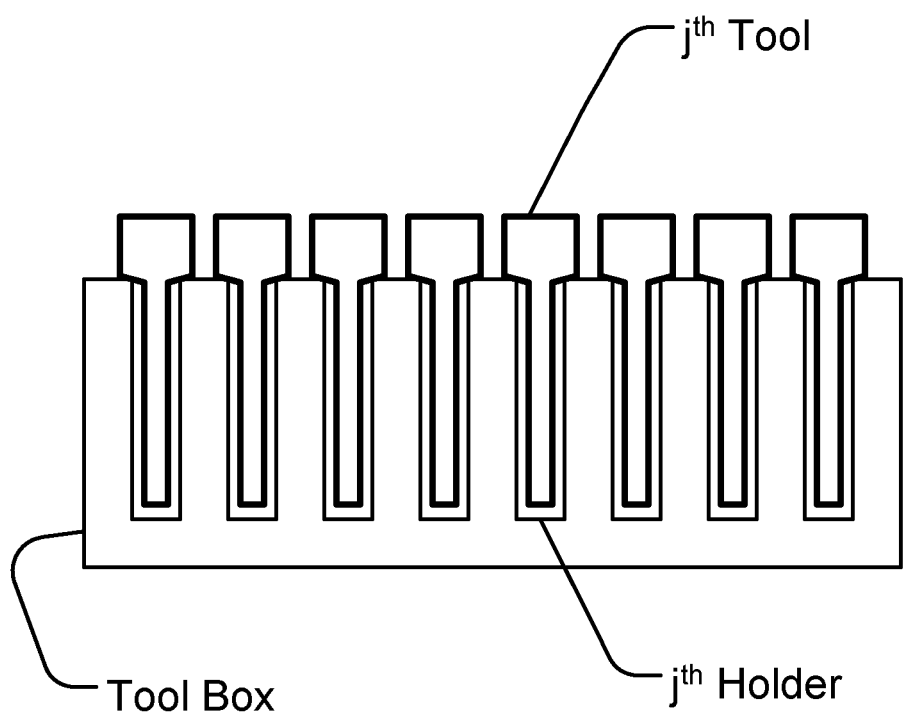
FIG. 32 shows tool box, tools, holder/partitions/separators/compartments/shelves/holes.

FIG. 32 shows a toolbox, holder, tools, and various slots to store them, connected to the panel or robot or at a station along the tracks. It can also be inside the body of the robot. The holder can move on a rail, or the robot arm can move to the right slot/slit/opening/gap, to position the arm or robot to pick up/exchange/return the intended and needed tool.

Figure 33A:
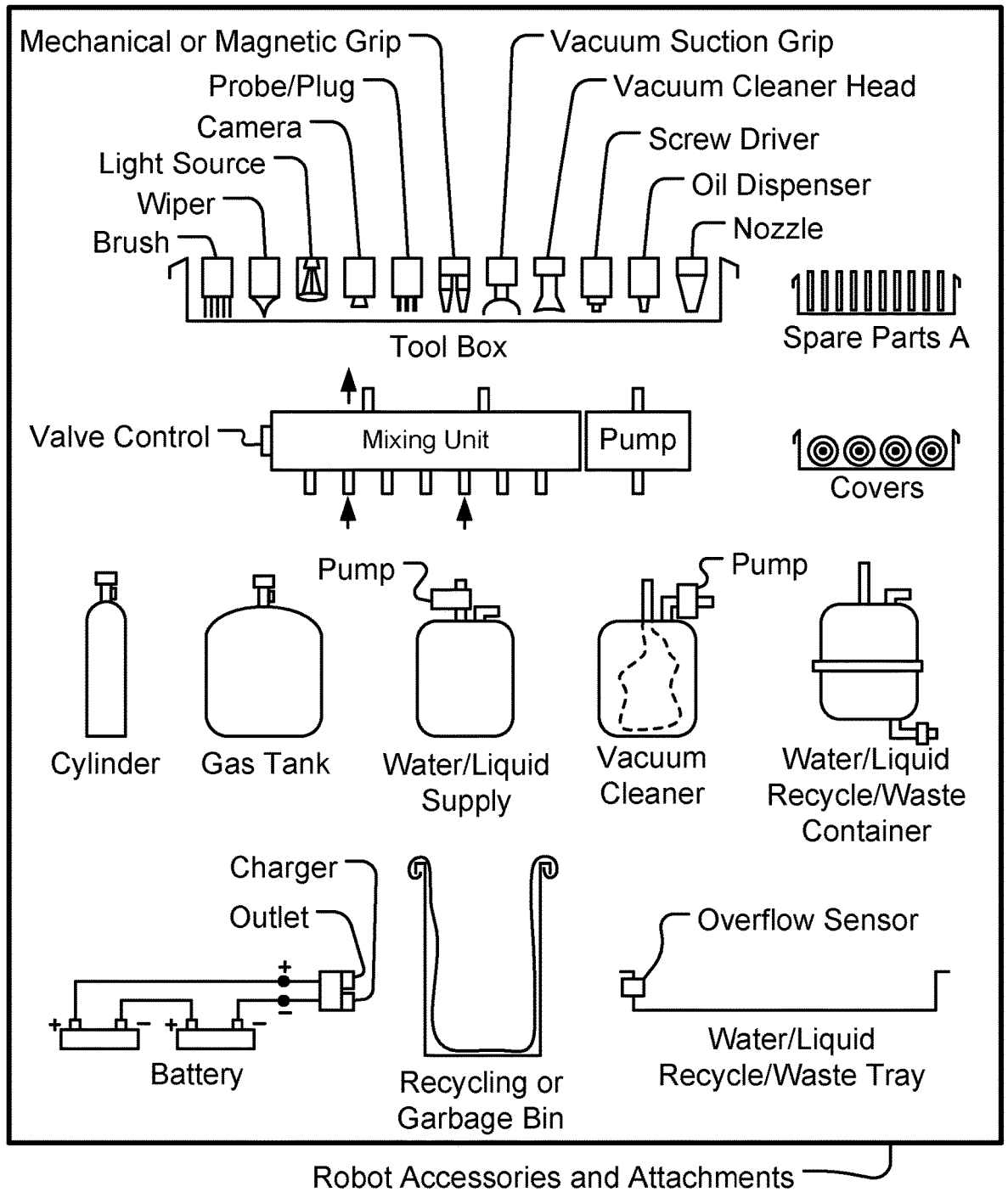
FIG. 33a shows robot accessories and attachments, for tools and other purposes.
Figure 33B:
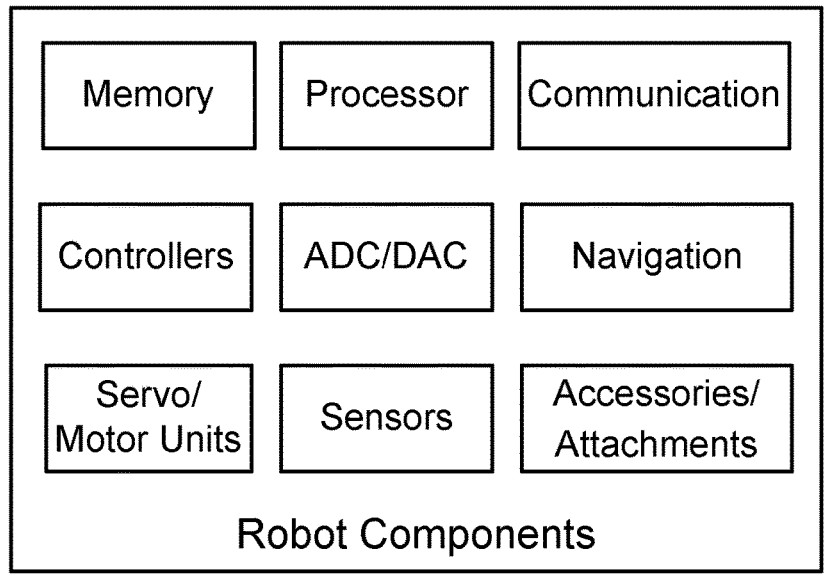
FIGS. 33b-c show robot components or subsystems, as a block diagram and regular model drawings.
Figure 33C:
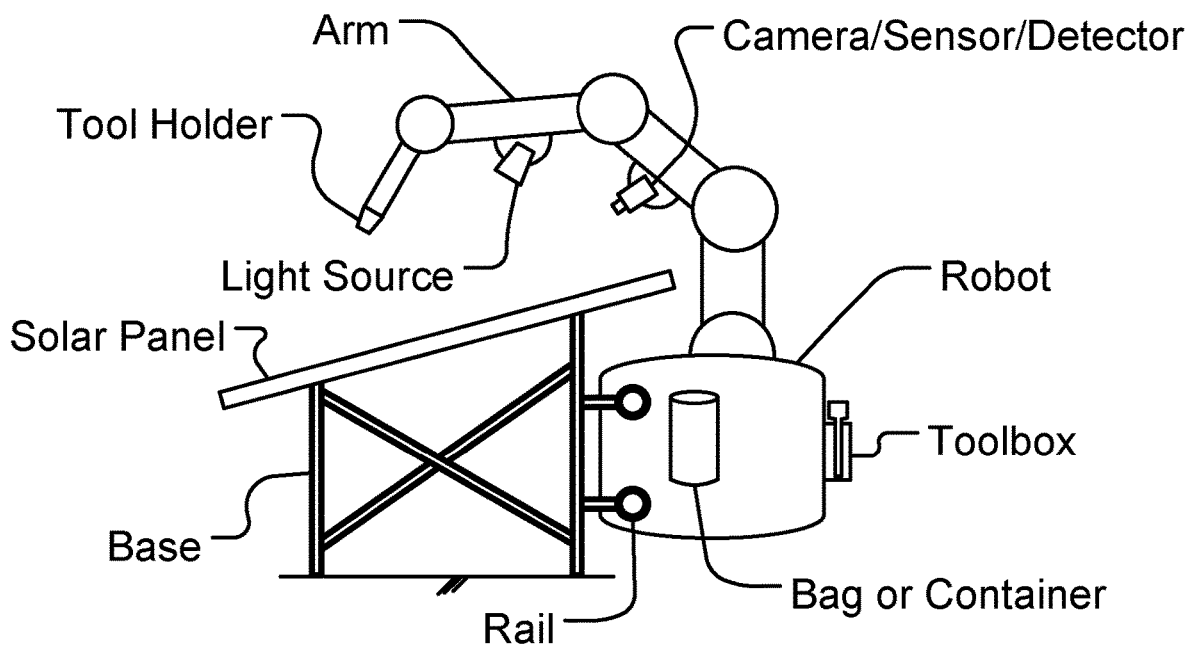

FIG. 33*a* shows robot accessories and attachments/tools, which can be connected or attached to robot, or panel, or station, as a box or holder or container or hook or bag or deposit box or shelf, for example as shown in FIG. 33*c* for bag, container, or toolbox. Some examples are: holders or grips to hold objects, wiper for cleaning, manifold/valves/mixer/separators/filters for gases or fluids or mixtures, spare parts for repairs, covers for protection against storm or rain or sand or dust, battery for charging or operation of devices on the robot or elsewhere, measurement or analysis tools (such as camera, sensors, probes, voltmeters, detectors, and photodetectors), or recycling tray or bag for recycling objects such as water or purifying for re-use (to conserve water, to reduce cost, located under the robot or panel, and pumped back up using a floating or regular pump or motor, for re-use for cleaning with brush or nozzle, as an example).

The probe for measurements, as one example for a tool, can be electrical, mechanical, magnetic, piezoelectric, X-ray, ultrasonic, or acoustic probe. The probes can be located under the panel or front of the panel, for transmission or backscattering or reflection signals, coming from one or more sources at top, side, or back of the panels, and resulting signals being detected on the front, side, or back, as the signal gets transmitted, refracted, reflected, or backscattered, accordingly, based on the geometry of the source(s) with respect to the panel/detectors. The position of the detectors can be self-adjusted by sensor itself, e.g. on a small rail with a small motor or wheel, or by robot moving the angle or position of the sensors, accordingly, with robot using an arm or hand, and sensor located on a rail(s) or between 2 bars or on a slide scale/track or with a screw and nut system between a narrow gap for holding that sensor, to maximize/optimize the measurements/position sensors correctly for measurements.

FIG. 33*b* shows robot components, connected electrically or data-wise, wirelessly or by wire or optically, communicating or sending data/information to each other. For example, they are: memory, processor unit or microprocessor for analysis, connected to HQ for further processing, communication devices or antennas or optical for sending data in/out, controllers e.g. to adjust air pressure, ADC/DAC for analog to digital or vice versa conversions e.g. for sensors or data or commands, navigation e.g. GPS or tags or IDs to find and locate objects, robots, or panels (or find the best/fastest/shortest route to get to a destination/panel), servo-motor units for moving objects and operations, sensors for detections, and accessories for tools or measurements or operations.

FIG. 33*c* shows an example of a robot with attached, or holding, a toolbox, bag, or container/tray/shelf/box/package/carton/envelop/attachment/extension.

Figure 34:
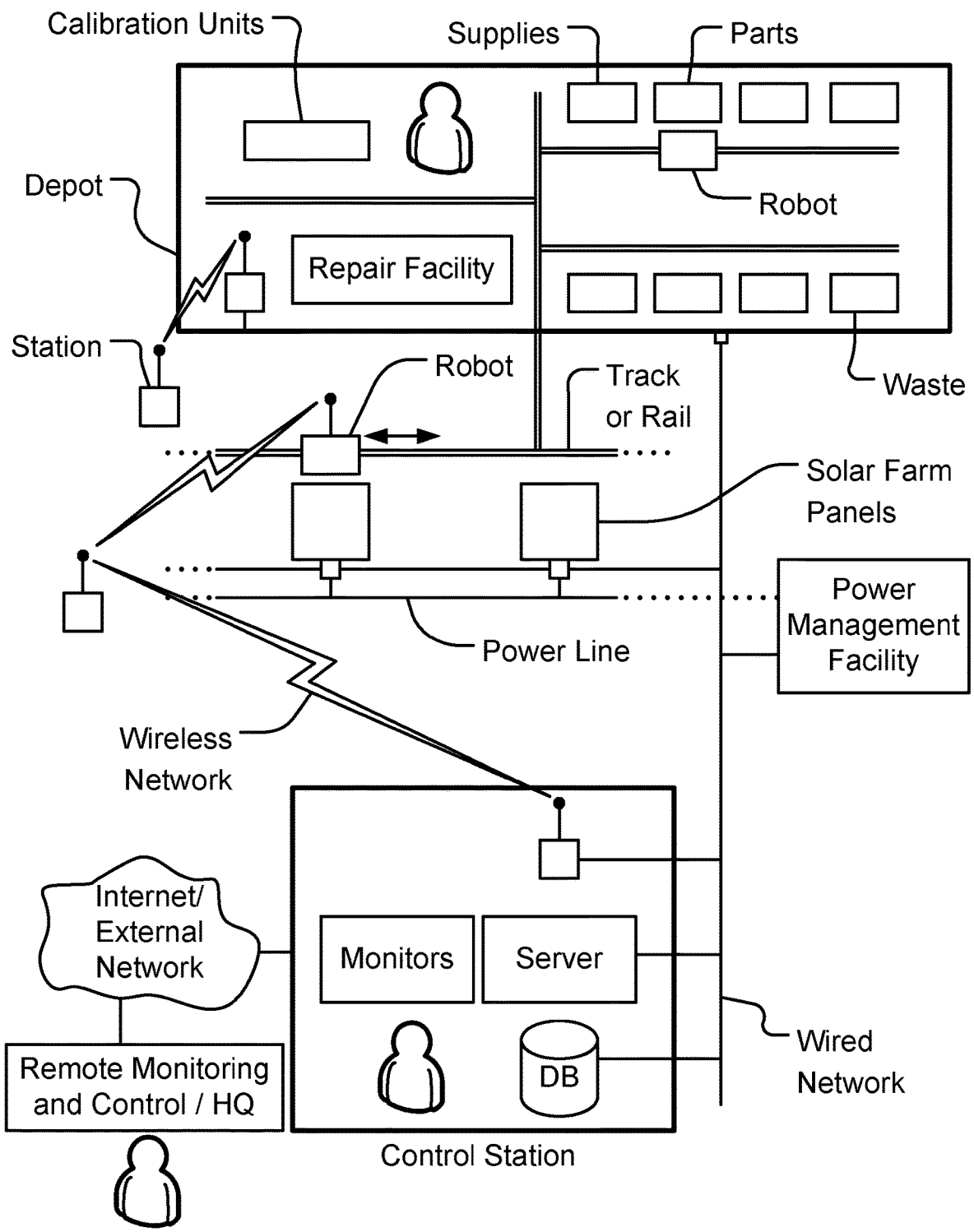
FIG. 34 shows the farm structure and connections.

FIG. 34 shows an example of a solar farm with components and units shown:

depot having repair facility for robots and components, with calibration units for measurements, and user/human being present, as operator, with parts and supply to be picked up by robots, and waste collected or recycled from/to robots, with communication wired or wirelessly to other locations and units or HQ (main processor for decisions).

tracks and power lines across the farm, and connected to depot and stations.

solar panels connected to the local grid, and also to the outside power grid through some central power management facility for monitoring and interface purposes, e.g. with DC/AC current convertors, or surge protectors for protection of the grids and panels/system/farm.

HQ with an operator, with Internet or network access.

monitors/PCs/computers, with operators, with servers and databases, for control station, for history, analysis, and information, also communicating with HQ, power management facility, and depot/stations/panels/robots.

Figure 35:
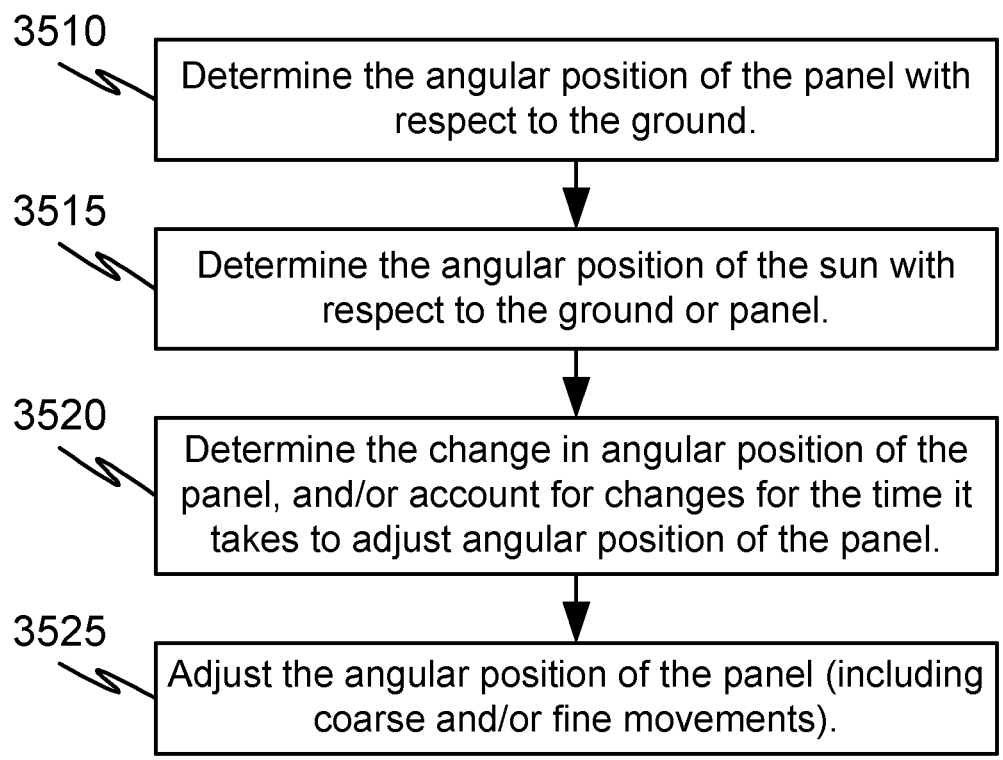
FIG. 35 shows adjusting the panel.

FIG. 35 shows an example of method/steps of determining the angular position of the panel:

1) Old position is in DB/database/memory.

2) Position is now determined by the position of the panel support.

3) Retrieve or receive data from panel (calculated by panel). For example, panel or central server gets locality and time information and Sun position, to determine its own position, after multiple measurements.

4) Robot places its own probe on the panel. Or, a panel having such probe is integrated with it. For example, it is containing a level device for measuring horizontal plane (with liquid, similar to the ones for house constructions), in 3 dimensions. Or, one can use MEMS (small sensors, or Micro-Electro-Mechanical Systems), or inclinometer sensors.

To determine the position of the Sun, with respect to the panel, here are some examples/embodiments/methods:

1) Analytically, based on the time of day and year, and geographical latitude, plus the position of panel.

2) Measured via a ray-tracer aligned (or attached) to the panel.

3) Maximizing the output of solar cell sensor or panel, by varying the panel angular position, i.e., via a negative feedback.

To adjust the coarse/fine movements of the panel, the panel is set on a frame that is set on the support and base. The coarse movement is done via adjusting the position of the supports, while the fine movement is done by adjusting the relative position of the frame and panel, as depicted in steps 3510, 3515, 3520, and 3525, as an example.

Figure 36A:
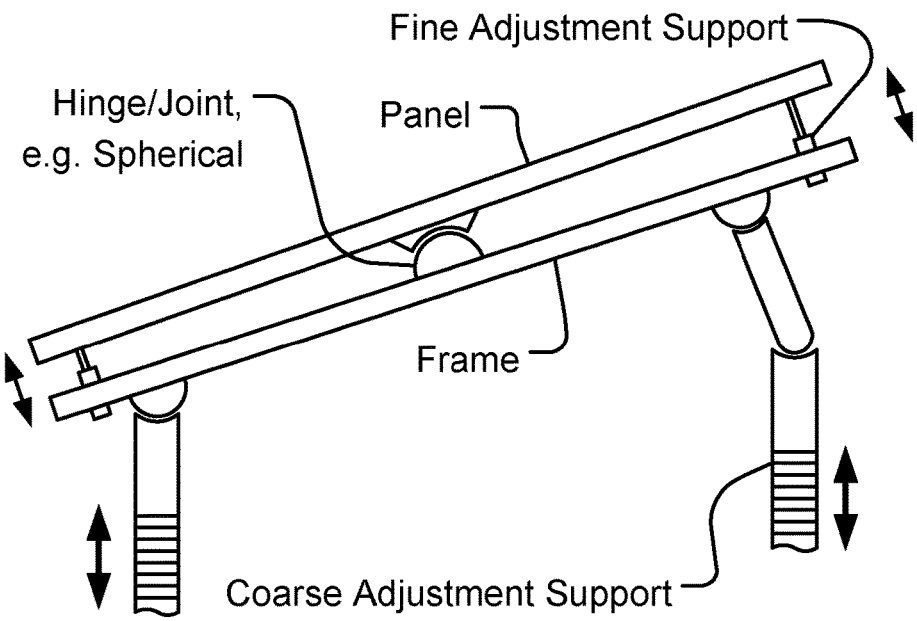
FIGS. 36a-c show coarse and fine adjustments for the panel.

FIG. 36*a* shows a panel on a frame, with leg(s) support with coarse adjustments, and moving/adjusting up/down for the legs, e.g. using a jack, lift, or screw system, e.g. using robot or motor/actuator, using hinge/joint/spherical hinge(s) for connectivity, stability, and flexibility. Then, the fine adjustments can be done between frame and panel using screw and bars or nuts, or spring loaded plates, using the lever or screw driver by the robot, to adjust small heights and angles in 3-D space, for the plane of the panel. In another embodiment, a slightly-loose cable through the frame (e.g. as a loop/closed long ellipse shape) can also be used for the adjustment of the angle for the panel, e.g. by securing one end of the cable, and pulling the other end (or the middle portion of the loop), using a motor, bar, or chain, e.g. by the robot.

In another embodiment, only one side of the panel is moved up/down, using actuator/motor, and the other side just follows, as for alignment. In another embodiment, each leg (e.g. 4-6 legs) can be moved up/down, both for coarse and fine adjustments, as an option, giving multiple degrees of freedom for better adjustments, with minimum effort/feedback/re-adjustments (faster adjustments).

Figure 36B:
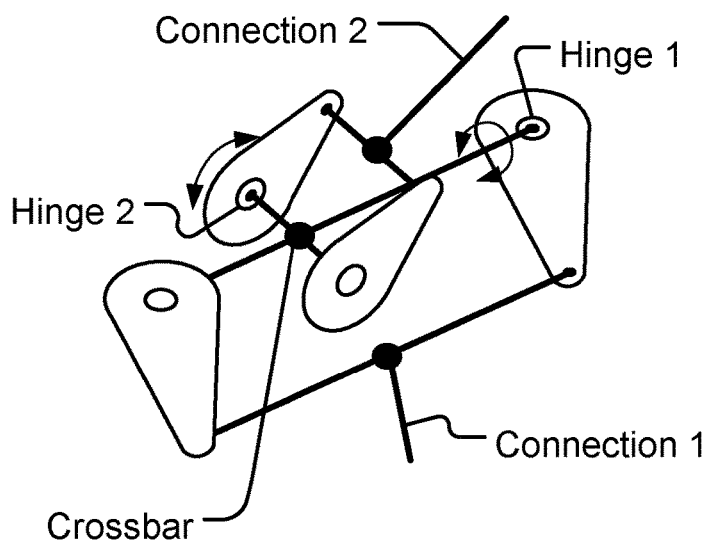

FIG. 36*b* shows a new system for hinge or movement support, comprising multiple hinges and connections. Connection (or connector) 1 is connected to hinge 1, and connection 2 is connected to hinge 2. There is a cross bar between hinges 1 and 2. The overall system has 2 angles of freedom in 3-D space for flexibility, similar to the spherical hinges or connectors. Connectors 1 and 2 can move, with hinges 1 and 2 rotating, similar to a spherical hinge movement/support/flexibility. Thus, this new system in FIG. 36*b* is very useful for most of our figures in this invention related to the movements of objects, e.g. to be used in FIG. 36*a*, as a replacement for spherical hinge or connector.

Figure 36C:
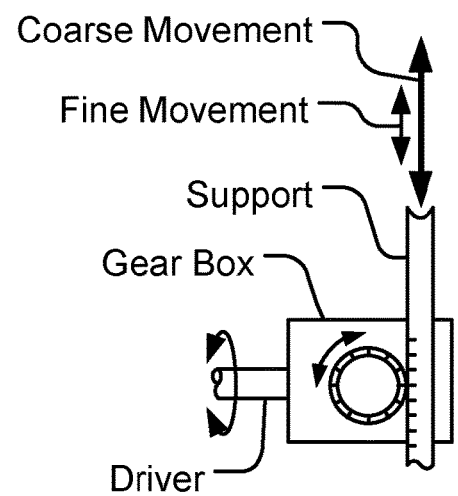

FIG. 36*c* shows a new system for jack or lifter, with a shaft/driver, driving through a gearbox and multiple gears, to do reverse or multiple speeds, for coarse and fine movements for the legs, for different adjustments.

Figure 37:
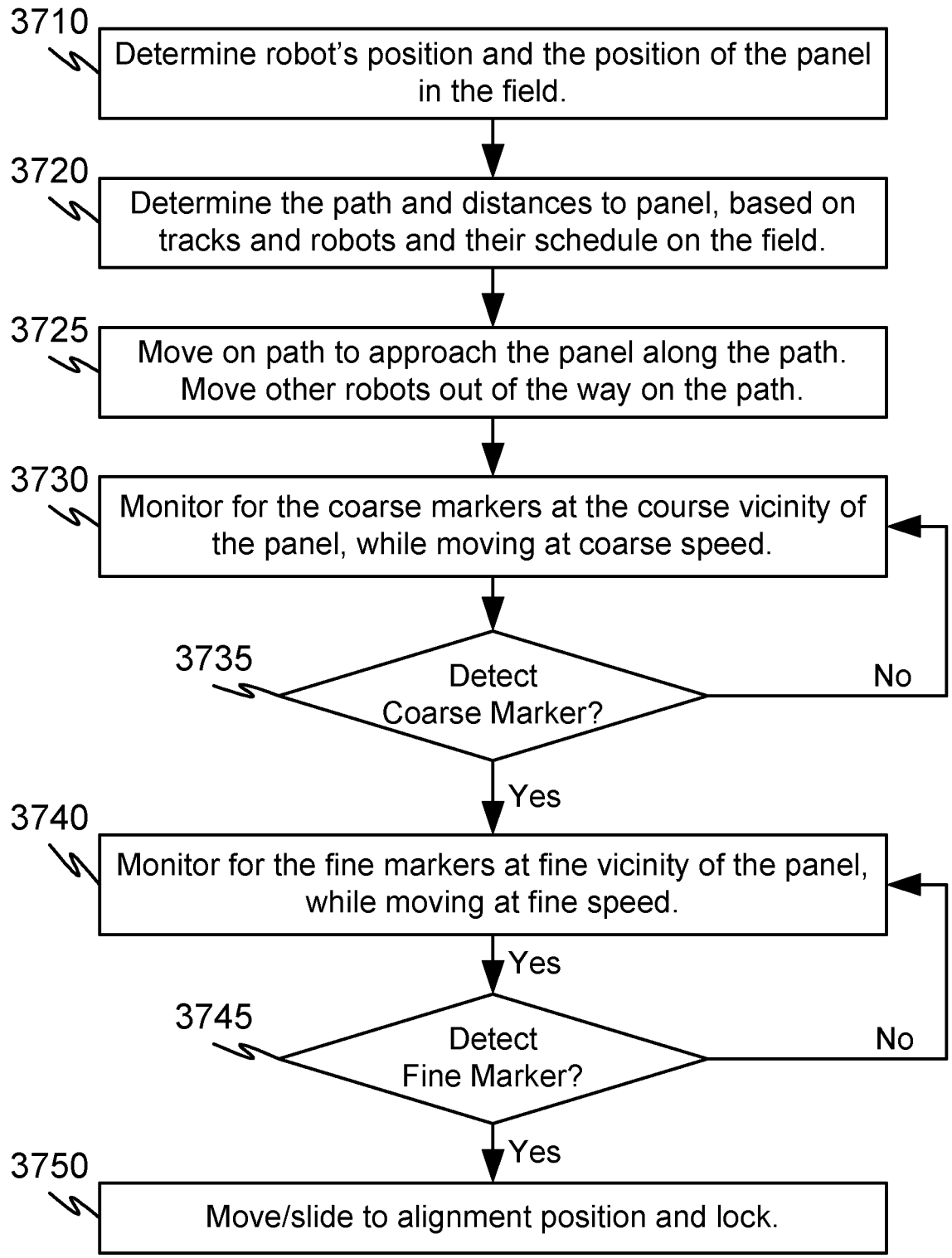
FIG. 37 shows adjusting with coarse and fine markers.

FIG. 37 shows the adjustment of the position by coarse movements using "coarse-movement" markers, e.g. on the panel, 3730 and 3735, after determining the position and path of the robot 3710 and 3720, and moving other robots out of the way 3725. Then, the fine adjustments/movement is done using "fine-movement" marker(s), in a loop, 3740 and 3745, until it is satisfactory (in the logic decision loop). Then, it applies the brake or slide to final position slowly 3750, or using a grip/holder. This logic can be used for all adjustments in this invention, including height and angles, to do coarse, semi-coarse, and fine adjustments (e.g. in N times/steps), in multiple steps/loops, so that it will adjust more efficiently. The Fuzzy Logic module can be added to this system, to stop/adjust more efficiently/faster (to avoid abrupt braking and accelerations, to reduce waste of energy/money and time).

Figure 38:
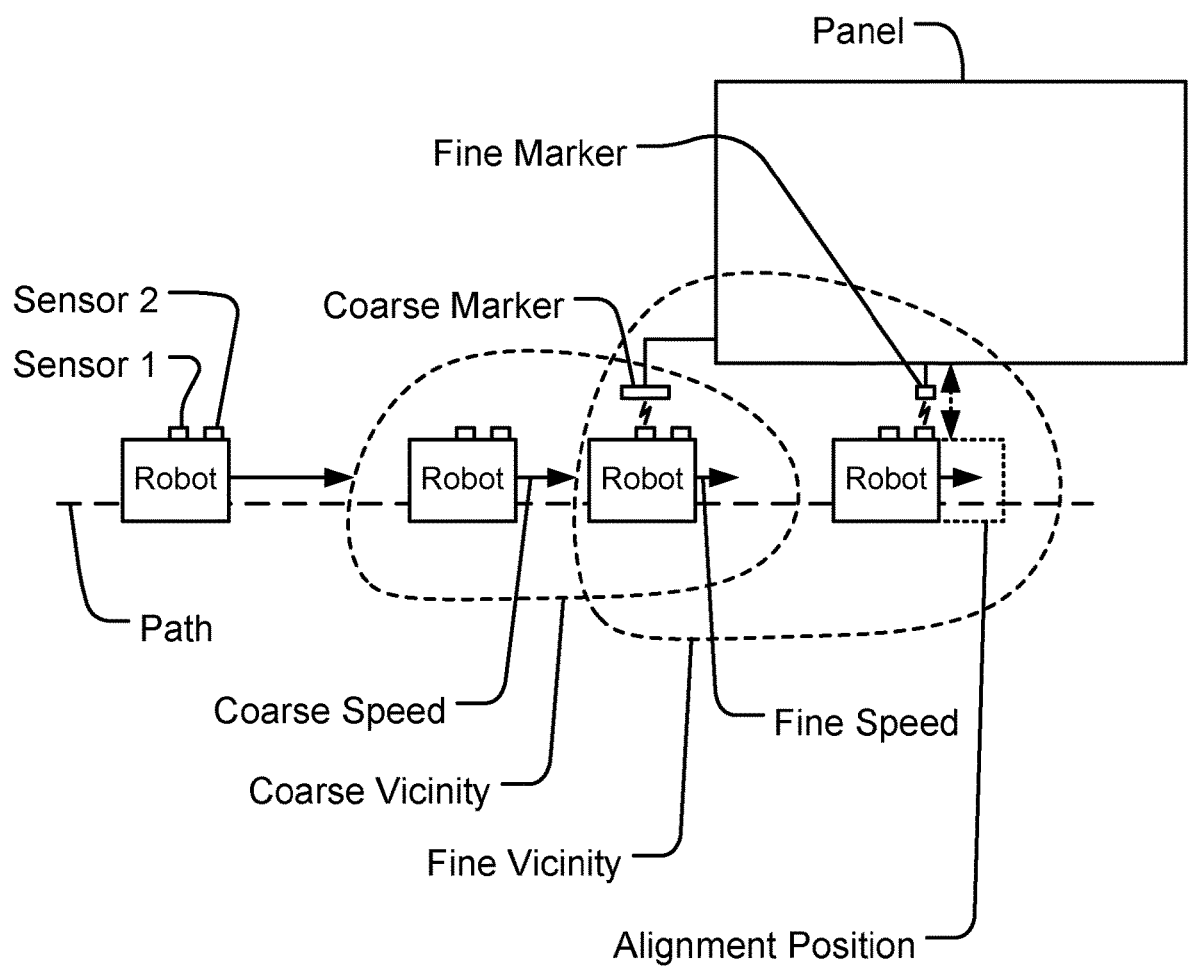
FIG. 38 shows adjusting with coarse and fine markers.

FIG. 38 shows an example for FIG. 37 system. A robot moving on a path (e.g. to the right direction, e.g. on rail or land or hanged from a top overhead rail or floating on air cushion on a rail, as in hovercraft, or floating on a magnetic-driven rail, as in high-speed trains), with multiple (e.g. 2) sensors looking for markers, to sense coarse marker(s) and fine markers (in this order), first in the coarse vicinity region, then in the fine vicinity region(s), with one or combination of sensors, starting with coarse speed (faster) and then with fine speed (movement) (slower), going back and forth, as a logic loop, until threshold or requirement is reached/satisfied, with aligned position, with respect to the panel, for each loop separately. Instead of 2 degrees of adjustment (coarse and fine), we can have 3 or more, e.g. N (an integer), for more efficiency. However, at one point, higher N values are counterproductive, due to overhead/computational/adjustment delays, and usually N=3 or 4 may be enough, for all practical purposes.

Figure 39:
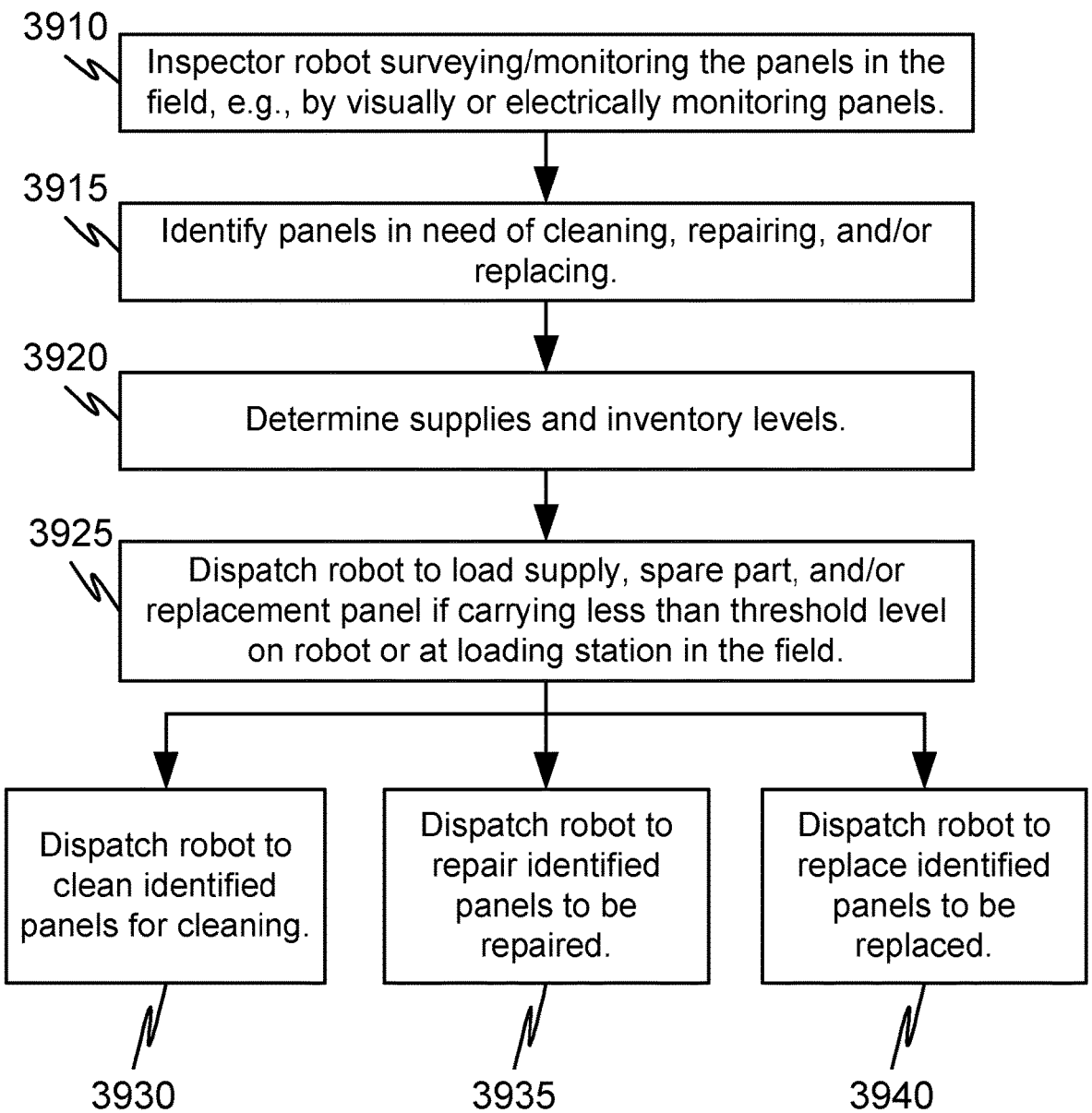
FIG. 39 shows dispatching the robots.

FIG. 39 shows an example of the dispatching and scheduling for robots. The inspector robot inspects a panel or another object in the farm, to find defects and problems, 3910, using all methods described above. Then, to fix the problems 3915, the HQ helps the robot determine supply and inventories/locations of depots or stations holding them 3920, which is an optimization problem, using any optimization/scheduling module in the prior art. Then, based on the locations of robots 3925 working in the field and their availabilities (e.g. if they need 5 minutes to finish the current task, and 10 minutes to get to the next task/panel, or if they need to retire themselves for repair of the robot itself at the depot, as the indication of the unavailability of the robot e.g. for the next 5 hours, or if another robot is nearby for the backup, or do the task, instead), then HQ will decide which robot goes where and do what task, based on type of robot/location, so that the total delays in the farm is minimized. Another embodiment is that the delay for an individual/single robot is optimized/minimized, which may be generally different for overall delays/expenses/optimizations for the whole farm/all robots, as a whole. That is another optimization problem, with linear optimization or other solutions in the market.

Dispatching (D) to different robots for different tasks is done by HQ, after optimization/scheduling, to command to move specific robots (R) to specific locations (L) for specific tasks (T), from current location ($L_O$), which have estimated length of time corresponding to each task, which HQ takes into account for scheduling purpose, for series of repairs by the same robot. In addition, e.g., for one/the first robot washing the panel with water and $2^{nd}$ robot cleaning and drying the panel, we need the first robot scheduled first for the panel, and after that, the second robot comes to the panel. This way, there may be a margin of error in timing/delay between these processes/steps. Thus, we should order the robots' arrivals accordingly, with enough margin of time in-between, so that they do not interfere with each other, or wait unnecessarily for another robot, or to avoid collision of robots on the same track, if there is no parking space nearby, parallel to the tracks. All these timing requirements/constraints come in to the optimization problem/equation, for dispatching 3930, 3940, 3935.

For one embodiment, mathematically, for the measurements (e.g. electrical, optical, magnetic, or other parameters)

(M), by sensors and detectors (S), based on parameters (voltage (V), current (C), or others), we have the functions F and G:

$$M_1 = F(S_1, S_2, \ldots, S_N) = G(V, C, \ldots)$$

(with N being a positive integer bigger than 1.)

When calibrating using calibration sensors ($S_C$) or devices (e.g. resulting in voltage $V_C$ and current $C_C$) to normalize (Q) the measurements, then we will have the corresponding functions $F_1$ and $G_1$:

$$Q_1 = F_1(S_1, S_2, \ldots, S_N, S_C) = G_1(V, C, \ldots, V_C, C_C \ldots)$$

The defect Y is distinguished/analyzed based on normalized measurements, $Q_1, Q_2, Q_3, \ldots$, and comparing to the history data (or comparison/calibration/test data), $Q_H$, as a function of B:

$$Y = B(Q_H, Q_1, Q_2, Q_3, \ldots)$$

For dispatch optimization D, as a function H, we will have:

$$D = H(R, L, T, L_0, Y, \ldots)$$

For all robots or whole farm, the optimization shall be ($D_F$):

$$D_F = Z(D_1, D_2, D_3, \ldots, D_i),$$

where i is a positive integer, and Z is the optimization function/operator, such as linear optimizer, located at the processor at the HQ or main processor or CPU.

where $D_1, D_2, D_3, \ldots, D_i$ refer to dispatch functions for i different robots active/working in the farm, at a given time.

Basically, we have a function (or more functions (objective function)), that we want to minimize or maximize (optimize), with all parameters/dependencies/functions/relationships/constraints mentioned above. Therefore, now, we solve for dispatching and scheduling function for the whole farm $D_F$.

Any variations of the above teaching are also intended to be covered by this patent application.

The invention claimed is:

1. A method of repairing or replacing a solar panel, or components, parts, or structure of said solar panel, in a solar farm using a robot, said method comprising:
   said robot moving in said solar farm;
   wherein said robot comprises an arm and a trunk, with said arm connected to said trunk, and a tool or apparatus attached to or incorporated in said arm;
   wherein said solar panel comprises one or more calibration cells or sensors;
   measuring electrical or optical characteristics or parameters of said one or more calibration cells or sensors;
   transferring said measured electrical or optical characteristics or parameters of said one or more calibration cells or sensors to a processor;
   said processor analyzing said measured electrical or optical characteristics or parameters of said one or more calibration cells or sensors, to determine status or condition of said solar panel;
   based on said status or condition of said solar panel, said processor determining if a repair or replacement is needed or recommended for said solar panel, or said components, parts, or structure of said solar panel;
   in case of said determination by said processor is a need or recommendation for said repair or replacement, said processor dispatching said robot to said solar panel;
   said robot moving to said solar panel;
   said robot repairing or replacing said solar panel, or said components, parts, or structure of said solar panel.

2. The method of repairing or replacing a solar panel, or components, parts, or structure of said solar panel, in a solar farm using a robot, as recited in claim 1, said method comprises: using a baby robot for some function or task.

3. The method of repairing or replacing a solar panel, or components, parts, or structure of said solar panel, in a solar farm using a robot, as recited in claim 1, said method comprises: soldering, connecting, or repairing a piece, a metal wire, or a connection.

4. The method of repairing or replacing a solar panel, or components, parts, or structure of said solar panel, in a solar farm using a robot, as recited in claim 1, said method comprises: welding a piece.

5. The method of repairing or replacing a solar panel, or components, parts, or structure of said solar panel, in a solar farm using a robot, as recited in claim 1, said method comprises: sand blasting a piece.

6. The method of repairing or replacing a solar panel, or components, parts, or structure of said solar panel, in a solar farm using a robot, as recited in claim 1, said method comprises: de-icing said solar panel.

7. The method of repairing or replacing a solar panel, or components, parts, or structure of said solar panel, in a solar farm using a robot, as recited in claim 1, said method comprises: replacing said solar panel.

8. The method of repairing or replacing a solar panel, or components, parts, or structure of said solar panel, in a solar farm using a robot, as recited in claim 1, said method comprises: repairing said solar panel.

9. The method of repairing or replacing a solar panel, or components, parts, or structure of said solar panel, in a solar farm using a robot, as recited in claim 1, said method comprises: replacing a component of said solar panel.

10. The method of repairing or replacing a solar panel, or components, parts, or structure of said solar panel, in a solar farm using a robot, as recited in Maim 1, said method comprises: repairing a component of said solar panel.

11. The method of repairing or replacing a solar panel, or components, parts, or structure of said solar panel, in a solar farm using a robot, as recited in claim 1, wherein said robot comprises one or more of following: a flat bed, lifter, pusher, camera, light source, vacuum cleaner, cable, wire, antenna, pipe, conduit, lens, mirror, bag, container, gear box, gear, spare parts container, valve control, mixing unit, pump, cover, cylinder, gas tank, water supply, liquid supply, water or liquid or recycle waste container, battery, charger, outlet, recycling or garbage bin, overflow sensor, and water or liquid recycle or waste tray.

12. The method of repairing or replacing a solar panel, or components, parts, or structure of said solar panel, in a solar farm using a robot, as recited in claim 1, wherein said robot comprises one or more of following: a brush, broom, sweeper, wiper, nozzle, light source, camera, probe, plug, mechanical grip, magnetic grip, vacuum suction grip, vacuum cleaner head, screw driver, soldering device, welding device, oil dispenser, finger, gripper, grip tool, clamp, hook, or tool holder.

13. The method of repairing or replacing a solar panel, or components, parts, or structure of said solar panel, in a solar farm using a robot, as recited in claim 1, said method comprises: using a coarse adjustment and a fine adjustment for proper positioning of said robot.

14. The method of repairing or replacing a solar panel, or components, parts, or structure of said solar panel, in a solar farm using a robot, as recited in claim 1, said method comprises: using a screw driver.

15. The method of repairing or replacing a solar panel, or components, parts, or structure of said solar panel, in a solar farm using a robot, as recited in claim 1, said method comprises: using a fastener.

16. The method of repairing or replacing a solar panel, or components, parts, or structure of said solar panel, in a solar farm using a robot, as recited in claim 1, said method comprises: using an oil dispenser.

17. The method of repairing or replacing a solar panel, or components, parts, or structure of said solar panel, in a solar farm using a robot, as recited in claim 1, said method comprises: using glue on a piece.

18. The method of repairing or replacing a solar panel, or components, parts, or structure of said solar panel, in a solar farm using a robot, as recited in claim 1, said method comprises: fixing a defective panel or component.

19. The method of repairing or replacing a solar panel, or components, parts, or structure of said solar panel, in a solar farm using a robot, as recited in claim 1, said method comprises: fixing a wire or cable.

20. The method of repairing or replacing a solar panel, or components, parts, or structure of said solar panel, in a solar farm using a robot, as recited in claim 1, said method comprises: using a clamp or grip.

* * * * *